United States Patent
Hwang et al.

(10) Patent No.: US 12,302,384 B2
(45) Date of Patent: May 13, 2025

(54) METHOD OF TRANSMISSION/RECEPTION FOR SIDELINK IN A WIRELESS COMMUNICATION SYSTEM AND APPARATUS THEREFOR

(71) Applicant: LG ELECTRONICS INC., Seoul (KR)

(72) Inventors: Daesung Hwang, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 566 days.

(21) Appl. No.: 17/685,782

(22) Filed: Mar. 3, 2022

(65) Prior Publication Data

US 2022/0287086 A1    Sep. 8, 2022

(30) Foreign Application Priority Data

Mar. 3, 2021 (KR) .......... 10-2021-0028256
Mar. 12, 2021 (KR) .......... 10-2021-0032809
(Continued)

(51) Int. Cl.
*H04W 74/0808* (2024.01)
*H04W 72/0446* (2023.01)
(Continued)

(52) U.S. Cl.
CPC .......... *H04W 74/0808* (2013.01); *H04W 72/0446* (2013.01); *H04W 72/20* (2023.01); *H04W 76/28* (2018.02)

(58) Field of Classification Search
CPC ......... H04W 74/0808; H04W 72/0446; H04W 72/20; H04W 76/28; H04W 72/23;
(Continued)

(56) References Cited

U.S. PATENT DOCUMENTS

2017/0127405 A1* 5/2017 Agiwal ................. H04W 76/14
2017/0188391 A1* 6/2017 Rajagopal ......... H04W 74/0816
(Continued)

OTHER PUBLICATIONS

Fujitsu, "Considerations on partial sensing in NR V2X", R1-2007787, 3GPP TSG RAN WG1 Meeting #103-E, e-Meeting, Oct. 26-Nov. 13, 2020), All pages (Year: 2020).*
(Continued)

*Primary Examiner* — Phirin Sam
*Assistant Examiner* — Tarell A Hampton
(74) *Attorney, Agent, or Firm* — Fish & Richardson P.C.

(57) ABSTRACT

Disclosed is a method of performing a sidelink transmission, by a user equipment (UE), in a wireless communication system. More specifically, the method includes: receiving, from a base station (BS), configuration information related to a configuration of a sidelink resource pool; performing a sensing based on a sensing window related to the sensing of the UE; selecting, based on a result of the sensing, a resource for the sidelink transmission from the resource pool, in which the sensing window is configured based on an available slot including at least one slot; performing, based on whether a RE-EVALUATION and/or a PRE-EMPTION on the resource selected based on the result of the sensing to be triggered, the RE-EVALUATION and/or the PRE-EMPTION related to resource re-selection, in which a resource for the resource re-selection based on the RE-EVALUATION and/or the PRE-EMPTION is configured based on a remaining slot in which a slot related to the resource selected based on the result of the sensing is excluded from the available slot; and performing, based on (i) the resource selected based on the result of the sensing and/or (ii) a resource re-selected based on the RE-EVALUATION and/or the PRE-EMPTION, the sidelink transmission.

16 Claims, 25 Drawing Sheets

(30) Foreign Application Priority Data

Sep. 9, 2021 (KR) .......................... 10-2021-0120555
Sep. 13, 2021 (KR) .......................... 10-2021-0121886

(51) Int. Cl.
*H04W 72/20* (2023.01)
*H04W 76/28* (2018.01)

(58) Field of Classification Search
CPC ..... H04W 76/14; H04W 92/18; H04W 72/02; H04W 72/25; H04W 52/0216; H04W 72/566
See application file for complete search history.

(56) References Cited

U.S. PATENT DOCUMENTS

| | | | |
|---|---|---|---|
| 2018/0042023 A1* | 2/2018 | Sheng | H04W 4/40 |
| 2018/0249444 A1* | 8/2018 | Sorrentino | H04W 24/08 |
| 2020/0029340 A1 | 1/2020 | He et al. | |
| 2022/0377748 A1* | 11/2022 | He | H04W 4/70 |
| 2023/0020105 A1* | 1/2023 | Shin | H04W 72/542 |
| 2024/0214940 A1* | 6/2024 | Zhang | H04W 52/0216 |

OTHER PUBLICATIONS

International Search Report in International Appln. No. PCT/KR2022/003006, dated Jun. 17, 2022, 7 pages (with English translation).

* cited by examiner

FIG. 13
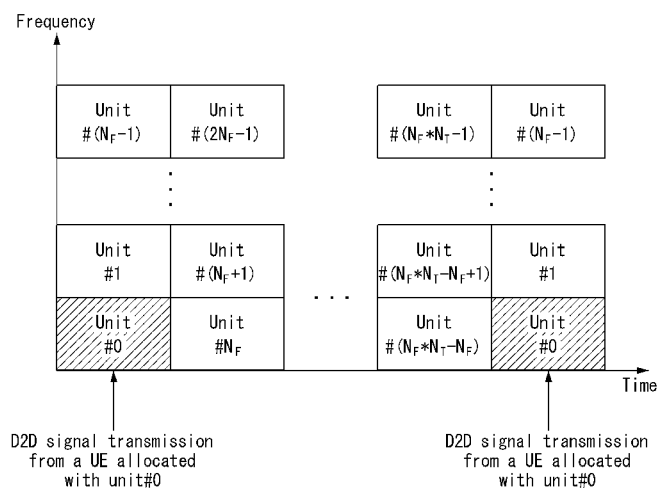
FIG. 14A
FIG. 14B
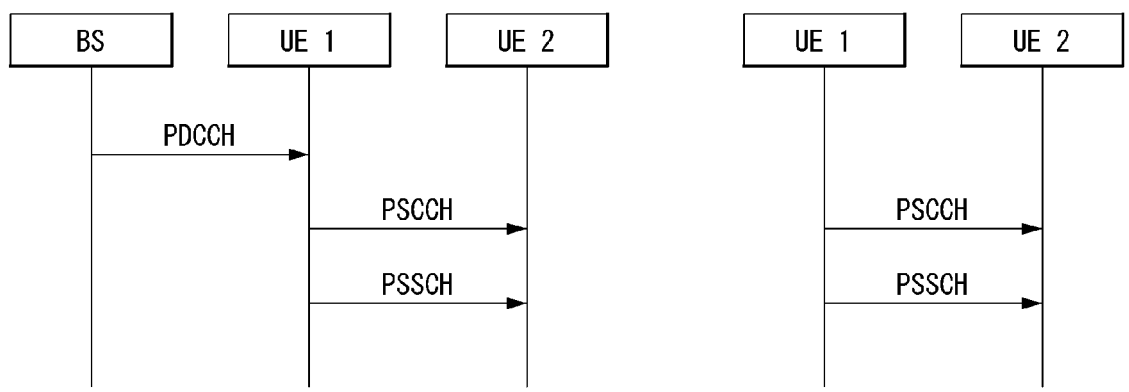

FIG. 15A
FIG. 15B
FIG. 15C
● : TRANSMITTING UE
◍ : RECEIVING UE
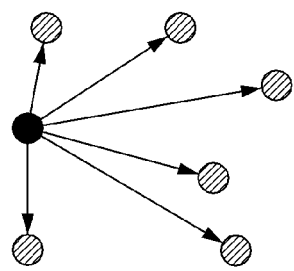
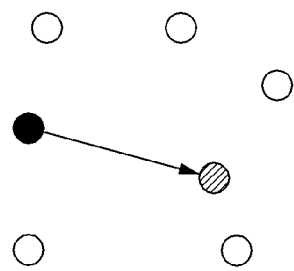
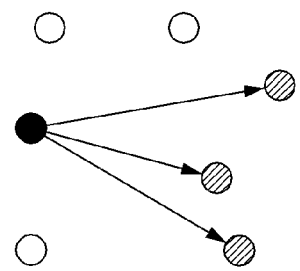
FIG. 16
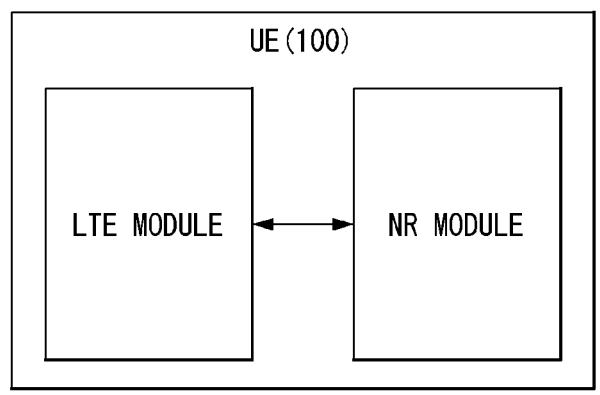

METHOD OF TRANSMISSION/RECEPTION FOR SIDELINK IN A WIRELESS COMMUNICATION SYSTEM AND APPARATUS THEREFOR

CROSS-REFERENCE TO RELATED APPLICATIONS

This application priority to KR Application No. 10-2021-0028256 filed on 3 Mar. 2021, KR Application No. 10-2021-0032809 filed on 12 Mar. 2021, KR Application No. 10-2021-0120555 filed on 9 Sep. 2021 and KR Application No. 10-2021-0121886 filed on 13 Sep. 2021 the entire contents of which is hereby incorporated by reference in its entirety.

BACKGROUND OF THE DISCLOSURE

Field of the Disclosure

The present disclosure relates to a wireless communication system, and more particularly, to a method of transmission/reception for a sidelink based on partial sensing operation based resource allocation and an apparatus therefor.

Related Art

A wireless communication system is a multiple access system which supports communication with multiple users by sharing available system resources (e.g., a bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, a multi carrier frequency division multiple access (MC-FDMA) system, etc.

A sidelink (SL) refers a communication scheme that configures a direct link between user equipments (UEs), and directly sends and receives a voice or data between the UEs without passing through a base station (BS). The SL is considered as one method that can solve a burden of the BS according to data traffic which is rapidly increased.

Vehicle-to-everything (V2X) means a communication technology that exchanges information with another vehicle, another pedestrian, a thing in which an infrastructure is constructed, etc., through a wired/wireless communication. The V2X can be categorized into four types such as vehicle-to-vehicle (V2V), vehicle-to-infrastructure (V2I), vehicle-to-network (V2N), and vehicle-to-pedestrian (V2P). The V2X communication may be provided through a PC5 interface and/or a Uu interface.

Meanwhile, as more and more communication devices require larger communication capacity, there is a need for improved mobile broadband communication compared to the existing radio access technology (RAT). As a result, a communication considering a service or a UE sensitive to reliability and latency is discussed, and a next-generation radio access technology considering an improved mobile broadband communication a massive machine type communication (MTC), an ultra-reliable and low latency communication (URLLC), etc., may be referred to as a new radio access technology (RAT) or a new radio. Even in NR, the vehicle-to-everything (V2X) communication can be supported.

SUMMARY OF THE DISCLOSURE

The present disclosure provides a method of transmission/reception for a sidelink in a wireless communication system and an apparatus therefor.

The present disclosure also provides a method of transmission/reception for a sidelink based an aperiodic partial sensing and an apparatus therefor.

The present disclosure also provides a method of configuring a sensing window for sidelink transmission based on an aperiodic partial sensing and an apparatus therefor.

The present disclosure also provides a method of configuring a resource selection window for sidelink transmission based on an aperiodic partial sensing and an apparatus therefor.

The present disclosure also provides a method of resource re-selection through RE-EVALUATION and/or PRE-EMPTION upon sidelink transmission based on an aperiodic partial sensing and an apparatus therefor.

The present disclosure also provides a method of limiting and configuring a candidate resource upon resource re-selection through RE-EVALUATION and/or PRE-EMPTION in the case of sidelink transmission based on an aperiodic partial sensing and an apparatus therefor.

The present disclosure also provides a method for sidelink transmission based an aperiodic partial sensing upon a DRX operation and an apparatus therefor.

Technical problems to be solved by the present disclosure are not limited by the above-mentioned technical problems, and other technical problems which are not mentioned above can be clearly understood from the following description by those skilled in the art to which the present disclosure pertains.

The present disclosure provides a method of performing, by a user equipment, a sidelink transmission in wireless communication system.

Specifically, in the present disclosure, a method of performing a sidelink transmission, by a user equipment, in wireless communication system, the method comprising: receiving, from a base station, configuration information related to a configuration of a sidelink resource pool; performing a sensing based on a sensing window related to the sensing of the user equipment; selecting, based on a result of the sensing, a resource for the sidelink transmission from the resource pool, wherein the sensing window is configured based on an available slot including at least one slot; performing, based on whether a RE-EVALUATION and/or a PRE-EMPTION on the resource selected based on the result of the sensing to be triggered, the RE-EVALUATION and/or the PRE-EMPTION related to resource re-selection, wherein a resource for the resource re-selection based on the RE-EVALUATION and/or the PRE-EMPTION is configured based on a remaining slot in which a slot related to the resource selected based on the result of the sensing is excluded from the available slot; and performing, based on (i) the resource selected based on the result of the sensing and/or (ii) a resource re-selected based on the RE-EVALUATION and/or the PRE-EMPTION, the sidelink transmission.

Furthermore, in the present disclosure, wherein (i) a start time of the sensing window and (ii) an end time of the sensing window are determined based on a slot-based time interval from a first ($1^{st}$) slot included in the available slot.

Furthermore, in the present disclosure, wherein the start time of the sensing window is a time point that is 31 slots earlier than the first ($1^{st}$) slot included in the available slot.

Furthermore, in the present disclosure, wherein the end time of the sensing window is a time point that is a number of slots equal to a sum of (i) a processing time for the user equipment to obtain the result of the sensing and (ii) a processing time for the user equipment to select the resource for the sidelink transmission based on the result of the sensing earlier than the first ($1^{st}$) slot included in the available slot.

Furthermore, in the present disclosure, wherein the selecting the resource for the sidelink transmission further comprises: identifying a candidate sidelink transmission resource within a resource selection window in which selection of a sidelink transmission resource is performed; and selecting the resource for the sidelink transmission from the identified candidate sidelink transmission resource.

Furthermore, in the present disclosure, wherein a start time of the resource selection window is determined as (i) a time point apart by a first time offset (ii) from a slot related to a time point at which the selection of the sidelink transmission resource is triggered, and wherein the first time offset is determined based on a processing time for the user equipment to select the resource for the sidelink transmission based on the result of the sensing.

Furthermore, in the present disclosure, wherein an end time of the resource selection window is determined as (i) a time point apart by a second time offset (ii) from the slot related to the time point at which the selection of the sidelink transmission resource is triggered, and wherein the second time offset is determined based on remaining PDB (Packet Delay Budget) of data packet related to the sidelink transmission.

Furthermore, in the present disclosure, wherein (i) the sensing window and (ii) the resource selection window are related to aperiodic sidelink transmission of the user equipment.

Furthermore, in the present disclosure, further comprising: receiving, from another user equipment, SCI (Sidelink Control Information).

Furthermore, in the present disclosure, wherein the identifying the candidate sidelink transmission resource is performed based on the SCI which the user equipment receives from the another user equipment, wherein the SCI includes information for the sensing, and wherein the SCI is detected on the sensing window.

Furthermore, in the present disclosure, wherein the performing the RE-EVALUATION and/or the PRE-EMPTION is performed before the sidelink transmission on the selected resource is performed based on the SCI, wherein the SCI is received in a slot other than a slot included in the sensing window, and wherein the SCI includes information on a priority of sidelink transmission which the another user equipment performs.

Furthermore, in the present disclosure, wherein based on (i) the RE-EVALUATION and/or the PRE-EMPTION being performed and (ii) there being available resource for the sidelink transmission in the configured resource for the resource re-selection, the sidelink transmission is performed on the resource re-selected based on the RE-EVALUATION and/or the PRE-EMPTION.

Furthermore, in the present disclosure, wherein based on (i) the RE-EVALUATION and/or the PRE-EMPTION being performed and (ii) there being no available resource for the sidelink transmission in the configured resource for the resource re-selection, further comprises: performing random resource selection.

Furthermore, in the present disclosure, wherein based on (i) the RE-EVALUATION and/or the PRE-EMPTION being performed and (ii) there being no available resource for the sidelink transmission in the configured resource for the resource re-selection, further comprises: dropping the sidelink transmission.

Furthermore, in the present disclosure, wherein based on (i) the RE-EVALUATION and/or the PRE-EMPTION being not performed, the sidelink transmission is performed on the resource selected based on the result of the sensing.

Furthermore, in the present disclosure, further comprising: performing DRX (Discontinuous Reception) operation; and based on (i) a part of the sensing window overlapping with a time interval during which the DRX operation is activated or (ii) all of the sensing window not overlapping with the time interval during which the DRX operation is activated, detecting the SCI on the sensing window.

Furthermore, in the present disclosure, performing DRX (Discontinuous Reception) operation; and based on (i) a part of the sensing window overlapping with a time interval during which the DRX operation is activated or (ii) all of the sensing window not overlapping with the time interval during which the DRX operation is activated, omitting detection of the SCI on the sensing window.

Furthermore, in the present disclosure, a user equipment (UE) performing a sidelink transmission in a wireless communication system, the UE comprising: one or more transceivers; one or more processors; and one or more memories for storing instructions for operations executed by the one or more processors and coupled to the one or more processors; wherein the operations comprising: receiving, from a base station, configuration information related to a configuration of a sidelink resource pool; performing a sensing based on a sensing window related to the sensing of the user equipment; selecting, based on a result of the sensing, a resource for the sidelink transmission from the resource pool, wherein the sensing window is configured based on an available slot including at least one slot; performing, based on whether a RE-EVALUATION and/or a PRE-EMPTION on the resource selected based on the result of the sensing to be triggered, the RE-EVALUATION and/or the PRE-EMPTION related to resource re-selection, wherein a resource for the resource re-selection based on the RE-EVALUATION and/or the PRE-EMPTION is configured based on a remaining slot in which a slot related to the resource selected based on the result of the sensing is excluded from the available slot; and performing, based on (i) the resource selected based on the result of the sensing and/or (ii) a resource re-selected based on the RE-EVALUATION and/or the PRE-EMPTION, the sidelink transmission.

Furthermore, in the present disclosure, an apparatus comprising one or more memories and one or more processors operatively coupled to the one or more memories, the apparatus comprising: wherein the one or more processors controls the apparatus to: receive, from a base station, configuration information related to a configuration of a sidelink resource pool; perform a sensing based on a sensing window related to the sensing of the user equipment; select, based on a result of the sensing, a resource for the sidelink transmission from the resource pool, wherein the sensing window is configured based on an available slot including at least one slot; perform, based on whether a RE-EVALUATION and/or a PRE-EMPTION on the resource selected based on the result of the sensing to be triggered, the RE-EVALUATION and/or the PRE-EMPTION related to resource re-selection, wherein a resource for the resource re-selection based on the RE-EVALUATION and/or the PRE-EMPTION is configured based on a remaining slot in which a slot related to the resource selected based on the result of the sensing is excluded from the available slot; and perform, based on (i) the resource selected based on the result of the sensing and/or (ii) a resource re-selected based on the RE-EVALUATION and/or the PRE-EMPTION, the sidelink transmission.

According to the present disclosure, there is an effect that sidelink transmission/reception can be performed in a wireless communication system.

Further, according to the present disclosure, there is an effect that sidelink transmission/reception based on an aperiodic partial sensing can be performed.

Further, according to the present disclosure, there is an effect that a sensing window for the sidelink transmission/reception based on the aperiodic partial sensing can be configured.

Further, according to the present disclosure, there is an effect that the sensing window for the sidelink transmission/reception based on the aperiodic partial sensing can be configured by considering a processing time of a UE.

Further, according to the present disclosure, there is an effect that the sensing window for the sidelink transmission/reception based on the aperiodic partial sensing considering the processing time of the UE is configured to perform efficient sidelink transmission/reception.

Further, according to the present disclosure, there is an effect that the sensing window for the sidelink transmission/reception based on the aperiodic partial sensing is configured to avoid a resource collision with another UE upon aperiodic sidelink transmission.

Further, according to the present disclosure, there is an effect that a resource selection window for the sidelink transmission/reception based on the aperiodic partial sensing can be configured.

Further, according to the present disclosure, resource re-selection through RE-EVALUATION and/or PRE-EMPTION upon the sidelink transmission based on the aperiodic partial sensing can be performed.

Further, according to the present disclosure, a candidate resource is limited and configured upon resource re-selection through RE-EVALUATION and/or PRE-EMPTION in the case of the sidelink transmission based on the aperiodic partial sensing to avoid a collision with sidelink transmission of another UE on a re-selected resource.

Further, according to the present disclosure, there is an effect that the sidelink transmission based on the aperiodic partial sensing upon a DRX operation can be performed.

Effects obtainable from the present disclosure are not limited by the effects mentioned above, and other effects which are not mentioned above can be clearly understood from the following description by those skilled in the art to which the present disclosure pertains.

BRIEF DESCRIPTION OF THE DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 13 illustrates a resource unit for the V2X or SL communication according to an embodiment of the present disclosure.

FIGS. 14A and 14B illustrate a procedure of performing, by a UE, a V2X or SL communication based on a transmission mode according to an embodiment of the present disclosure.

FIGS. 15A through 15C illustrate three cast types according to an embodiment of the present disclosure.

FIG. 16 illustrates a UE including an LTE module and an NR module according to an embodiment of the present disclosure.

DESCRIPTION OF EXEMPLARY EMBODIMENTS

In various embodiments of the present disclosure, "/" and "," should be interpreted as representing "and/or". For example, "A/B" may mean "A and/or B". Furthermore, "A, B" may mean "A and/or B". Furthermore, "A/B/C" may mean at least one of "A, B, and/or C". Furthermore, "A, B, C" may mean "at least any one of "A, B, and/or C".

In various embodiments of the present disclosure, "or" should be interpreted as representing "and/or". For example, "A or B" may include "only A", "only B", and/or "both A and B". In other words, "or" should be interpreted as representing "additionally or alternatively".

The following technology may be used for various wireless communication systems which include code division multiple access (CDMA), frequency division multiple access (FDMA), time division multiple access (TDMA), orthogonal frequency division multiple access (OFDMA), single carrier frequency division multiple access (SC-FDMA), non-orthogonal multiple access (NOMA), and the like. The CDMA may be implemented as radio technology such as Universal Terrestrial Radio Access (UTRA) or CDMA2000. The TDMA may be implemented as radio technology such as global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802, Evolved UTRA (E-UTRA), or the like. IEEE 802.16m as an evolution of IEEE 802.16e provides backward compatibility with a system based on IEEE 802.16e. The UTRA is part of Universal Mobile Telecommunications System (UMTS). 3rd Generation Partnership Project (3GPP) Long Term Evolution (LTE) as a part of Evolved UMTS (E-UMTS) using the E-UTRA (evolved-UMTS terrestrial radio access) adopts OFDMA in downlink and adopts SC-FDMA in uplink. LTE-Advanced (A) is evolution of LTE.

5G NR as a subsequent technology is a new clean-slate type mobile communication system having features such as high performance, low latency, high availability, etc. 5G NR may utilize all available spectrum resources such as intermediate frequency band of 1 GHz to 10 GHz, a high-frequency (millimeter wave) band of 24 GHz or more, etc., from a low-frequency band less than 1 GHz.

For clear description, LTE-1 or 5G NR is primarily described, but a technical spirit according to an embodiment of the present disclosure is not limited thereto.

Figure 1:
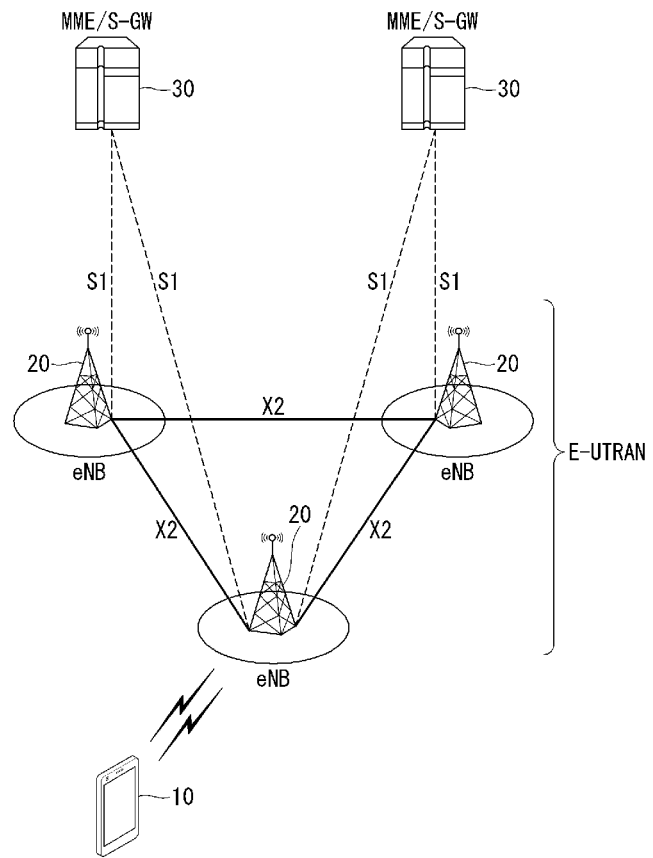
FIG. 1 illustrates a structure of an LTE system according to an embodiment of the present disclosure.

FIG. 1 illustrates a structure of an LTE system according to an embodiment of the present disclosure. The LTE system may be referred to as an evolved-UMTS terrestrial radio access network (E-UTRAN) or long term evolution (LTE)/LTE-A system.

Referring to FIG. 1, the E-UTRAN includes a base station (BS) 20 that provides a control plane and a user plane to a user equipment (UE) 10. The UE 10 may be fixed or mobile, and may be referred to as other terms such as a mobile station (MS), a user terminal (UT), a subscriber station (SS), a mobile terminal (MT), a wireless device, etc. The BS 20 may refer to a fixed station which communicates with the UE 10, and may be referred to as other terminologies such as an evolved-NodeB (eNB), a base transceiver system (BTS), an access point (AP), etc.

The BSs 20 may be interconnected via an X2 interface. The BS 20 is connected to an evolved packet core (EPC) 30 through an S1 interface, more particularly, to a mobility management entity (MME) through S1-MME and a serving gateway (S-GW) through S1-U.

The EPC 30 is constituted by of the MME, the S-GW, and a packet data network-gateway (P-GW). The MME has access information of the terminal or information on a capability of the terminal and the information is mainly used for managing the mobility of the UE. The S-GW is a gateway having the E-UTRAN as an end point and the P-GW is a gateway having a packet data network (PDN) as the end point.

Layers of a radio interface protocol between the UE and the network may be categorized into L1 (first layer), L2 (second layer), and L3 (third layer) based on three lower layers of an open system interconnection (OSI) reference model which is widely known in the communication system. Among them, a physical layer which belongs to the first layer provides an information transfer service using a physical channel, and a radio resource control (RRC) layer which is positioned in the third layer serves to control a radio resource between the UE and the network. To this end, the RRC layer exchanges an RRC message between the UE and the BS.

Figure 2:
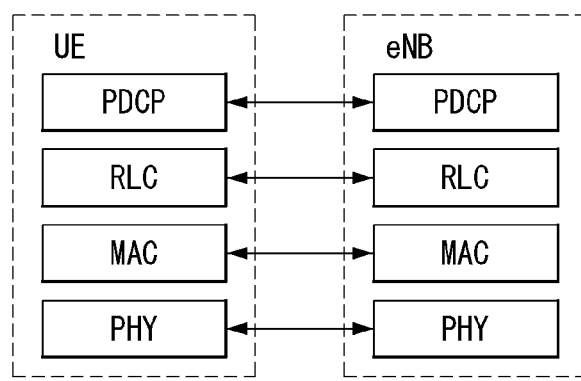
FIG. 2 illustrates radio protocol architecture for a user plane according to an embodiment of the present disclosure.

FIG. 2 illustrates a radio protocol architecture for a user plane according to an embodiment of the present disclosure.

Figure 3:
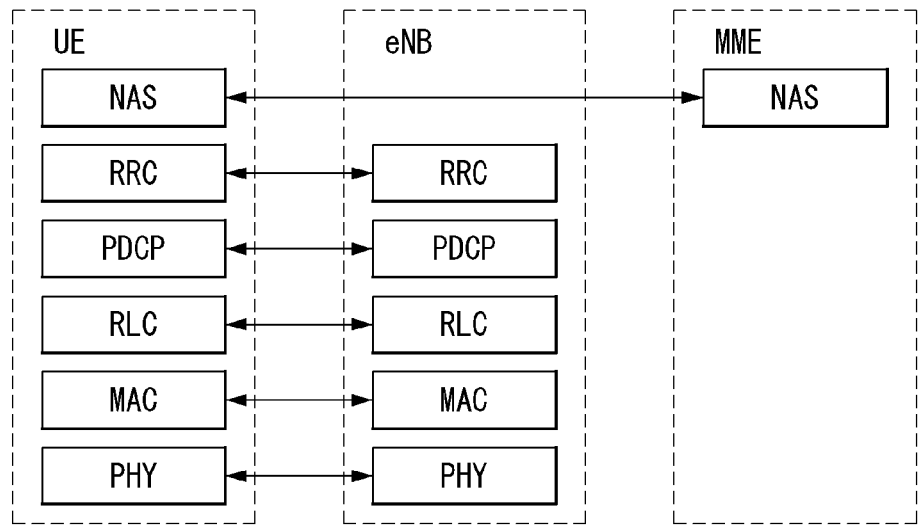
FIG. 3 illustrates radio protocol architecture for a control plane according to an embodiment of the present disclosure.

FIG. 3 illustrates radio protocol architecture for a control plane according to an embodiment of the present disclosure. The user plane is a protocol stack for transmitting user data and the control plane is a protocol stack for transmitting a control signal.

Referring to FIGS. 2 and 3, the physical layer provides the information transfer service to a higher layer by using the physical channel. The physical layer is connected to a medium access control (MAC) layer which is the upper layer through a transport channel. Data moves between the MAC layer and the physical layer through the transport channel. The transport channel is classified according to how the data is transmitted through a radio interface and what feature the data is transmitted.

Data move between different physical layers, that is, between the physical layers of a transmitter and a receiver through the physical channel. The physical channel may be modulated by an orthogonal frequency division multiplexing (OFDM) scheme and uses a time and a frequency as the radio resources.

The MAC layer provides a service to a radio link control (RLC) layer which is the higher layer through a logical channel. The MAC layer provides a mapping function from a plurality of logical channels to a plurality of transport channels. Further, the MAC layer provides a logical channel multiplexing function from the plurality of logical channels to a single transport channel. An MAC sub-layer provides the data transfer service on the logical channel.

An RLC layer performs concatenation, segmentation, and reassembly of an RLC service data unit (SDU). In order to guarantee various quality of service (QoS) required by a radio bearer (RB), the RLC layer provides three operating modes of a transparent mode (TM), an unacknowledged mode (UM), and an acknowledged mode (AM). The AM RLC provides error correction through an automatic repeat request (ARQ).

The radio resource control (RRC) layer is defined only in the control plane. The RRC layer serves to control the logical, transport, and physical channels in connection with configuration, re-configuration and release of the radio bearers. The RB means a logical path provided by the first layer (physical layer or PHY layer) and the second layer (MAC layer, RLC layer, or packet data convergence protocol (PDCP) layer) for data transfer between the UE and the network.

The function of the packet data convergence protocol (PDCP) layer in the user plane includes transmission of the user data, header compression, and ciphering. The function of the packet data convergence protocol (PDCP) layer in the control plane includes transmission of the control plane data and ciphering/integrity protection.

Configuring the RB means a process of defining the characteristics of the radio protocol layer and the channel to provide a specific service and configuring each specific parameter and operation method. The RB may be divided into a signaling radio bearer (SRB) and a data radio bearer (DRB) again. The SRB is used as a path for transmitting the RRC message in the control plane and the DRB is used as a path for transmitting the user data in the user plane.

When an RRC connection is established between the RRC layer of the UE and the RRC layer of the E-UTRAN, the UE is in an RRC_CONNECTED state and if not, the UE is in an RRC_IDLE state. In the case of NR, an RRC_INACTIVE state may be additionally defined, and a UE which is in the RRC_INACTIVE state may maintain a connection with a core network, while may release a connection with the BS.

A downlink transport channel for transmitting data from the network to the UE includes a broadcast channel (BCH) for transmitting system information and a downlink shared channel (SCH) for transmitting user traffic and a control message. The traffic or control message of a downlink multicast or broadcast service may be transmitted through a downlink SCH or may be transmitted via a separate downlink multicast channel (MCH). Meanwhile, an uplink transport channel for transmitting data from the network to the UE includes a random access channel (RACH) for transmitting an initial control message and an uplink shared channel (SCH) for transmitting other user traffic or control messages.

A logical channel which is above the transport channel and is mapped to the transport channel includes a Broadcast Control Channel (BCCH), a Paging Control Channel (PCCH), a Common Control Channel (CCCH), a Multicast Control Channel (MCCH), a Multicast Traffic Channel (MTCH), etc.

The physical channel is constituted by several OFDM symbols in a time domain and several sub-carriers in a frequency domain. One sub-frame is composed of the plurality of OFDM symbols in the time domain. A resource block as a resource allocation unit is constituted by the plurality of OFDM symbols and a plurality of sub-carriers. In addition, each subframe may use specific sub-carriers of specific OFDM symbols (e.g., first OFDM symbol) of the corresponding subframe for a physical downlink control channel (PDCCH), i.e., an LT/L2 control channel. A transmission time interval (TTI) is a time unit of subframe transmission.

Figure 4:
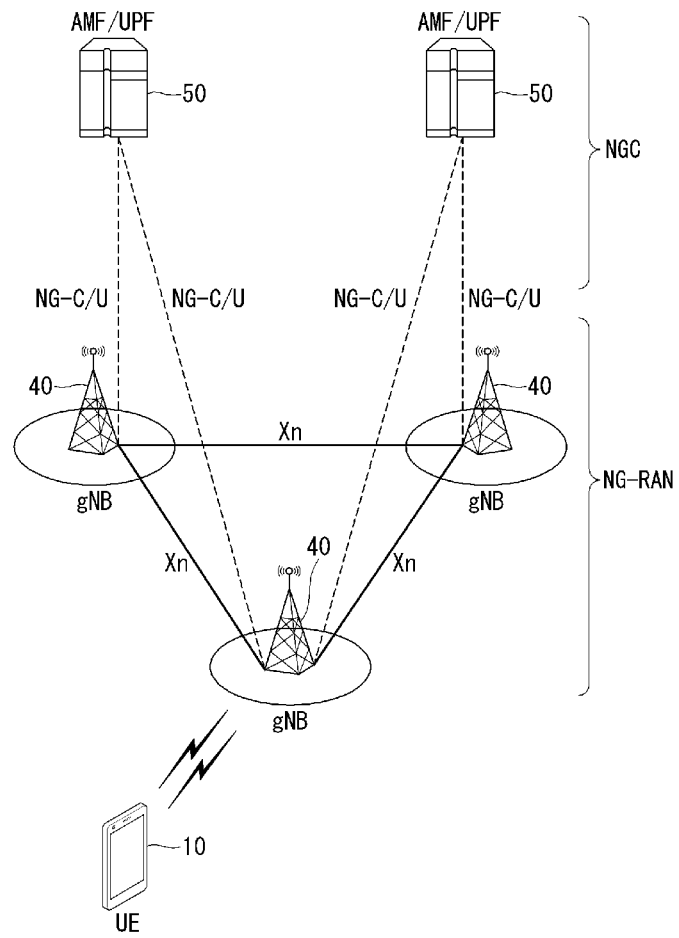
FIG. 4 illustrates a structure of an NR system according to an embodiment of the present disclosure.

FIG. 4 illustrates a structure of an NR system according to an embodiment of the present disclosure.

Referring to FIG. 4, the Next Generation—Radio Access Network (NG-RAN) may include next generation-Node B (gNB) and/or eNB which provide/provides user plane and control plane protocol terminations to the UE. FIG. 4 illustrates a case where the NG-RAN includes only the gNB. The gNB and the eNB are interconnected through an Xn interface. The gNB and the eNB are connected to a 5G core network (5GC) through an NG interface. More specifically, the gNB and the eNB are connected to access and mobility management function (AMF) through an NG-C interface and connected to a user plane function (UPF) through an NG-U interface.

Figure 5:
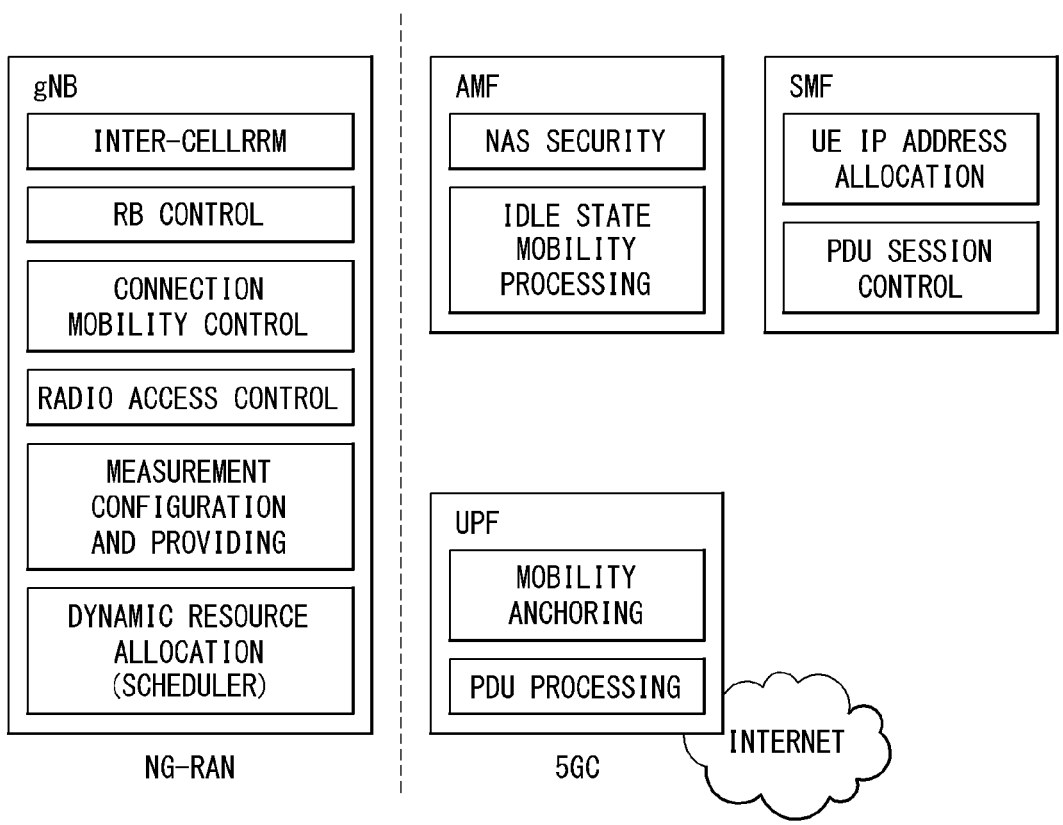
FIG. 5 illustrates a functional segmentation between NG-AN and 5 GC according to an embodiment of the present disclosure.

FIG. 5 illustrates a functional splitting between NG-RAN and 5GC according to an embodiment of the present disclosure.

Referring to FIG. 5, the gNB may provide functions including Inter Cell RRM, RB control, Connection Mobility Control, Radio Admission Control, Measurement configuration & Provision, dynamic resource allocation, etc. The AMF may provide functions including non access stratum (NAS) security, idle state mobility processing, etc. The UPF may provide functions including mobility anchoring, protocol data unit (PDU) processing, etc. The session management function (SMF) may provide functions including UE Internet protocol address allocation, PDU session control, etc.

Figure 6:
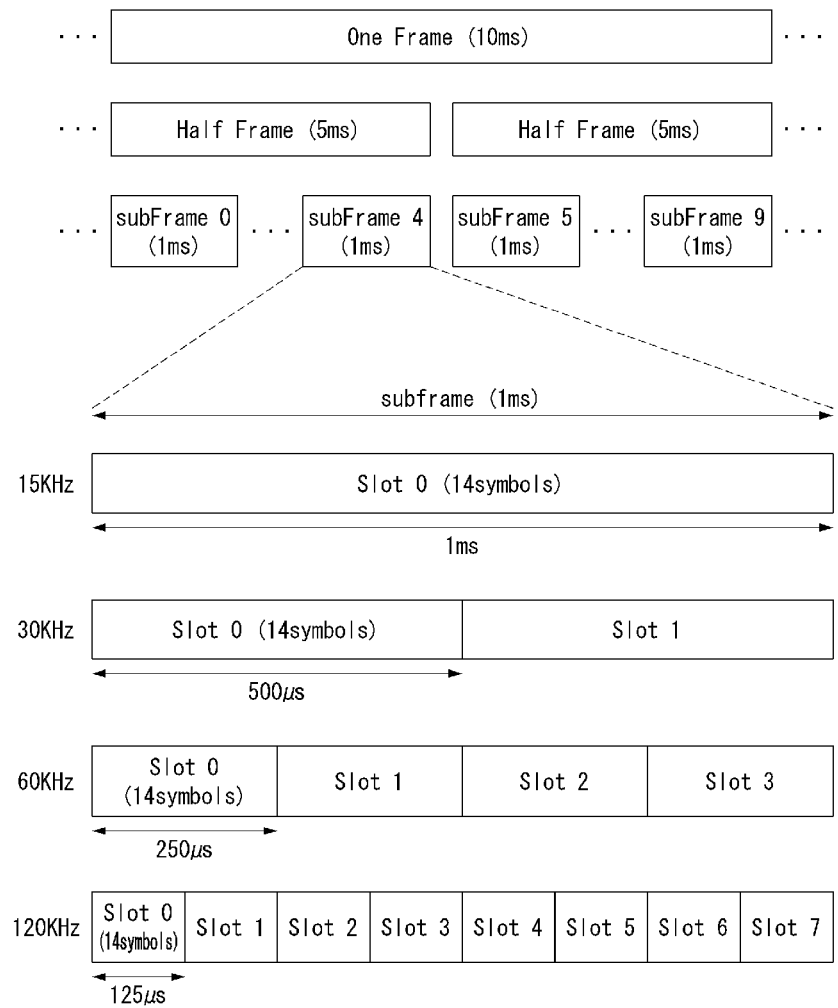
FIG. 6 illustrates an architecture of a radio frame of NR according to an embodiment of the present disclosure.

FIG. 6 illustrates an architecture of a radio frame of NR according to an embodiment of the present disclosure.

Referring to FIG. 6, the radio frame may be used for uplink and downlink transmissions in the NR. The radio frame may have a length of 10 ms and may be defined as two 5 ms half-frames (HFs). The half-frame may include 5 1 ms subframes (SFs). The subframe may be split into one or more slots, and the number of slots in the subframe may be determined according to a subcarrier spacing (SCS). Each slot may include 12 or 14 OFDM(A) symbols according to a cyclic prefix (CP).

When a normal CP is used, each slot may include 14 symbols. When an extended CP is used, each slot may include 12 symbols. Here, the symbol may include an OFDM symbol (or a CP-OFDM symbol and a single carrier-FDMA (SC-FDMA) symbol (or a discrete Fourier transform-spread-OFDM (DFT-s-OFDM) symbol).

Table 1 below shows the number of slots for each slot (Nslotsymb), the number of slots for each frame (Nframe, uslot), and the number of slots for each subframe (Nsubframe, uslot) according to an SCS configuration (u) when the normal CP is used.

TABLE 1

| SCS (15 * $2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows the number of symbols for each slot, the number of slots for each frame, and the number of slots for each subframe according to the SCS when the extended CP is used.

TABLE 2

| SCS (15 * $2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, OFDM(A) numerology (e.g., SCS, CP length, etc.) may be differently configured between a plurality of cells merged into one UE. As a result, an (absolute time) section of the time resource (e.g., subframe, slot or TTI) (for convenience, collectively referred to as Time Unit (TU)) constituted by the same number of symbols may be configured differently between the merged cells.

The NR supports multiple numerologies or SCSs for supporting various 5G services. For example, when the SCS is 15 kHz, a wide area in traditional cellular bands is supported and when the SCS is 30 kHz/60 kHz, dense-urban, lower latency, and wider carrier bandwidth are supported. When the SCS is 60 kHz or higher than 60 kHz, a bandwidth which is larger than 24.25 GHz may be supported in order to overcome phase noise.

An NR frequency band may be defined as frequency ranges of two types. Two types of frequency ranges may be FR1 and FR2. A numerical value of the frequency range may be changed, and for example, two types of frequency ranges may be shown in Table 3 below. FR1 in the frequency ranges used in the NR system may mean "sub 6 GHz range", and FR2 may mean "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the numerical value of the frequency range in the NR system may be changed. For example, FR1 may include a band of 410 MHz to 7125 MHz as in Table 4 below. That is, FR1 may include a frequency band of 6 GHz (or 5850, 5900, 5925 MHz, etc.) or more. Or example, a frequency band of 6 GHz (or 5850, 5900, 5925 MHz, etc.) or more included in FR1 may include an unlicensed band. The unlicensed band may be used for various usages, and for example, the unlicensed band may be used for communication (e.g., autonomous driving) for a vehicle.

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 7:
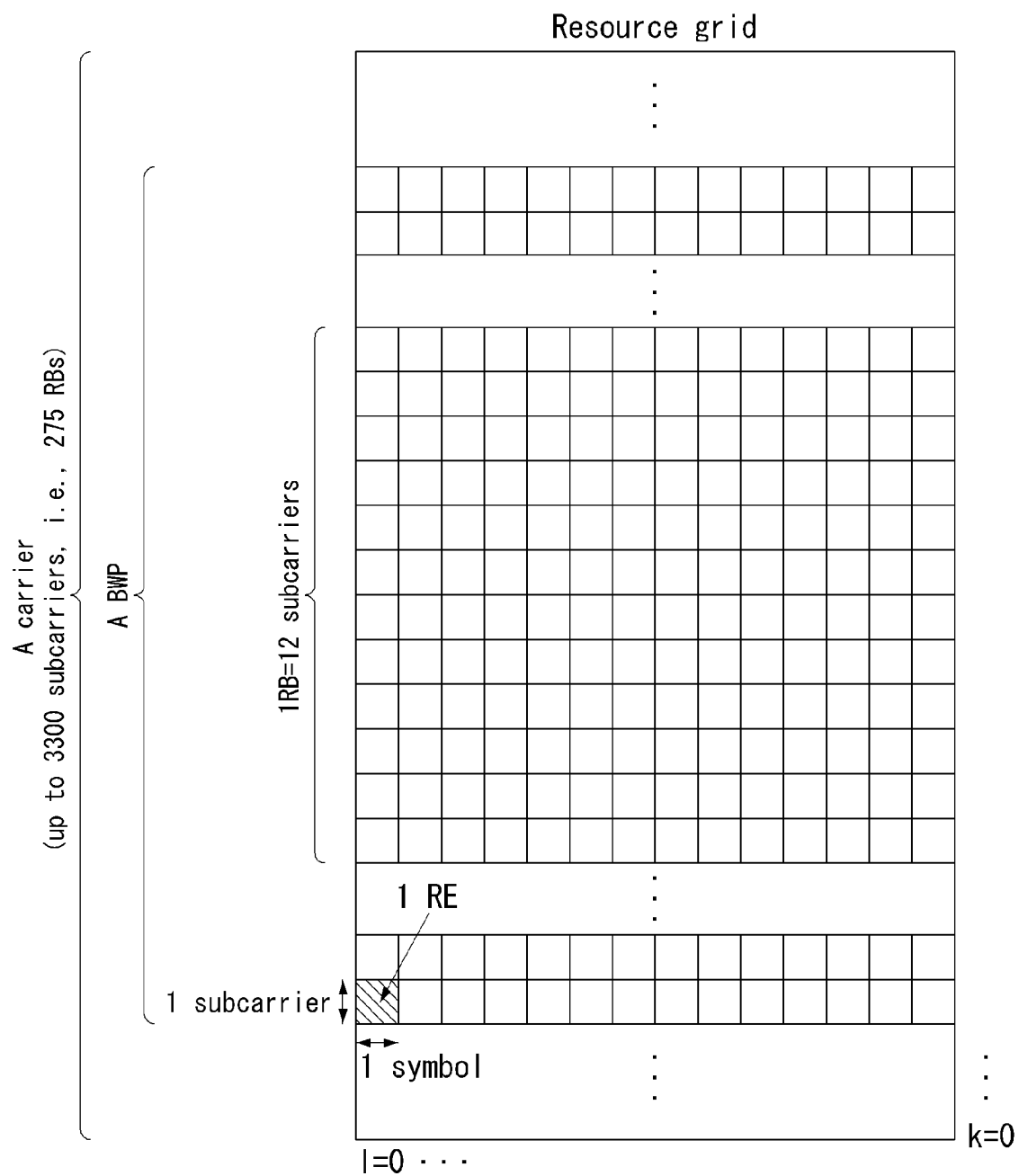
FIG. 7 illustrates a slot structure of an NR frame according to an embodiment of the present disclosure.

FIG. 7 illustrates a slot structure of an NR frame according to an embodiment of the present disclosure.

Referring to FIG. 7, the slot includes a plurality of symbols in a time domain. For example, in the case of the normal CP, one slot may include 14 symbols, but in the case of the extended CP, one slot may include 12 symbols. Alternatively, in the case of the normal CP, one slot may include 7 symbols, but in the case of the extended CP, one slot may include 6 symbols.

A carrier includes a plurality of subcarriers in the frequency domain. The resource block (RB) may be defined as a plurality of (e.g., 12) consecutive subcarriers in the frequency domain. A bandwidth part (BWP) may be defined as a plurality of consecutive physical resource blocks ((P)RBs) in the frequency domain and may correspond to one numerology (e.g., SCS, CP length, etc.). The carrier may include a maximum of N (e.g., 5) BWPs. Data communication may be performed through an activated BWP. In a resource grid, each element may be referred to as a resource element (RE) and one complex symbol may be mapped.

Meanwhile, a radio interface between the UE and the UE or a radio interface between the UE and the network may be constituted by the L1 layer, the L2 layer, and the L3 layer. In various embodiments of the present disclosure, the L1 layer may mean the physical layer. Further, for example, the L2 layer may mean at least one of the MAC layer, the RLC layer, the PDCP layer, and the SDAP layer. Further, for example the L3 layer may mean the RRC layer.

Hereinafter, the V2X or sidelink (SL) communication will be described.

Figure 8A:
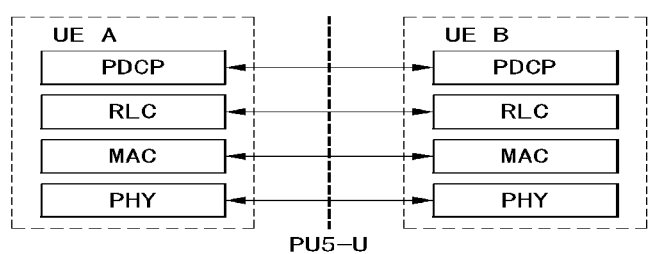
FIGS. 8A and 8B illustrate a radio protocol architecture for an SL communication according to an embodiment of the present disclosure.
Figure 8B:
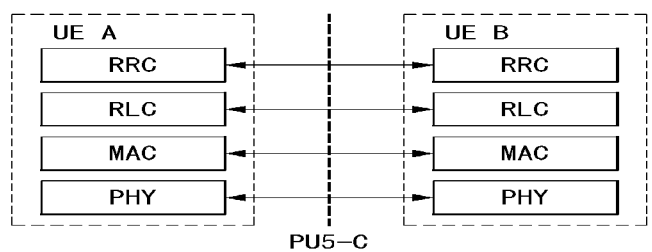

FIGS. 8A and 8B illustrate a radio protocol architecture for an SL communication according to an embodiment of the present disclosure. Specifically, FIG. 8A illustrates a user plane protocol stack of LTE and FIG. 8B illustrates a control plane protocol stack of LTE.

Figure 9A:
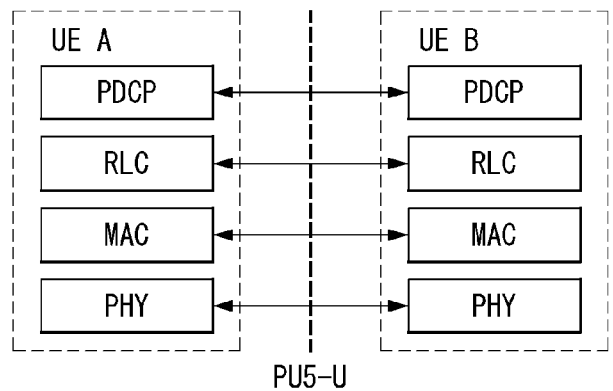
FIGS. 9A and 9B illustrate a radio protocol architecture for an SL communication according to an embodiment of the present disclosure.
Figure 9B:
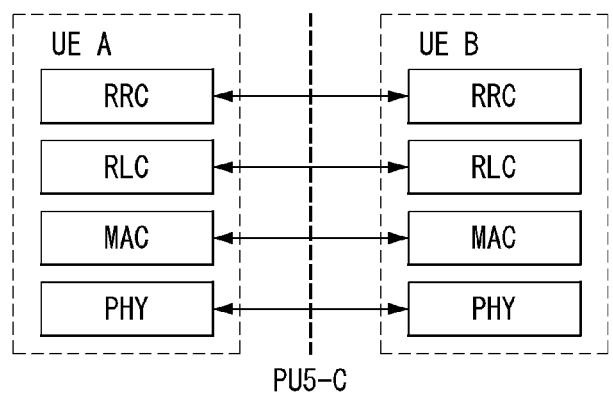

FIGS. 9A and 9B illustrate a radio protocol architecture for an SL communication according to an embodiment of the present disclosure. Specifically, FIG. 9A illustrates a user plane protocol stack of NR and FIG. 9B illustrates a control plane protocol stack of NR.

Hereinafter, a sidelink synchronization signal (SLSS) and synchronization information will be described.

The SLSS as a sidelink specific sequence may include a primary sidelink synchronization signal (PSSS) and a secondary sidelink synchronization signal (SSSS). The PSSS may be referred to as Sidelink Primary Synchronization Signal (S-PSS) and the SSSS may be referred to as Sidelink Secondary Synchronization Signal (S-SSS). For example, length-127 M-sequences may be used for the -SPSS and length-127 Gold sequences may be used for the S-SSS. For example, the UE may detect an initial signal (signal detection) by using the S-PSSS, and acquire a synchronization. For example, the UE may acquire a detailed synchronization by using the S-PSS and the S-SSS, and detect a synchronization signal ID.

Physical Sidelink Broadcast Channel (PSBCH) may be a (broadcasting) channel in which basic (system) information which the UE should first know before transmitting/receiving the SL signal is transmitted. For example, the basic information may be information related to the SLSS, a duplex mode (DM), a time division duplex uplink/downlink (TDD UL/DL) configuration, resource pool related information, the type of application related to the SLSS, a subframe offset, broadcasting information, etc. For example, for evaluating a PSBCH capability, a payload size of the PSBCH may be 56 bits including CRC of 24 bits.

The S-PSS, the S-SSS, and the PSBCH may be included in a block format (e.g., SL synchronization signal (SS)/PSBCH block, hereinafter, referred to as Sidelink-Synchronization Signal Block (S-SSB)) which supports periodic transmission. The S-SSB may have the same numerology (i.e., SCS and CP lengths) as Physical Sidelink Control Channel (PSCCH)/Physical Sidelink Shared Channel (PSSCH), and a transmissions bandwidth may be within (pre)configured slidelink (SL) BWP. For example, the bandwidth of the S-SSB may be 11 resource blocks (RBs). For example, the PSBCH may cover 11 RBs. In addition, a frequency position of the S-SSB may be (pre)configured. Accordingly, the UE need not perform hypothesis detection in the frequency in order to discover the S-SSB in the carrier.

Meanwhile, in the NR SL system, a plurality of numerologies having different SCS and/or CP lengths may be supported. In this case, as the SCS increases, a length of a time resource in which a transmitting UE transmits the S-SSB may be decreased. As a result, coverage of the S-SSB may be reduced. Accordingly, in order to guarantee the coverage of the S-SSB, the transmitting UE may transmit one or more S-SSBs to a receiving UE within one S-SSB transmission periodicity according to the SCS. For example, the number of S-SSBs which the transmitting UE transmits to the receiving UE within one S-SSB transmission periodicity may be pre-configured and configured to the transmitting UE. For example, the S-SSB transmission periodicity may be 160 ms. For example, for all SCSs, the S-SSB transmission periodicity of 160 ms may be supported.

For example, when the SCS is 15 kHz in FR1, the transmitting UE may transmit 1 or 2 S-SSBs to the receiving UE within one S-SSB transmission periodicity. For example, when the SCS is 30 kHz in FR1, the transmitting UE may transmit 1 or 2 S-SSBs to the receiving UE within one S-SSB transmission periodicity. For example, when the SCS is 60 kHz in FR1, the transmitting UE may transmit 1, 2, or 4 S-SSBs to the receiving UE within one S-SSB transmission periodicity.

For example, when the SCS is 60 kHz in FR2, the transmitting UE may transmit 1, 2, 4, 8, 16, or 32 S-SSBs to the receiving UE within one S-SSB transmission period. For example, when the SCS is 120 kHz in FR2, the transmitting UE may transmit 1, 2, 4, 8, 16, 32, or 64 S-SSBs to the receiving UE within one S-SSB transmission periodicity.

Meanwhile, when the SCS is 60 kHz, two types of CPs may be supported. Further, the structure of the S-SSB which the transmitting UE transmits to the receiving UE may vary depending on the CP type. For example, the CP type may be normal CP (NCP) or extended CP (ECP). Specifically, for example, when the CP type is the NCP, the number of symbols which map the PSBCH within the S-SSB transmitted by the transmitting UE may be 9 or 8. On the contrary, for example, when the CP type is the ECP, the number of symbols to which the PSBCH is mapped within the S-SSB transmitted by the transmitting UE may be 7 or 6. For example, the PBSCH may be mapped to a first symbol within the S-SSB transmitted by the transmitting UE. For example, the receiving UE that receives the S-SSB may perform an automatic gain control (AGC) operation during a first symbol period.

Figure 10:
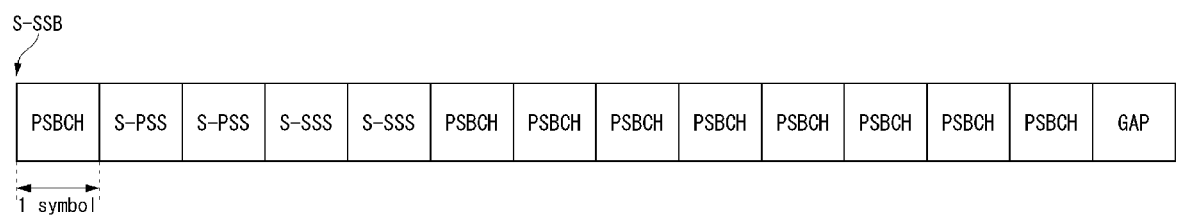
FIG. 10 illustrates a structure of S-SSB when a CP type is NCP according to an embodiment of the present disclosure.

FIG. 10 illustrates a structure of S-SSB when a CP type is NCP according to an embodiment of the present disclosure.

For example, when the CP type is the NCP, the structure of the S-SSB, i.e., an order of symbols to which the S-PSS, the S-SSS, and the PSBCH are mapped within the S-SSB transmitted by the transmitting UE may be described with reference to FIG. 10.

Figure 11:
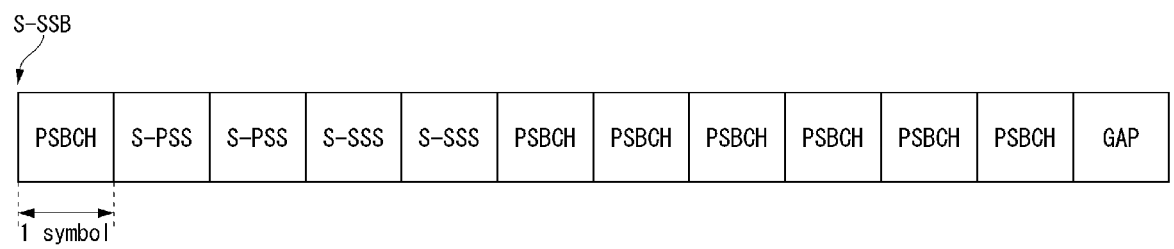
FIG. 11 illustrates a structure of S-SSB when the CP type is ECP according to an embodiment of the present disclosure.

FIG. 11 illustrates a structure of S-SSB when the CP type is ECP according to an embodiment of the present disclosure.

For example, when the CP type is the ECP, the number of symbols to which the transmitting UE maps the PSBCH after the S-SSS within the S-SSB may be 6 unlike FIG. 10. Accordingly, the coverage of the S-SSB may vary based on whether the CP type being the NCP or the ECP.

Meanwhile, each SLSS may have a Sidelink Synchronization Identifier (SLSS ID).

For example, in the case of LTE SL or LTE V2X, a value of the SLSS ID may be defined based on a combination of 2 different S-PSS sequences and 168 different S-SSS sequences. For example, the number of SLSS IDs may be 336. For example, the value of the SLSS ID may be any one of 0 to 335.

For example, in the case of NR SL or NR V2X, the value of the SLSS ID may be defined based on the combination of 2 different S-PSS sequences and 336 different S-SSS sequences. For example, the number of SLSS IDs may be 672. For example, the value of the SLSS ID may be any one of 0 to 671. For example, between 2 different S-PSSs, one S-PSS may be related to in-coverage and the other one S-PSS may be related to out-of-coverage. For example, SLSS IDs of 0 to 335 may be used in the in-coverage and SLSS IDs of 336 to 671 may be used in the outer-of-coverage.

Meanwhile, the transmitting UE needs to optimize transmission power according to a feature of each signal constituting the S-SSB in order to enhance an S-SSB receiving capability of the receiving UE. For example, the transmitting UE may determine a maximum power reduction (MPR) value for each signal according to a peak to average power ratio (PAPR) of each signal constituting the S-SSB. For example, when the PAPR values are different between the S-PSS and the S-SSS constituting the S-SSB, the transmissions UE may apply each optimal MPR value to the transmission of the S-PSS and the S-SSS in order to enhance the S-SSB receiving capability of the receiving UE. Further, for example, the transmissions UE may apply a transient period in order for the transmitting UE to perform an amplification operation for each signal. The transient period may preserve a time required for a transmitting end amplifier of the transmitting UE to perform a normal operation on a boundary on which the transmission power of the transmitting UE varies. For example, in the case of FR1, the transient period may be 10 us. For example, in the case of FR2, the transient period may be 5 us. For example, a search window for detecting the S-PSS by the receiving UE may be 80 ms and/or 160 ms.

Figure 12:
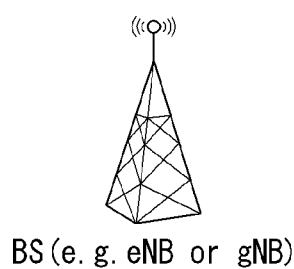
FIG. 12 illustrates a UE which performs a V2X or SL communication according to an embodiment of the present disclosure.
Figure 12:

FIG. 12 illustrates a UE which performs a V2X or SL communication according to an embodiment of the present disclosure.

Referring to FIG. 12, the terminology UE in the V2X or SL communication may primarily mean a UE of the user. However, when network equipment such as the BS transmits and receives signals according to a communication scheme between the UEs, the BS may also be regarded as a kind of UE. For example, UE 1 may be a first device 100 and UE 2 may be a second device 200.

For example, UE 1 may select a resource unit corresponding to a specific resource within a resource pool that means a set of a series of resources. In addition, UE 1 may transmit the SL signal by using the resource unit. For example, UE 2 which is the receiving UE may be configured with the resource pool in which UE 1 may transmit the signal, and may detect the signal of UE 1 within the resource pool.

Here, when UE 1 is within a connection range of the BS, the BS may announce the resource pool to UE 1. On the contrary, when UE1 is out of the connection range of the BS, another may announce the resource pool to UE 1 or UE 1 may use the pre-configured resource pool.

In general, the resource pool may include a plurality of resource units and each UE may select one or multiple resource units and use the selected resource units for SL signal transmission thereof.

FIG. 13 illustrates a resource unit for the V2X or SL communication according to an embodiment of the present disclosure.

Referring to FIG. 13, a total frequency resource of the resource pool may be segmented into NF frequency resources, and a total time resource of the resource pool may be segmented into NT time resources. Accordingly, a total of NF*NT resource units may be defined within the resource pool. FIG. 13 illustrates an example of a case where the corresponding resource pool is repeated at a periodicity of NT subframes.

As illustrated in FIG. 13, one resource unit (e.g., Unit #0) may be periodically repeated and shown. Alternatively, the index of the physical resource unit to which one logical resource unit is mapped may change in a predetermined pattern according to time in order to obtain a diversity effect in terms of the time or frequency. In such a resource unit structure, the resource pool may mean a set of resource units which the UE may use for transmitting the SL signal.

The resource pools described above may be subdivided into various types. For example, the resource pools may be categorized according to contents of the SL signal transmitted from each resource pool.

(1) Scheduling assignment (SA) may be a signal including a position of a resource used for transmitting an SL data channel by the transmitting UE, and information such as a modulation and coding scheme (MCS) or a multiple input multiple output (MIMO) transmission scheme, a timing advance (TA), etc., required for demodulation of other data channels. The SA is enabled to be multiplexed and transmitted jointly with the SL data on the same resource unit, and in this case, the SA resource pool may mean a resource pool in which the SA is multiplexed with the SL data, and transmitted. The SA may also be called an SL control channel.

(2) An SL data channel (Physical Sidelink Shared Channel (PSSCH)) may be a resource pool which the transmission unit uses for transmitting user data. When the SA is multiplexed and transmitted jointly with the SL data on the same resource unit, only the SL data channel in a form except for the SA information may be transmitted in a resource pool for the SL data channel. In other words, resource elements (REs) used for transmitting the SA information on an individual resource unit within the SA resource pool may still be used for transmitting the SL data in the resource pool of the SL data channel. For example, the transmitting UE may map PSSCH to consecutive PRBs and transmit the PSSCH mapped to the consecutive PRBs.

(3) The discovery channel may be a resource pool used for the transmitting UE to transmit information such as an ID thereof, etc. Through this, the transmitting UE may allow a contiguous UE to discover the transmitting UE.

Even when the content of the SL signal described above is the same, different resource pools may be used according to the transmission/reception properties of the SL signal. As one example, the same SL data channel or a discovery message may be categorized into different resource pools again according to a transmission timing determination scheme (e.g., whether the SL signal is transmitted at the time of receiving a synchronous reference signal or is transmitted by applying a predetermined timing advance at the point in time) of the SL signal or a resource allocation scheme (e.g., whether the BS assigns the transmission resource of the individual signals to an individual transmitting UE or whether the individual transmitting UE autonomously selects an individual signaling resource in the pool), a signal format (e.g., the number of symbols which each SL signal occupies in one subframe or the number of subframes used for transmitting one SL signal), a signal strength from the eNB, a transmission power intensity of the SL UE, and the like.

Hereinafter, resource allocation in the SL will be described.

FIGS. 14A and 14B illustrate a procedure of performing, by a UE, a V2X or SL communication based on a transmission mode according to an embodiment of the present disclosure. In various embodiments of the present disclosure, the transmission mode may be referred to as a mode or a resource allocation mode. Hereinafter, for convenience of description, the transmission in the LTE may be referred to as an LTE transmission mode and the transmission mode in the NR may be referred to as an NR resource allocation mode.

For example, FIG. 14A illustrates a UE operation related to LTE transmission mode 1 or LTE transmission mode 3. Alternatively, for example, FIG. 14A illustrates a UE operation related to NR resource allocation mode 1. For example, LTE transmission mode 1 may be applied to a general SL communication and LTE transmission mode 3 may be applied to the V2X communication.

For example, FIG. 14B illustrates a UE operation related to LTE transmission mode 2 or LTE transmission mode 4. Alternatively, for example, FIG. 14B illustrates a UE operation related to NR resource allocation mode 2.

Referring to FIG. 14A, in LTE transmission mode 1, LTE transmission mode 3, or NR resource allocation mode 1, the BS may schedule an SL resource to be used by the UE for SL transmission. For example, the BS may perform resource scheduling to UE 1 through PDCCH (more specifically, downlink control information (DCI)), and UE 1 may perform the V2X or SL communication with UE 2 according to the resource scheduling. For example, UE 1 may transmit, to UE 2, sidelink control information (SCI) through a physical sidelink control channel (PSCCH), and then transmit, to UE 2, data based on the SCI through a physical sidelink shared channel (PSSCH).

For example, in NR resource allocation mode 1, the UE may be provided or allocated with a resource for one or more SL transmissions of one transport block (TB) from the BS through a dynamic grant. For example, the BS may provide, to the UE, a resource for transmission of the PSCCH and/or PSSCH by using the dynamic grant. For example, the transmitting UE may report, to the BS, an SL Hybrid Automatic Repeat Request (HARQ) feedback received from the receiving UE. In this case, based on an indication within the PDCCH for allocating the resource for the SL transmission by the BS, a PUCCH resource and a timing for reporting the SL HARQ feedback to the BS may be determined.

For example, the DCI may represent a slot offset between DCI reception and first SL transmission scheduled by the DCI. For example, a minimum gap between the DCI for scheduling the SL transmission resource and a first scheduled SL transmission resource may not be smaller than a processing time of the corresponding UE.

For example, in NR resource allocation mode 1, the UE may be periodically provided or allocated with a resource set from the BS for a plurality of SL transmission through a configured grant. For example, the configured grant may include configured grant type 1 or configured grant type 2. For example, the UE may determine a TB to be transmitted in each occasion indicated by a given configured grant.

For example, the BS may allocate an SL resource to the UE on the same carrier and allocate the SL resource to the UE on different carriers.

For example, an NR BS may control an LTE based SL communication. For example, the NR BS may transmit, to the UE, NR DCI in order to schedule an LTE SL resource. In this case, for example, a new RNTI for scrambling the NR DCI may be defined. For example, the UE may include an NR SL module and an LTE SL module.

For example, the UE including the NR SL module and the LTE SL module may receive the NR SL DCI from gNB, and then the NR SL module may transform the NR SL DCI into LTE DCI type 5A and the NR SL module may transfer LTE DCI type 5A to the LTE SL module as a unit of X ms. For example, after the LTE SL module receives LTE DCI format 5A from the NR SL module, the LTE SL module may apply activation and/or release to a first LTE subframe after Z ms. For example, the X may be dynamically represented by using a field of the DCI. For example, a minimum value of the X may vary depending on a UE capability. For example, the UE may report a single value according to the UE capability. For example, the X may be a positive number.

Referring to FIG. 14B, in LTE transmission mode 2, LTE transmission mode 4, or NR resource allocation mode 2, the UE may determine the SL transmission resource within the SL resource configured by the BS/network or the pre-configured SL resource. For example, the configured SL resource or the pre-configured SL resource may be a resource pool. For example, the UE may autonomously select or schedule the resource for the SL transmission. For example, the UE selects the resource within the configured resource pool by itself to perform the SL communication. For example, the UE perform sensing and resource (re) selection procedures to autonomously select the resource within a selection window. For example, the sensing may be performed as a unit of a sub-channel. In addition, UE 1 which autonomously selects the resource within the resource pool may transmit the SCI to UE 2 through the PSCCH, and then transmit the SCI based data to UE 2 through the PSSCH.

For example, the UE may assist SL resource selection for another UE. For example, in NR resource allocation mode 2, the UE may be configured with a configured grant for the SL transmission. For example, in NR resource allocation mode 2, the UE may schedule the SL transmission of another UE. For example, in NR resource allocation mode 2, the UE may schedule the SL resource for blind retransmission.

For example, in NR resource allocation mode 2, a first UE may indicate a priority of the SL transmission to a second UE by using the SCI. For example, the second UE may decode the SCI, and the second UE may perform sensing and/or resource (re)selection based on the priority. For example, the resource (re)selection procedure may include identifying a candidate resource in the resource selection window and selecting a resource for (re)transmission among the identified candidate resources by the second UE. For example, the resource selection window may be a time interval during which the UE selects the resource for the SL transmission. For example, after the second UE triggers the resource (re)selection, the resource selection window may start at T1≥0, and the resource selection window may be limited by a remaining packet delay budget of the second UE. For example, in the step in which the second UE identifies the candidate resource in the resource selection window, when a specific resource is indicated by the SCI which the second UE receives from the first UE and an L1 SL RSRP measurement value for the specific resource is more than an SL RSRP threshold, the second UE may not determine the specific resource as the candidate resource. For example, the SL RSRP threshold may be determined based on a priority of the SL transmission indicated by the SCI which the second UE receives from the first UE and a priority of the SL transmission on the resource selected by the second UE.

For example, the L1 SL RSRP may be measured based on an SL demodulation reference signal (DMRS). For example, one or more PSSCH DMRS patterns may be configured or pre-configured in the time domain for each resource pool. For example, PDSCH DMRS configuration type 1 and/or type 2 may be the same as or similar to a frequency domain pattern of the PSSCH DMRS. For example, an accurate DMRS pattern may be indicated by the SCI. For example, in NR resource allocation mode 2, the transmitting UE may select a specific DMRS pattern among DMRS patterns configured or pre-configured for the resource pool.

For example, in NR resource allocation mode 2, the transmitting UE may perform initial transmission of a transport block (TB) without a reservation based on the sensing and resource (re)selection procedure. For example, based on the sensing and resource (re)selection procedure, the transmitting UE may reserve the SL resource for the initial transmission of a second TB by using the SCI related to a first TB.

For example, in NR resource allocation mode 2, the UE may reserve a resource for feedback based PSSCH retransmission through a signaling related to previous transmission of the same transport block (TB). For example, the maximum number of SL resources reserved by one transmission including current transmission may be 2, 3, or 4. For example, the maximum number of SL resources may be the same regardless of whether the HARQ feedback being enabled. For example, a maximum HARQ (re)transmission number for one TB may be limited by the configured or the pre-configuration. For example, the maximum HARQ (re) transmission number may be 32. For example, when there is no configuration or pre-configuration, the maximum HARQ (re)transmission number may not be designated. For example, the configuration or pre-configuration may be used for the transmitting UE. For example, in NR resource allocation mode 2, an HARQ feedback for releasing a resource not used by the UE may be supported.

For example, in NR resource allocation mode 2, the UE may indicate, to another UE, one or more sub-channels and/or slots used by the UE by using the SCI. For example, in NR resource allocation mode 2, the UE may indicate, to another UE, one or more sub-channels and/or slots used by the UE by using the SCI. For example, a minimum allocation unit of the SL resource may be the slot. For example, a size of the sub-channel may be configured or pre-configured for the UE.

Hereinafter, sidelink control information (SCI) will be described.

Control information which the BS transmits to the UE through the PDCCH may be referred to as downlink control information (DCI), while control information which the UE transmits to another UE through the PSCCH may be referred to as SCI. For example, the UE may know a start symbol of the PSCCH and/or the number of symbols of the PSCCH before decoding the PSCCH. For example, the SCI may include SL scheduling information. For example, the UE may transmit at least one SCI to another UE in order to schedule the PSSCH. For example, one or more SCI formats may be defined.

For example, the transmitting UE may transmit the SCI to the receiving UE on the PSCCH. The receiving UE may decode one SCI in order to receive the PSSCH from the transmitting UE.

For example, the transmitting UE may transmit, to the receiving UE, two consecutive SCIs (e.g., 2-stage SCI) on the PSCCH and/or PSSCH. The receiving UE may decode two consecutive SCIs (e.g., 2-stage SCI) in order to receive the PSSCH from the transmitting UE. For example, when SCI configuration fields are categorized into two groups by considering a (relatively) high SCI payload size, SCI including a first SCI configuration field group may be referred to as first SCI or $1^{st}$ SCI and SCI including a second SCI configuration field group may be referred to as second SCI or $2^{nd}$ SCI. For example, the transmitting UE may transmit the first SCI to the receiving UE through the PSCCH. For example, the transmitting UE may transmit the second SCI to the receiving UE on the PSCCH and/or PSSCH. For example, the second SCI may be transmitted to the receiving UE through (standalone) PSCCH or piggybacked and transmitted jointly with data through the PSSCH. For example, two consecutive SCIs may also be applied to different transmissions (e.g., unicast, broadcast, or groupcast).

For example, the transmitting UE may transmit some or all of the following information to the receiving UE through the SCI. Here, for example, the transmitting UE may transmit some or all of the following information to the receiving UE through the first SCI and/or the second SCI.

PSSCH and/or PSCCH related resource allocation information, e.g., a time/frequency resource location/number, resource reservation information (e.g., periodicity), and/or SL CSI report request indicator or SL (L1) RSRP (and/or SL (L1) RSRQ and/or SL (L1) RSSI) report request indicator, and/or SL CSI transmission indicator (on PSSCH) (or SL (L1) RSRP (and/or SL (L1) RSRQ and/or SL (L1) RSSI) information transmission indicator, and/or MCS information, and/or Transmission power information, and/or L1 destination ID information and/or L1 source ID information, and/or SL HARQ process ID information, and/or New data indicator (NDI) information, and/or Redundancy version (RV) information, and/or (Transmission traffic/packet related) QoS information, e.g., priority information, and/or SL CSI-RS transmission indicator or (transmitted) SL CSI-RS antenna port number information Positional information of the transmitting UE or position (or distance area) information of a target receiving UE (requesting the SL HARQ feedback), and/or Reference signal (e.g., DMRS, etc.) information related to decoding of data transmitted through the PSSCH and/or channel estimation, e.g., information related to a pattern of a (time-frequency) mapping resource of the DMRS, rank information, antenna port index information;

For example, the first SCI include information related to channel sensing. For example, the receiving UE may decode the second SCI by using the PSSCH DMRS. A polar code used for the PDCCH may be applied to the second SCI. For example, in the resource pool, the payload size of the first SCI may be equally applied to a unicast, a groupcast, and a broadcast. After decoding the first SCI, the receiving UE need not perform blind decoding of the second SCI. For example, the first SCI may include scheduling information of the second SCI.

In various embodiments of the present disclosure, since the transmitting UE may transmit, to the receiving UE, at least any one of the SCI, the first SCI, and/or the second SCI, the PSCCH may be replaced/substituted with at least any one of the SCI, the first SCI, and/or the second SCI. And/or, for example, the SCI may be replaced/substituted with at least any one of the PSCCH, the first SCI, and/or the second SCI. And/or, for example, since the transmitting UE may transmit, to the receiving UE, the second SCI through the PSSCH, the PSSCH may be replaced/substituted with the second SCI.

Meanwhile, FIGS. 15A through 15C illustrates three cast types according to an embodiment of the present disclosure.

Specifically, FIG. 15A illustrates a broadcast type SL communication, FIG. 15B illustrates a unicast type SL communication, and FIG. 15C illustrates a groupcast type SL communication. In the case of the unicast type SL communication, the UE may perform a one-to-one communication with another UE. In the case of the groupcast type SL communication, the UE may perform the SL communication with one or more UEs in a group to which the UE belongs. In various embodiments of the present disclosure, the SL groupcast communication may be substituted with an SL multicast communication, an SL one-to-many communication, etc.

Hereinafter, in-device coexistence of LTE SL and NR SL will be described.

FIG. 16 illustrates a UE including an LTE module and an NR module according to an embodiment of the present disclosure.

Referring to FIG. 16, the UE may include an LTE SL transmission related module and an NR SL transmission related module. An LTE SL transmission related packet generated in the higher layer may be transferred to the LTE module. An NR SL transmission related packet generated in the higher layer may be transferred to the NR module. Here, for example, the LTE module and the NR module may be related to a common higher layer (e.g., an application layer). Alternatively, for example, the LTE module and the NR module may be related to different higher layers (e.g., an LTE module related higher layer and an NR module related higher layer). Each packet may be related to a specific priority. In this case, the LTE module may not know the priority of the NR SL transmission related packet and the NR module may not know the priority of the LTE SL transmission related packet. For a comparison of the priority, the priority of the LTE SL transmission related packet and the priority of the NR SL transmission related packet may be exchanged between the LTE module and the NR module. Accordingly, the LTE module and the NR module may know the LTE SL transmission related packet and the priority of the NR SL transmission related packet. In addition, when the LTE SL transmission and the NR SL transmission are overlapped, the UE may perform only SL transmission related to a higher priority by comparing the priority of the LTE SL transmission related packet and the priority of the NR SL transmission related packet. For example, an NR V2X priority field and PPPP may be directly compared with each other.

For example, Table 5 illustrates one example of a priority of an LTE SL transmission related service and a priority of an NR SL transmission related service. For convenience of description, the priority is described based on the PPPP, but the priority is not limited to the PPPP. For example, the priority may be defined by various schemes. For example, the same type of common priority may be applied to an NR related service and an LTE related service.

TABLE 5

| LTE related service | PPPP value | NR related service | PPPP value |
|---|---|---|---|
| LTE SL service A | 1 | NR SL service D | 1 |
| LTE SL service B | 2 | NR SL service E | 2 |
| LTE SL service C | 3 | NR SL service F | 3 |

For example, in the embodiment of Table 5, the UE is determined to transmit LTE SL service A and NR SL service E, and it is assumed that transmission for LTE SL service A and transmission for NR SL service E are overlapped. For example, the transmission for LTE SL service A and the transmission for NR SL service E may be partially or wholly overlapped in the time domain. In this case, the UE may perform only the SL transmission related to the higher priority and omit SL transmission related to a lower priority. For example, the UE may transmit only LTE SL service A on a first carrier and/or a first channel. On the contrary, the UE may not transmit NR SL service E on a second carrier and/or a second channel.

Hereinafter, a cooperative awareness message (CAM) and a decentralized environmental notification message (DENM) will be described.

In vehicle-to-vehicle communication, a periodic message type of CAM, an event triggered message type of DENM, etc., may be transmitted. The CAM may include basic vehicle information including dynamic state information of the vehicle, such as a direction or a velocity, vehicular static data such as a size, an external illumination state, a route history, etc. The size of the CAM may be 50 to 300 bytes. The CAM is broadcasted, and a latency should be smaller than 100 ms. The DENM may be a message generated in an unexpected situation such as a trouble, an accident, etc., of the vehicle. The size of the DENM may be smaller than 300 bytes, and all vehicles within a transmission range may receive messages. In this case, the DENM may have a higher priority than the CAM.

Hereinafter, carrier re-selection will be described.

In the V2X or SL communication, the UE may perform carrier re-selection based on a channel busy ratio (CBR) of configured carriers and/or a prose per-packet priority (PPPP) of a V2X message to be transmitted. For example, the carrier re-selection may be performed by the MAC layer of the UE. In various embodiments of the present disclosure, the prose per-packet priority (PPPP) may be substituted with a prose per-packet reliability (PPPR), and the PPPR may be substituted with the PPPP. For example, as a PPPP value is smaller, the PPPP value may mean a higher priority and as the PPPP value is larger, the PPPP value may mean a lower priority. For example, as a PPPR value is smaller, the PPPR value may mean a higher reliability and as the PPPR value is larger, the PPPR value may mean a lower reliability. For example, a PPPP value related to a service, a packet, or a message related to the higher priority may be smaller than a PPPP value related to a service, a packet, or a message related to the lower priority. For example, a PPPR value related to a service, a packet, or a message related to the higher reliability may be smaller than a PPPR value related to a service, a packet, or a message related to the lower reliability.

The CBR may mean the portion of sub-channels in a resource pool in which it is sensed that a Sidelink-Received Signal Strength Indicator (S-RSSI) measured by the UE exceeds a preconfigured threshold. There may be PPPP related to each logical channel, and a latency required for both the UE and the BS should be reflected to a configuration of a PPPP value. During the carrier re-selection, the UE may select one or more carriers among candidate carriers in an increasing order from a lowest CBR.

Hereinafter, RRC connection establishment between the UEs will be described.

For the V2X or SL communication, the transmitting UE may be required to establish a (PC5) RRC connection with the receiving UE. For example, the UE may acquire V2X-specific SIB. For a UE configured to transmit the V2X or SL communication by the higher layer, which has data to transmitted, when a frequency configured for the UE to transmit is at least included in the V2X-specific SIB, the UE may establish an RRC connection with another UE without including a transmission resource pool for the corresponding frequency. For example, when the RRC connection is established between the transmitting UE and the receiving UE, the transmitting UE may perform the unicast communication with the receiving UE through the established RRC connection.

When the RRC connection is established between the UEs, the transmitting UE may transmit the RRC message to the receiving UE.

Figure 17:
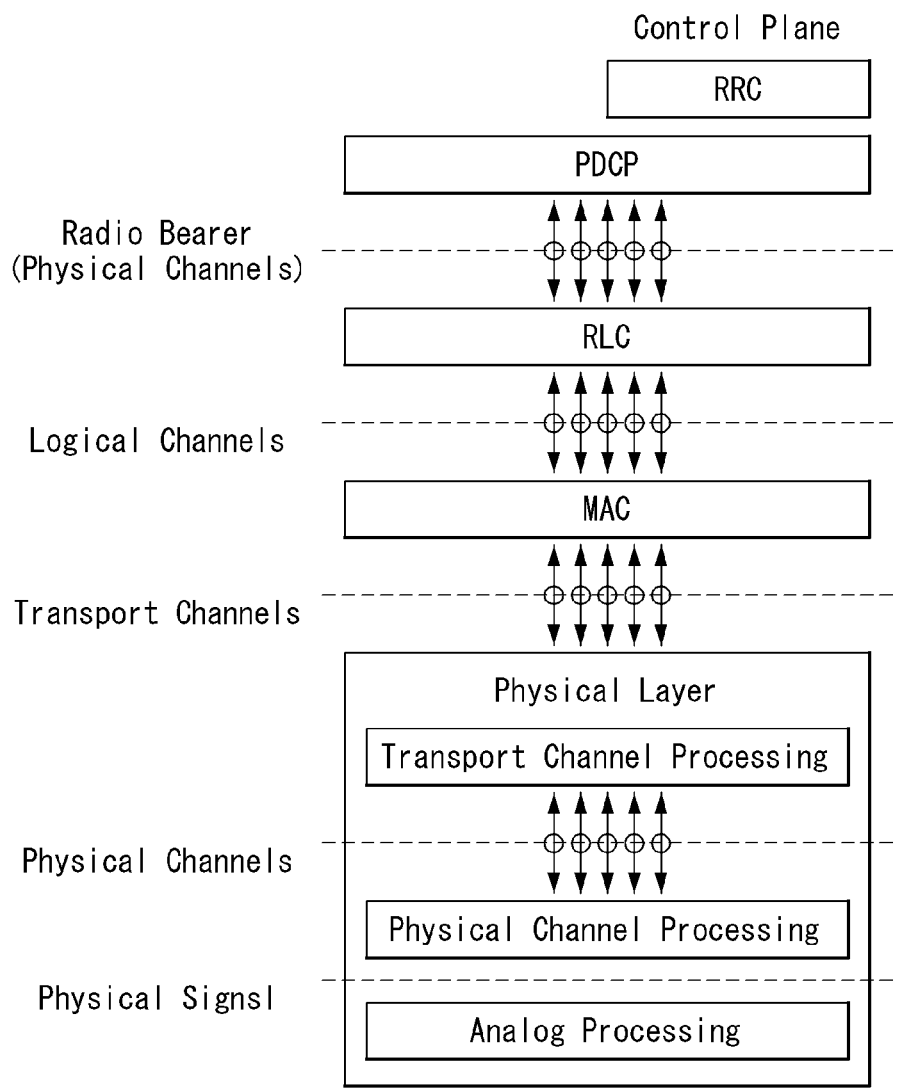
FIG. 17 illustrates a transmission procedure of an RRC message according to an embodiment of the present disclosure.

FIG. 17 illustrates a transmission procedure of an RRC message according to an embodiment of the present disclosure.

Referring to FIG. 17, the RRC message generated by the transmitting UE may be transferred to the PHY layer via the PDCP layer, the RLC layer, and the MAC layer. The RRC message may be transmitted through a signaling radio bearer (SRB). In addition, the PHY layer of the transmitting UE may perform coding, modulation, and antenna/resource mapping for transferred information, and the transmitting UE may transmit the corresponding information to the receiving UE.

The receiving UE may perform antenna/resource demapping, modulation, and decoding for the received information. The corresponding information may be transferred to the RRC layer via the MAC layer, the RLC layer, and the PDCP layer. Accordingly, the receiving UE may receive the RRC message generated by the transmitting UE.

The V2X or SL communication may be supported for an RRC_CONNECTED mode UE, an RRC_IDLE mode UE, and an (NR) RRC_INACTIVE mode UE. That is, the RRC_CONNECTED mode UE, the RRC_IDLE mode UE, and the (NR) RRC_INACTIVE mode UE may perform the V2X or SL communication. The RRC_INACTIVE mode UE or the RRC_IDLE mode UE may perform the V2X or SL communication by using a cell-specific configuration included in SIB specific to the V2X.

The RRC may be at least used for exchanging a UE capability and an AS layer configuration. For example, the first UE may transmit, to the second UE, the UE capability and the AS layer configuration of the first UE, and the first UE may receive, from the second UE, the UE capability and the AS layer configuration of the second UE. In the case of transferring the UE capability, an information flow may be triggered during or after PC5-S signaling for direct link setup.

Figure 18:
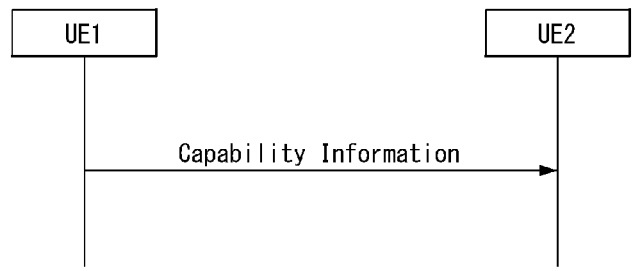
FIG. 18 illustrates a unidirectional type of UE capability transfer according to an embodiment of the present disclosure.

FIG. 18 illustrates a unidirectional type of UE capability transfer according to an embodiment of the present disclosure.

Figure 19:
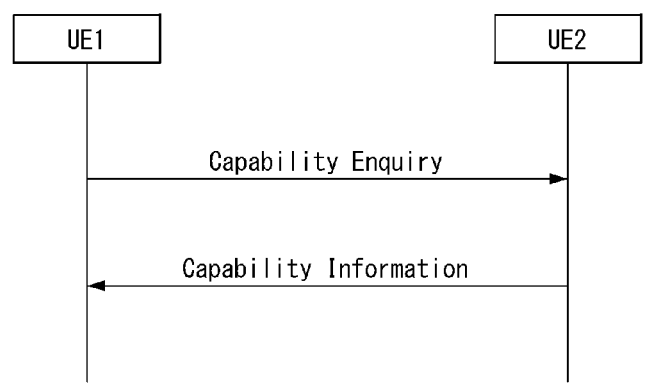
FIG. 19 illustrates a bidirectional type of UE capability transfer according to an embodiment of the present disclosure.

FIG. 19 illustrates a bidirectional type of UE capability transfer according to an embodiment of the present disclosure.

In the case of the AS layer configuration, the information flow may be triggered during or after the PC5-S signaling for the direct link setup.

Figure 20:
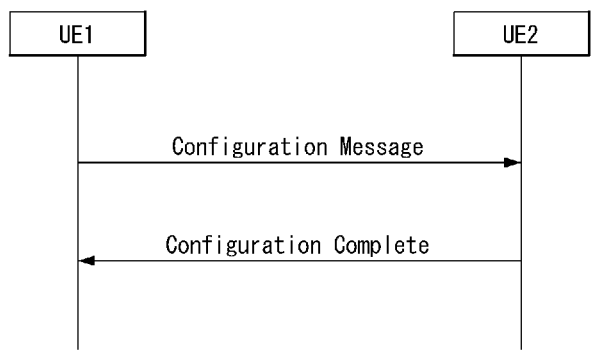
FIG. 20 illustrates a bidirectional type of AS layer configuration according to an embodiment of the present disclosure.

FIG. 20 illustrates a bidirectional type of AS layer configuration according to an embodiment of the present disclosure.

In the case of the groupcast, one-to-many PC5-RRC connection establishment may not be required between group members.

Hereinafter, SL radio link monitoring (RLM) will be described.

In the case of AS-level link management of the unicast, SL radio link monitoring (RLM) and/or radio link failure (RLF) declaration may be supported. In the case of an RLC acknowledged mode (AM) in an SL unicast, the RLF declaration may be triggered by an indication from the RLC representing that the maximum retransmission number is reached. An AS-level link status (e.g., failure) should be able to be announced to the higher layer. Unlike the RLM procedure for the unicast, a groupcast related RLM design may not be considered. The RLM and/or the RLF declaration may not be required between group members for the groupcast.

For example, the transmitting UE may transmit a reference signal to the receiving UE, and the receiving UE may perform the SL RLM by using the reference signal. For example, the receiving UE may declare the SL RLF by using the reference signal. For example, the reference signal may be referred to as an SL reference signal.

Hereinafter, SL measurement and reporting will be described.

SL measurement and reporting (e.g., RSRP and RSRQ) between the UEs may be considered, for purposes such as QoS prediction, initial transmission parameter setting, link adaptation, link management, admission control, etc. For example, the receiving UE may receive the reference signal from the transmitting UE, and the receiving UE may measure a channel state for the transmitting UE based on the reference signal. In addition, the receiving UE may report channel state information (CSI) to the transmitting UE. SL related measurement and reporting may include measurement and reporting of the CBR, and reporting of positional information. An example of channel state information (CSI) for the V2X may be Channel Quality Indicator (CQI), Precoding Matrix Index (PMI), Rank Indicator (RI), Reference Signal Received Power (RSRP), Reference Signal Received Quality (RSRQ), pathgain/pathloss, Sounding Reference Symbols (SRS), Sounding Resource Indicator (SRI), SI-RS Resource Indicator (CRI), interference condition, vehicle motion, etc. In the case of the unicast communication, the CQI, the RI, and the PMI or some thereof may be supported in non-subband-based aperiodic CSI report assuming four or less antenna ports. The CSI procedure may not depend on a standard alone RS. The CSI report may be activated and deactivated according to the configuration.

For example, the transmitting UE may transmit the CSI-RS to the receiving UE, and the receiving UE may measure the CQI or the RI by using the CSI-RS. For example, the CSI-S may be referred to as SL-CSI-RS. For example, the CSI-RS may be configured within PSSCH transmission. For example, the transmitting UE may transmit the CSI-RS included in the PSSCH resource to the receiving UE.

Hereinafter, a physical layer processing will be described.

According to an embodiment of the present disclosure, a data unit may become a target of a physical layer processing at a transmitting side before being transmitted through a radio interface. According to an embodiment of the present disclosure, a radio signal carrying the data unit may become a target of the physical layer processing at a receiving side.

Figure 21:
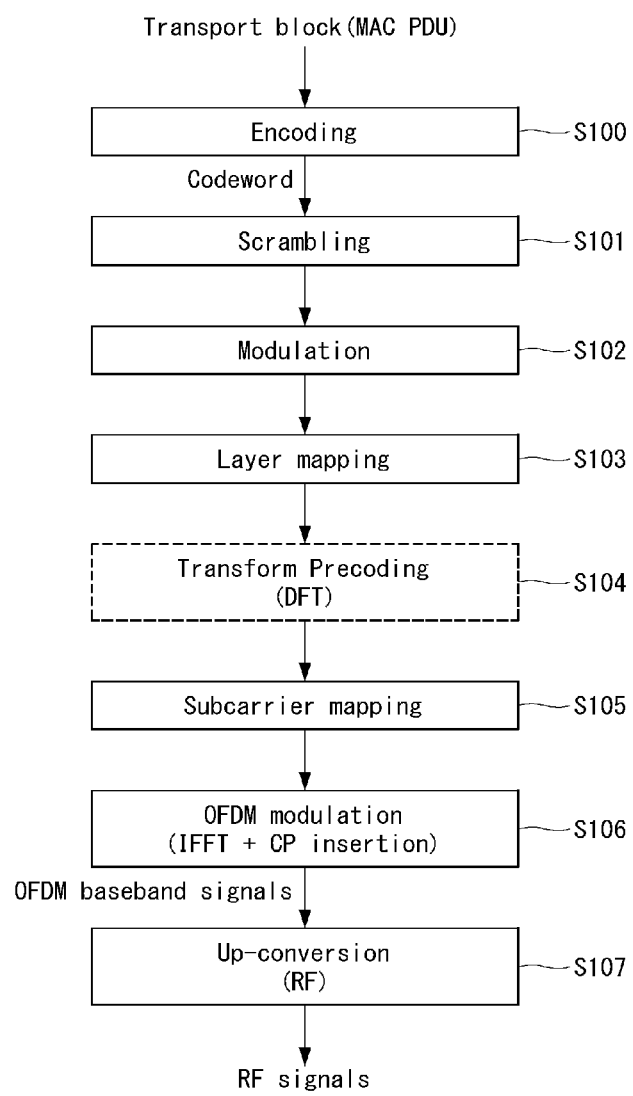
FIG. 21 illustrates a transmission-side physical layer processing according to an embodiment of the present disclosure.

FIG. 21 illustrates a transmitting-side physical layer processing according to an embodiment of the present disclosure.

Table 6 may show a mapping relationship between an uplink transport channel and a physical channel, and Table 7 may show a mapping relationship between uplink control channel information and the physical channel.

TABLE 6

| Transport channel | Physical channel |
|---|---|
| UL-SCH (Uplink-Shared Channel) | PUSCH (Physical Uplink Shared Channel) |
| RACH (Random Access Channel) | PRACH (Physical Random Access Channel) |

TABLE 7

| Control information | Physical channel |
|---|---|
| UCI (Uplink Control Information) | PUCCH (Physical Uplink Control Channel) PUSCH (Physical Uplink Shared Channel) |

Table 8 may show a mapping relationship between a downlink transport channel and the physical channel, and Table 9 may show a mapping relationship between downlink control channel information and the physical channel.

TABLE 8

| Transport channel | Physical channel |
|---|---|
| DL-SCH (Downlink-Shared Channel) | PDSCH (Physical Downlink Shared Channel) |
| BCH (Broadcast Channel) | PBCH (Physical Broadcast Channel) |
| PCH (Paging Channel) | PDSCH (Physical Downlink Shared Channel) |

TABLE 9

| Control information | Physical channel |
|---|---|
| DCI (Downlink Control Information) | PDCCH (Physical Downlink Control Channel) |

Table 10 may show a mapping relationship between an SL transport channel and the physical channel, and Table 11 may show a mapping relationship between control channel information and the physical channel.

TABLE 10

| Transport channel | Physical channel |
|---|---|
| SL-SCH (Sidelink-Shared Channel) | PSSCH (Physical Sidelink Shared Channel) |
| SL-BCH (Sidelink-Broadcast Channel) | PSBCH (Physical Sidelink Broadcast Channel) |

TABLE 11

| Control information | Physical channel |
|---|---|
| SCI (Sidelink Control Information) | PSCCH (Physical Sidelink Control Channel) |

Referring to FIG. 21, in step S100, the transmitting side may perform encoding for a transport block (TB). Data and a control stream from the MAC layer may be encoded to provide transport and control services through a radio transmission link in the PHY layer. For example, the TB from the MAC layer may be encoded to a codeword at the transmitting side. A channel coding scheme may be error detection, error correcting, rate matching, interleaving, and a combination of control information separated from the physical channel, and the transport channel. Alternatively, the channel coding scheme may be the error detection, the error correcting, the rate matching, the interleaving, and a combination of control information mapped onto the physical channel, and the transport channel.

In the NR system, the following channel coding scheme may be used for different types of the transport channel and different types of the control information. For example, a channel coding scheme for each transport channel type may be shown in Table 12. For example, a channel coding scheme for each control information type may be shown in Table 13.

TABLE 12

| Transport channel | Channel coding scheme |
|---|---|
| UL-SCH | LDPC(Low Density Parity Check) |
| DL-SCH | |
| SL-SCH | |
| PCH | |
| BCH | Polar code |
| SL-BCH | |

TABLE 13

| Control information | Channel coding scheme |
|---|---|
| DCI | Polar code |
| SCI | |
| UCI | Block code, Polar code |

For example, the polar code may be applied to the PSCCH. For example, an LDPC code may be applied to the TB transmitted through the PSSCH.

For transmission of the TB (e.g., MAC PDU), the transmitting side may attach a cyclic redundancy check (CRC) sequence to the TB. Accordingly, the transmitting side may provide the error detection to the receiving side. In the SL communication, the transmitting side may be the transmitting UE and the receiving side may be the receiving UE. In the NR system, a communication apparatus may use the LDPC code for encoding/decoding UL-SCH and DL-SCH. The NR system may support two LDPC base graphs (i.e., two LDPC base matrices). Two LDPC base graphs may be LDPC base graph 1 optimized for a small TB and an LDPC base graph 2 for a large TB. The transmitting side may select LDPC base graph 1 or 2 based on a size of the TB and a coding rate (R). The coding rate may be indicated by a modulation coding scheme (MCS) index I_MCS. The MCS index may be dynamically provided to the UE by PDCCH for scheduling the PUSCH or PDSCH. Alternatively, the MCS index may be dynamically provided to the UE by PDCCH for (re)initializing or activating UL configured grant 2 or DL SPS. The MCS index may be provided to the UE by RRC signaling related to UL configured grant type 1. When the TB to which the CRC is attached is larger than a maximum code block size for the selected LDPC base graph, the transmitting side may segment the TB to which the CRC is attached into a plurality of code blocks. In addition, the transmitting side may attach an additional CRC sequence to each code block. Maximum code block sizes for LDPC base graph 1 and LDPC base graph 2 may be 8448 bits and 3480 bits, respectively. When the TB to which the CRC is attached is not larger than the maximum code block size for the selected LDPC base graph, the transmitting side may encode the TB to which the CRC is attached into the selected LDPC base graph. The transmitting side may encode each code block of the TB into the selected LDPC base graph. In addition, LDPC coded blocks may be individually rate-matched. Code bock connection may be performed in order to generate a codeword for transmission on the PDSCH or PUSCH. For the PDSCH, up two codewords (i.e., up to two TBs) may be simultaneously transmitted on the PDSCH. The PUSCH may be used for transmission of UL-SCH data and layer 1 and/or 2 control information. Although not illustrated in FIG. 21, the layer 1 and/or 2 control information may be multiplexed with the codeword for the U-SCH data.

In steps S101 and S102, the transmitting side may perform scrambling and modulation for the codeword. Bits of the codeword may be scrambled and modulated in order to generate a block of a complex-valued modulation symbol.

In step S103, the transmitting side may perform layer mapping. Complex-valued modulation symbols of the codeword may be mapped to one or more multiple input multiple output (MIMO) layers. The codeword may be mapped to up to four layers. The PDSCH may carry two codewords, and as a result, the PDSCH may support up to 8-layer transmission. The PUSCH may support a single codeword, and as a result, the PUSCH may support up to 4-layer transmission.

In step S104, the transmitting side may perform precoding transform. A downlink transmission waveform may be general Orthogonal Frequency Division Multiplexing (OFDM) using a cyclic prefix (CP). Transform precoding (i.e., Discrete Fourier Transform (DFT) may not be applied to downlink.

An uplink transmission waveform may be conventional OFDM using a CP having a transform precoding function performing DFT spreading which may be disabled or enabled. In the NR system, when the DFT spreading is enabled, the transform precoding may be selectively applied to uplink. The transform precoding may be spreading uplink data by a particular scheme in order to reduce a peak-to-average power ratio (PAPR). The transform precoding may be one type of the DFT. That is, the NR system may support two options for an uplink waveform. One may be CP-OFDM (the same as a DL waveform) and the other one may be DFT-s-OFDM. Whether the UE should use the CP-OFDM or the DFT-s-OFDM may be determined by the BS through the RRC parameter.

In step S105, the transmitting side may perform subcarrier mapping. The layer may be mapped to the antenna port. In the downlink, for layer to antenna port mapping, transparent manner (non-codebook based) mapping may be supported, and how beamforming or MIMO precoding is performed may be transparent to the UE. In the uplink, for the layer to antenna port mapping, both non-codebook based mapping and codebook based mapping may be supported.

Each antenna port (i.e., layer) used for transmission of the physical channel (e.g., PDSCH, PUSCH, and PSSCH), the transmitting side may map the complex-valued modulation symbols to subcarriers within a resource block allocated to the physical channel.

In step S106, the transmitting side may perform OFDM modulation. The transmitting-side communication apparatus adds the CP and performs Inverse Fast Fourier Transform (IFFT) to generate a subcarrier spacing configuration u for time-consecutive OFDM baseband signals and an OFDM symbol 1 within the TTI for the physical channel on the antenna port p. For example, for each OFDM symbol, the transmitting-side communication apparatus may perform the Inverse Fast Fourier Transform (IFFT) for the complex-valued modulation symbol mapped to the resource block of the corresponding OFDM symbol. In addition, the transmitting side communication apparatus may add the CP to a signal subjected to the IFFT in order to generate the OFDM baseband signal.

In step S107, the transmitting side may perform up-conversion. The transmitting-side communication apparatus may up-convert the OFDM baseband signal for the antenna port p, the subcarrier spacing configuration u, and the OFDM symbol 1 into a carrier frequency f0 of a cell to which the physical channel is allocated.

Figure 36:
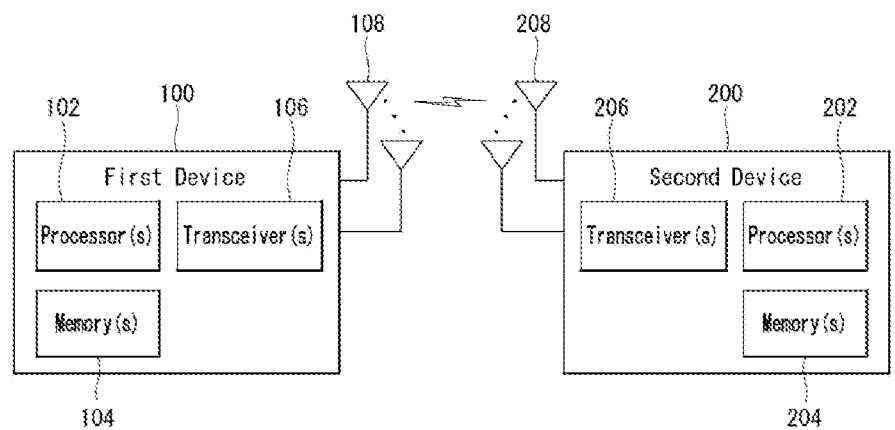
FIG. 36 illustrates a wireless device applicable to the present disclosure.

Processors 102 and 202 of FIG. 36 may be configured to perform encoding, scrambling, modulation, layer mapping, precoding transform (for the uplink), subcarrier mapping, and OFDM modulation.

Figure 22:
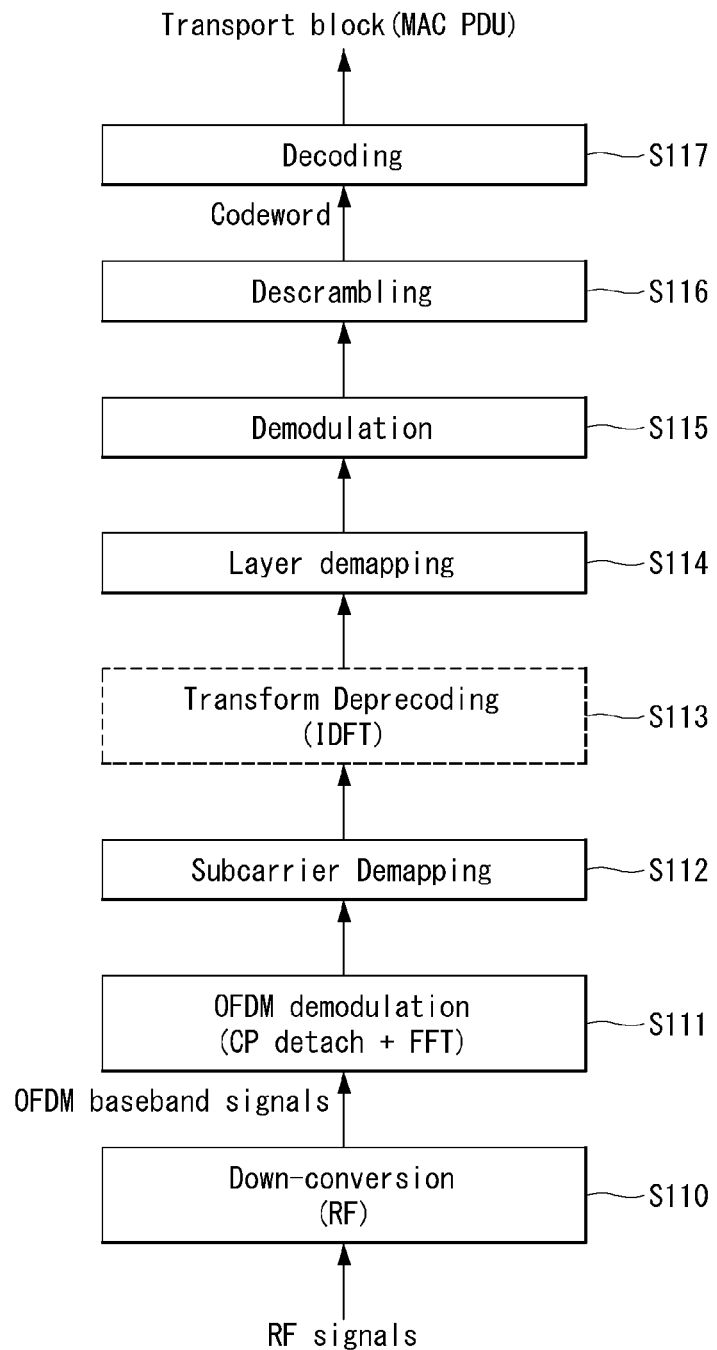
FIG. 22 illustrates a reception-side physical layer processing according to an embodiment of the present disclosure.

FIG. 22 illustrates a receiving-side physical layer processing according to an embodiment of the present disclosure.

The receiving-side physical layer processing may be basically an inverse processing to the transmitting-side physical layer processing.

In step S110, the receiving side may perform down-conversion. The receiving-side communication apparatus may receive an RF signal of the carrier frequency through the antenna. Transceivers 9013 and 9023 that receive the RF signal in the carrier frequency may down-convert the carrier frequency of the RF signal into the baseband in order to acquire the OFDM baseband signal.

In step S111, the receiving side may perform OFDM demodulation. The receiving-side communication apparatus may acquire the complex-valued modulation symbol through CP detachment and Fast Fourier Transform (FFT). For example, for each OFDM symbol, the receiving-side communication apparatus may remove the CP from the OFDM baseband signal. In addition, the receiving-side communication apparatus may perform the FFT for a CP-removed OFDM baseband signal in order to acquire the complex-valued modulation symbol for the antenna port p, the subcarrier spacing u, and the OFDM symbol 1.

In step S112, the receiving side may perform subcarrier demapping. The subcarrier demapping may be performed for the complex-valued modulation symbol in order to acquire the complex-valued modulation symbol of the corresponding physical channel. For example, the processor of the UE may acquire the complex-valued modulation symbol mapped to the subcarrier which belongs to the PDSCH among complex-valued modulation symbols received in a bandwidth part (BWP).

In step S113, the receiving side may perform transform de-precoding. When the transform precoding is enabled for the uplink physical channel, the transform de-precoding may be performed for the complex-valued modulation symbol of the uplink physical channel. For the downlink physical channel, and the uplink physical channel in which the transform precoding is disabled, the transform de-precoding may not be performed.

In step S114, the receiving side may perform layer demapping. The complex-valued modulation symbol may be demapped with one or two codewords.

In steps S115 and S116, the receiving side may perform the modulation and the descrambling. The complex-valued modulation symbol of the codeword may be demodulated, and descrambled with bits of the codeword.

In step S117, the receiving side may perform decoding. The codeword may be decoded into the TB. For the UL-SCH and the DL-SCH, LDPC base graph 1 or 2 may be selected based the size of the TB and the coding rate R. The codeword may include one or a plurality of coded blocks. Each coded block may be decoded to a code block in which the CRC is attached to the selected LDPC base graph or the TB to which the CRC is attached. When code block segmentation is performed for the TB to which the CRC is attached at the transmitting side, the CRC sequence may be removed from each of code blocks to which the CRC is attached, and the code blocks may be acquired. The code block may be connected to the TB to which the CRC is attached. The TB CRC sequence may be removed from the TB to which the CRC is attached, and as a result, the TB may be acquired. The TB may be transferred to the MAC layer.

Figure 37:
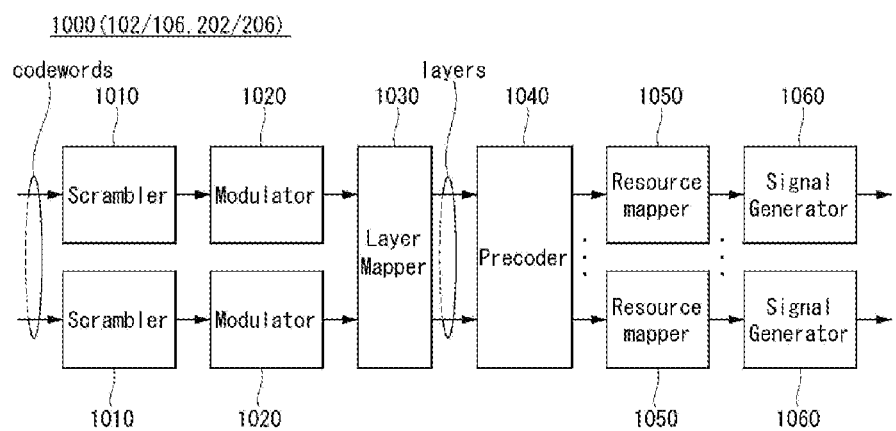
FIG. 37 illustrates a signal processing circuit for a transmit signal.

Processors 102 and 202 of FIG. 37 may be configured to perform OFDM demodulation, subcarrier demapping, layer demapping, demodulation, descrambling, and decoding.

In the physical layer processing at the transmitting/receiving side described above, time and frequency domain resources (e.g., OFDM symbol, subcarrier, and carrier frequency) related to the subcarrier mapping, the OFDM modulation, and frequency up/down conversion may be determined based on resource allocation (e.g., uplink grant and downlink allocation).

Hereinafter, a hybrid automatic repeat request (HARQ) procedure will be described.

An error compensation technique for ensuring the reliability of communication may include a forward error correction (FEC) scheme and an automatic repeat request (ARQ) scheme. In the FEC scheme, a redundant error correction code is added to information bits to correct an error at a receiving end. The FEC scheme is advantageous in that there is no time delay and no information is exchanged between a transmitting end and the receiving end. However, there is a disadvantage in that system efficiency drops in a good channel environment. The ARQ scheme may increase transmission reliability, but has a disadvantage in that the time delay occurs and system efficiency drops in a poor channel environment.

The hybrid automatic repeat request (HARQ) scheme in which the FEC and the ARQ are combined checks whether data received by a physical layer includes an error which may not be decoded and requests retransmission when the error occurs, thereby improving a capability.

In the case of SL unicast and groupcast, HARQ feedback and HARQ coupling in the physical layer may be supported. For example, when the receiving UE operates in resource allocation mode 1 or 2, the receiving UE may receive the PSSCH from the transmitting UE, and the receiving UE may transmit the HARQ feedback for the PSSCH to the transmitting UE by using a Sidelink Feedback Control Information (SFCI) through a Physical Sidelink Feedback Channel (PSFCH).

For example, the SL HARQ feedback may be enabled for the unicast. In this case, in anon-code block group (CBG) operation, when the receiving UE decodes the PSSCH targeting the receiving UE, and the receiving UE successfully decodes the transport block related to the PSCCH, the receiving UE may generate HARQ-ACK. In addition, the receiving UE may transmit the HARQ-ACK to the transmitting UE. On the contrary, after the receiving UE decodes the PSCCH targeting the receiving UE, when the receiving UE does not successfully decode the transport block related to the PSCCH, the receiving UE may generate HARQ-NACK. In addition, the receiving UE may transmit the HARQ-NACK to the transmitting UE.

For example, the SL HARQ feedback may be enabled for the groupcast. For example, in the non-CBH operation, two HARQ feedback options may be supported for the groupcast.

(1) Groupcast option 1: After the receiving UE decodes the PSCCH targeting the receiving UE, when the receiving UE unsuccessfully decodes the transport block related to the PSCCH, the receiving UE may transmit the HARQ-NACK to the transmitting UE through the PSFCH. On the contrary, when the receiving UE decodes the PSCCH targeting the receiving UE and the receiving UE successfully decodes the transport block related to the PSCCH, the receiving UE may transmit the HARQ-ACK to the transmitting UE.

(2) Groupcast option 2: After the receiving UE decodes the PSCCH targeting the receiving UE, when the receiving UE unsuccessfully decodes the transport block related to the PSCCH, the receiving UE may transmit the HARQ-NACK to the transmitting UE through the PSFCH. In addition, when the receiving UE decodes the PSCCH targeting the receiving UE and the receiving UE successfully decodes the transport block related to the PSCCH, the receiving UE may transmit the HARQ-ACK to the transmitting UE through the PSFCH.

For example, when Groupcast option 1 is used for the SL HARQ feedback, all UEs that perform the groupcast communication may share a PSFCH resource. For example, UEs which belong to the same group may transmit the HARQ feedback by using the same PSFCH resource.

For example, when Groupcast option 2 is used for the SL HARQ feedback, respective UEs that perform the groupcast communication may use different PSFCH resources for the transmission of the HARQ feedback. For example, UEs which belong to the same group may transmit the HARQ feedback by using different PSFCH resources.

For example, when the SL HARQ feedback is enabled for the groupcast, the receiving UE may determine whether to transmit the HARQ feedback to the transmitting UE based on a transmission-reception (TX-RX) distance and/or the RSRP.

For example, in the case of the TX-RX distance based HARQ feedback in Groupcast option 1, when the TX-RX distance is equal to or smaller than a communication range requirement, the receiving UE may transmit the HARQ feedback for the PSSCH to the transmitting UE. On the contrary, when the TX-RX distance is larger than the communication range requirement, the receiving UE may not transmit the HARQ feedback for the PSSCH to the transmitting UE. For example, the transmitting UE may announce the position of the transmitting UE to the receiving UE through the SCI related to the PSSCH. For example, the SCI related to the PSSCH may become the second SCI. For example, the receiving UE may estimate or acquire the TX-RX distance based on the position of the receiving UE and the position of the transmitting UE. For example, the receiving UE decodes the SCI related to the PSSCH to know the communication range requirement used for the PSSCH.

For example, in the case of resource allocation mode 1, a time between the PSFCH and the PSSCH may be configured or pre-configured. In the case of the unicast and the groupcast, when retransmission is required on the SL, this may be indicated to the BS by a UE within a coverage using the PUCCH. The transmitting UE may also transmit an indication to a serving BS of the transmitting UE as a form such as scheduling request (SR)/buffer status report (BSR) other than a form such as the HARQ ACK/NACK. Further, even though the BS does not receive the indication, the BS may schedule an SL retransmission resource to the UE. For example, in the case of resource allocation mode 2, a time between the PSFCH and the PSSCH may be configured or pre-configured.

For example, in a UE's transmission viewpoint in the carrier, TDM between the PSCCH/PSSCH and the PSFCH may be permitted for the PSFCH format for the SL. For example, a sequence-based PSFCH format having one symbol may be supported. Here, one symbol may not be an AGC interval. For example, the sequence-based PSFCH format may be applied to the unicast and the groupcast.

For example, within the slot related to the resource pool, the PSFCH resource may be periodically configured to an N-slot interval or pre-configured. For example, N may be configured to one or more values of 1 or more. For example, N may be 1, 2, or 4. For example, an HARQ feedback for transmission in a specific resource pool may be transmitted only through the PSFCH on the specific resource pool.

For example, the transmitting UE transmits the PSSCH throughout slot #X to slot #N, the receiving UE may transmit the HARQ feedback for the PSSCH to the transmitting UE in slot #(N+A). For example, slot #(N+A) may include the PSFCH resource. Here, for example, A may be a smallest integer which is equal to or larger than K. For example, K may be the number of logical slots. In this case, K may be the number of slots in the resource pool. Alternatively, for example, K may be the number of physical slots. In this case, K may be the number of slots inside and outside the resource pool.

For example, when the receiving UE transmits the HARQ feedback on the PSFCH in response to one PSSCH which the transmitting UE transmits to the receiving UE, the receiving UE may determine a frequency domain and/or a code domain of the PSFCH resource based on an implicit mechanism in a configured resource pool. For example, the receiving UE may determine the frequency domain and/or the code domain of the PSFCH resource based on at least any one of a slot index related to the PSCCH/PSSCH/PSFCH, a sub-channel related to the PSCCH/PSSCH, and/or an identifier for distinguishing each receiving UE in a group for a Groupcast option 2 based HARQ feedback. And/or, for example, the receiving UE may determine the frequency domain and/or the code domain of the PSFCH resource based on at least any one of SL, RSRP, SINR, L1 source ID, and/or positional information.

For example, when the HARQ feedback transmission of the UE and the HARQ feedback reception through the PSFCH are overlapped, the UE may select any one of the HARQ feedback transmission through the PSFCH or the HARQ feedback reception through the PSFCH based on a priority rule. For example, the priority rule may be based on a minimum priority indication of the related PSCCH/PSSCH.

For example, when HARQ feedback transmissions through the PSFCH for a plurality of UEs of the UE are overlapped, the UE may select a specific HARQ feedback transmission based on the priority rule. For example, the priority rule may be based on the minimum priority indication of the related PSCCH/PSSCH.

Hereinafter, positioning will be described.

Figure 23:
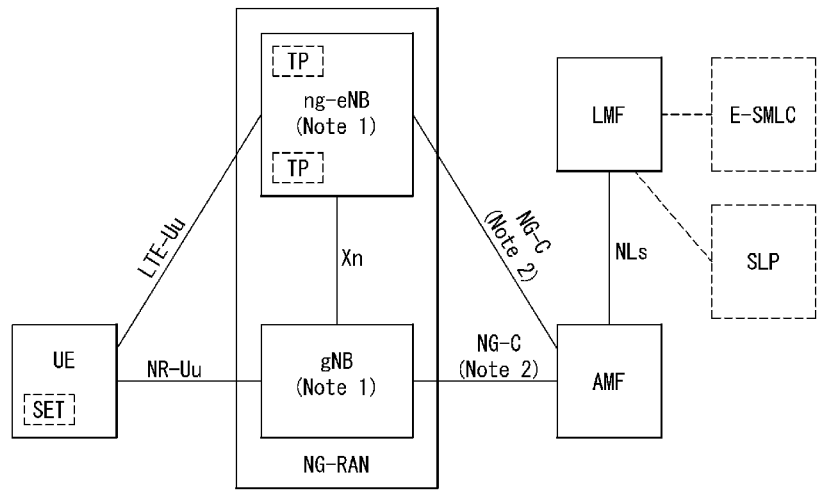
FIG. 23 illustrates one example of an architecture in a 5G system, which is capable of positioning for a UE connected to a next generation-radio access network (NG-RAN) or E-UTRAN according to an embodiment of the present disclosure.

FIG. 23 illustrates one example of an architecture in a 5G system, which is capable of positioning for a UE connected to a next generation-radio access network (NG-RAN) or E-UTRAN according to an embodiment of the present disclosure.

Referring to FIG. 23, the AMF may receive a request for a position service related to a specific target UE from another entity such as a Gateway Mobile Location Center (GMLC) or the AMF itself may determine to start the position service in behalf of the specific target UE. Then, the AMF may transmit a position service request to a Location Management Function (LMF). The LMF that receives the position service request may process the position service request and return a processing result including an estimated position of the UE to the AMF. Meanwhile, when the position service request is received from another entity such as the GMLC other than the AMF, the AMF may transfer the processing result received from the LMF to another entity.

New generation evolved-NB (ng-eNB) and gNB may be network elements which may provide a measurement result for position estimation, and measure a radio signal for the target UE and transfer a result value to the LMF. Further, the may control some transmission points (TPs) such as remote radio heads or PRS dedicated TPs that support a positioning reference signal (PRS) based beacon system for the E-UTRA.

The LMF may be connected to an Enhanced Serving Mobile Location Centre (E-SMLC), and the E-SMLC may allow the LMF to be connected to the E-UTRAN. For example, the E-SMLC may allow the LMF to support an Observed Time Difference Of Arrival (OTDOA) which is one of positioning methods of the E-UTRAN by using downlink measurement which the target UE acquires through signals transmitted from PRS dedicated TPs in the eNB and/or the E-UTRAN.

Meanwhile, the LMF may be connected to an SUPL Location Platform (SLP). The LMF may support and manage different positioning services for the target UEs. The LMF may interact with serving ng-eNB or serving gNB for the target UE, in order to acquire the positioning of the UE. For the positioning of the target, the LMF may determine a positioning method based on a location service (LCS) client type, a required Quality of Service (QoS), UE positioning capabilities, a gNB positioning capability, and an ng-eNB positioning capability, and apply the positioning method to the serving gNB and/or the serving ng-eNB. In addition, the LMF may determine a position estimation value for the target UE, and additional information such as accuracy of the position estimation and accuracy. The SLP is a Secure User Plane Location (SUPL) entity that takes charge of positioning through the user plane.

The UE may measure a downlink signal through sources such as the NG-RAN and the E-UTRAN, different Global Navigation Satellite System (GNSS), Terrestrial Beacon System (TBS), Wireless Local Access Network (WLAN) access point, Bluetooth beacon, and a UE air pressure sensor. The UE may also include an LCS application, and access the LCS application through communication with the network accessed by the UE or another application included in the UE. The LCS application may include measurement and calculation functions required for determining the position of the UE. For example, the UE may include an independent positioning function such as a Global Positioning System (GPS), and report the position of the UE independently from NG-RAN transmission. The independently acquired positioning information may also be used as assistance information of positioning information acquired from the network.

Figure 24:
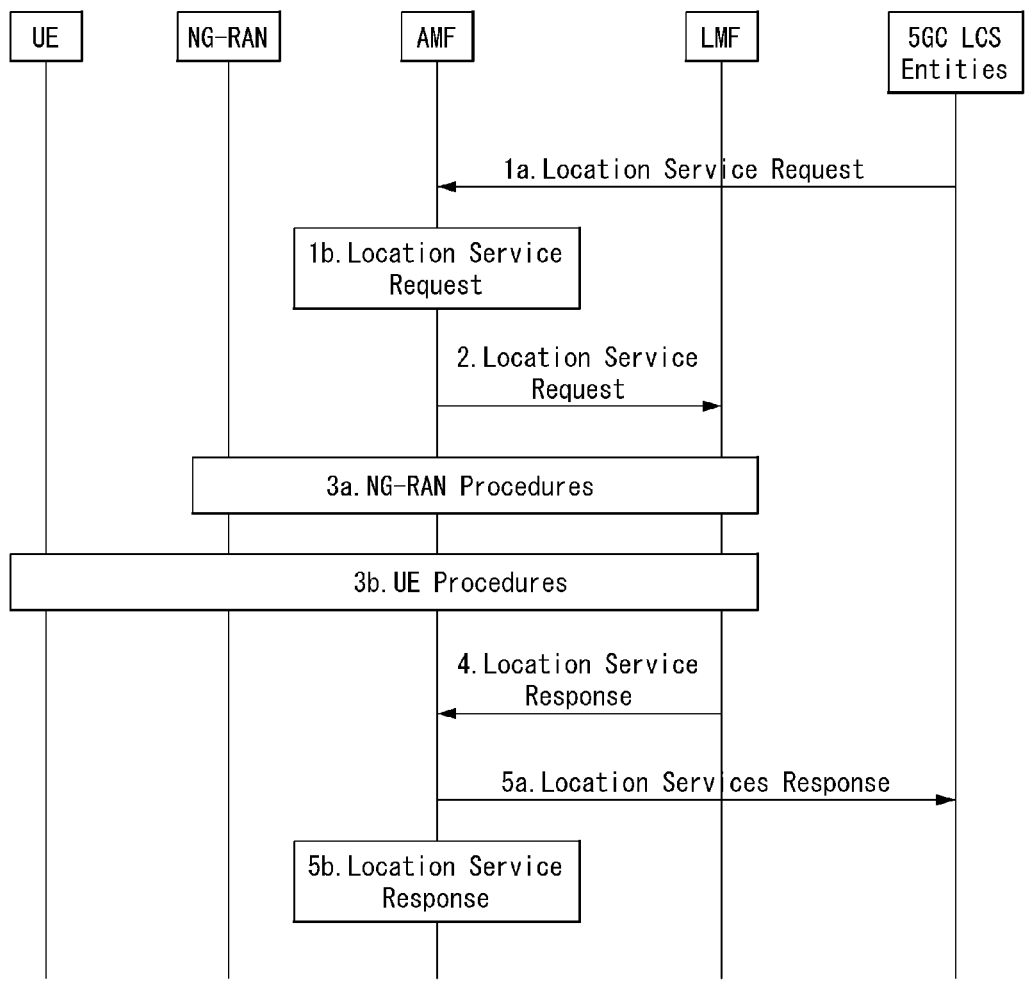
FIG. 24 illustrates an implementation example of a network for measuring a position of a UE according to an embodiment of the present disclosure.

FIG. 24 illustrates an implementation example of a network for measuring a position of a UE according to an embodiment of the present disclosure.

When the UE is in a Connection Management—IDLE (CM-IDLE) state, if the AMF receives the position service request, the AMF may establish signaling connection with the UE, and request a network trigger service in order to allocate specific serving gNB or ng-eNB. Such an operation process is omitted in FIG. 24. That is, in FIG. 24, it may be assumed that the UE is in a connected mode. However, the signaling connection may also be released while a positioning process is in progress by the NG-RAN due to signaling and data deactivation.

When an operation process of the network for measuring the position of the UE is specifically described with reference to FIG. 24, the 5GC entity such as the GMLC may request the position service for measuring the position of the target UE to a serving AMF in step 1a. However, even though the GMLC does not request the position service, the serving AMF may also determine that the position service for measuring the position of the target UE is required according to step 1b. For example, in order to measure the position of the UE for emergency call, the serving AMF may also directly determine performing the position service.

Thereafter, the AMF may transmit the position service request to the LMF according to step 2, and the LMF may start location procedures for acquiring positioning assistance data jointly with the serving ng-eNB and the serving gNB. Additionally, according to step 3b, the LMF may start location procedures for downlink positioning jointly with the UE. For example, the LMF may transmit position assistance data (defined in 3GPP TS 36.355) to the UE or acquire a position estimation value or a position measurement value. Meanwhile, step 3b may be additionally performed after step 3a is performed, but also performed instead of step 3a.

In step 4, the LMF may provide a position service response to the AMF. Further, the position service response may include information indicting whether the position estimation of the UE is successful and the position estimation value of the UE. Thereafter, when the procedure of FIG. 24 is initiated by step 1a, the AMF may transfer the position service response to the 5GC entity such as the GMLC, and when the procedure of FIG. 24 is initiated by step 1b, the AMF may use the position service response in order to provide the position service related to the emergency call.

Figure 25:
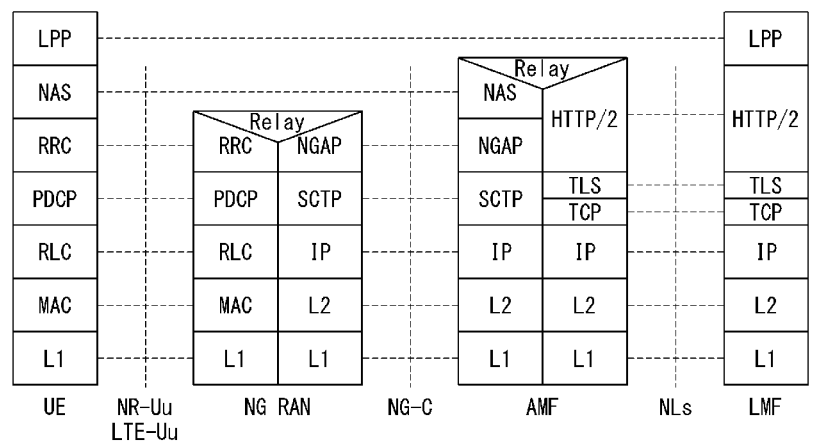
FIG. 25 illustrates one example of a protocol layer used for supporting LTE positioning protocol (LPP) message transmission between LMF and a UE according to an embodiment of the present disclosure.

FIG. 25 illustrates one example of a protocol layer used for supporting LTE positioning protocol (LPP) message transmission between LMF and a UE according to an embodiment of the present disclosure.

An LPP PDU may be transmitted between the AMF and the UE through an NAS PDU. Referring to FIG. 25, the LPP may terminate a target apparatus (e.g., the UE in the control plane or an SUPL enabled terminal (SET) in the user plane) and a position server (e.g., the LMF in the control plane or the SLP in the user plane). The LPP message may be transferred in a form of a transparent PDU through an intermediate network interface by using an appropriate protocol such as an NG application protocol (NGAP) through an NG-control plane (NG-C) interface, NAS/RRC through LTE-Uu and NR-Uu interfaces, etc. The LPP protocol enables positioning for NR and LTE by using various positioning methods.

For example, the target apparatus and the position server may perform mutual capability information exchange, assistance data exchange for positioning, and/or positional information exchange through the LPP protocol. Further, error information exchange and/or a stop indication of an LPP procedure may also be performed through the LPP message.

Figure 26:
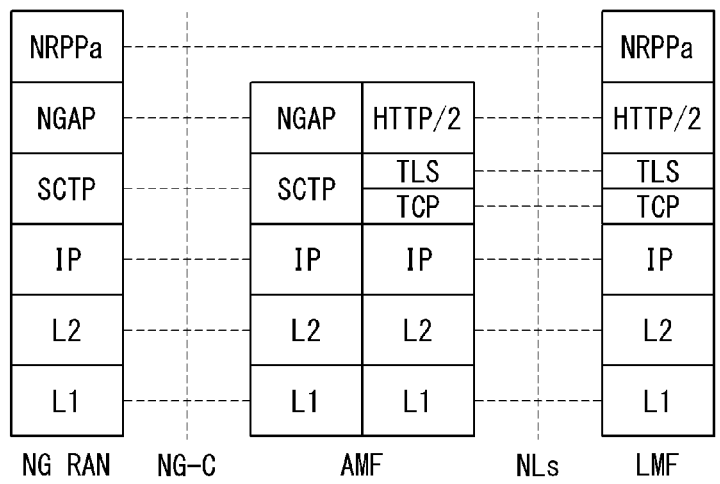
FIG. 26 illustrates one example of a protocol layer used for supporting NR positioning protocol A (NRPPa) PDU transmission between the LMF and an NG-RAN node according to an embodiment of the present disclosure.

FIG. 26 illustrates one example of a protocol layer used for supporting NR positioning protocol A (NRPPa) PDU transmission between the LMF and an NG-RAN node according to an embodiment of the present disclosure.

The NRPPa may be used for information exchange between the NG-RAN node and the LMF. Specifically, the NRPPa may exchange enhanced-cell ID (E-CID) for measurement transmitted to the LMF from the ng-eNB, data for supporting the OTDOA positioning method, a cell-ID and a cell position ID for an NR cell ID positioning method, etc. Even though there is no information on related NRPPa transaction, the AMF may route NRPPa PDUs based on a routing ID of related LMF through the NG-C interface.

A procedure of an NRPPa protocol for position and data collection may be categorized into two types. A first type is a UE associated procedure for transferring information (e.g., positioning information, etc.) on a specific UE, and a second type is a non UE associated procedure for transferring information (e.g., gNB/ng-eNB/TP timing information, etc.) applicable to the NG-RAN node and related TPs. The two types of procedures may also be independently supported or simultaneously supported.

Meanwhile, the positioning methods supported in the NG-RAN may include GNSS, OTDOA, enhanced cell ID (E-CID), air pressure sensor positioning, WLAN positioning, Bluetooth positioning, and a terrestrial beacon system (TBS), an Uplink Time Difference of Arrival (UTDOA), etc. The position of the UE may also be measured by using any one positioning method among the positioning methods, but the position of the UE may also be measured by using two or more positioning methods.

(1) Observed Time Difference Of Arrival (OTDOA)

Figure 27:
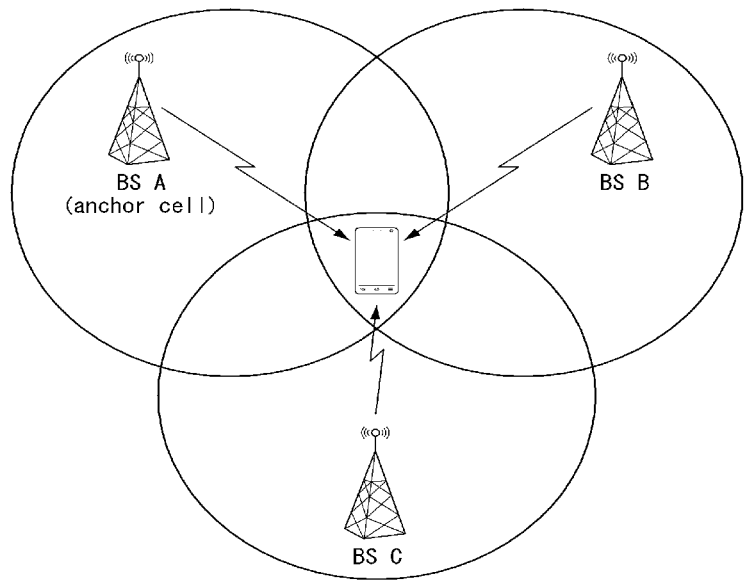
FIG. 27 is a diagram for describing an observed time difference of arrival (OTDOA) positioning method according to an embodiment of the present disclosure.

FIG. 27 is a diagram for describing an observed time difference of arrival (OTDOA) positioning method according to an embodiment of the present disclosure.

In the OTDOA positioning method, the UE uses measurement timings of downlink signals received from multiple TPs including the eNB, the ng-eNB, and the PRS dedicated TP. The UE measures timings of the received downlink signals by using position assistance data received from the position server. In addition, the position of the UE may be determined based on such a measurement result and geographical coordinates of contiguous TPs.

The UE connected to the gNB may request a measurement gap for OTDOA measurement to the TP. If the UE does not recognize a single frequency network (SFN) for at least one TP within OTDOA assistance data, the UE may use an autonomous gap in order to an SFN of a OTDOA reference cell before requesting a measurement gap for performing reference signal time difference (RSTD) measurement.

Here, RSTD may be defined based a smallest relative time difference between boundaries of two subframes received from a reference cell and a measurement cell, respectively. That is, the RSTD may be calculated based on a relative time difference between a start time of the subframe received from the measurement cell and a start time of the subframe of a reference cell closest to the start time. Meanwhile, the reference cell may be selected by the UE.

For accurate OTDOA measurement, it is necessary to measure times of arrival (TOAs) of signals received from three or more TPs or BSs which are geographically distributed. For example, the TOA for each of TP 1, TP2, and TP 3 is measured and RSTD for TP 1–TP 2, RSTDs for TP 2–TP 3, and RSTD for TP 3–TP 1 are calculated to determine hyperbolic curves based thereon, and estimate a point where hyperbolic curves cross as the position of the UE. In this case, accuracy and/or uncertainty for each TOA measurement may occur, so the estimated position of the UE may also be know as a specific range according to the measurement uncertainty.

For example, RSTD for two TPs may be calculated based on Equation 1.

$$RSTDi, 1 = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$ [Equation 1]

Here, c may represent a velocity of light, $\{x_t, y_t\}$ may represent an (unknown) coordinate of the target UE, $\{x_i, y_i\}$ may represent a (known) coordinate of the TP, and $\{x_1, y_1\}$ may represent a coordinate of the reference TP (or another TP). Here, $(T_i - T_1)$ as a transmission time offset between two TPs may be referred to as "Real Time Differences (RTDs)", and $n_i$ and $n_1$ may represent values regarding a UE TOA measurement error.

(2) Enhanced Cell ID (E-CID)

In the cell ID (CID) positioning method, the position of the UE may be measured through geographical information of the serving ng-eNB, the serving gNB, and/or the serving cell of the UE. For example, the geographical information of the serving ng-eNB, the serving gNB, and/or the serving cell may be acquired through paging, registration, etc.

Meanwhile, in the E-CID positioning method, an additional UE measurement and/or NG-RAN radio resource for enhancing a UE position estimation value may be used in addition to the CID positioning method. In the E-CID positioning method, some of the same measurement methods as a measurement control system of an RRC protocol may be used, but additional measurement is not generally performed only for the position measurement of the UE. In other words, a separate measurement configuration or a measurement control message may not be provided in order to measure the position of the UE, and the UE may not also expect that an additional measurement operation only the position measurement is requested, and the UE may generally report a measurement value acquired through measurable measurement methods.

For example, the serving gNB may implement the E-CID positioning method by using an E-UTRA measurement value provided from the UE.

An example of a measurement element which may be used for E-CID positioning may be as follows.

UE measurement: E-UTRA Reference Signal Received Power (RSRP), E-UTRA Reference Signal Received Quality (RSRQ), UE E-UTRA Rx-Tx Time difference, GSM EDGE Random Access Network (GERAN)/WLAN Reference Signal Strength Indication (RSSI), UTRAN Common Pilot Channel (CPICH) Received Signal Code Power (RSCP), and UTRAN CPICH Ec/Io E-UTRAN measurement: ng-eNB Rx-Tx Time difference, Timing Advance (TADV), and Angle of Arrival (AoA)

Here, the TADV may be categorized into Type 1 and Type 2 as follows.

TADV Type 1=(ng-eNB Rx-Tx time difference)+(UE E-UTRA Rx-Tx time difference)

TADV Type 2=ng-eNB Rx-Tx time difference

Meanwhile, the AoA may be used for measuring a direction of the UE. The AoA may be defined as an estimation angle for the position of the UE counterclockwise from the BS/TP. In this case, a geographical reference direction may be the north. The BS/TP may use an uplink signal such as a sounding reference signal (SRS) and/or a demodulation reference signal (DMRS) for AoA measurement. Further, as an antenna array is larger, measurement accuracy of the AoA becomes higher, and when antenna arrays are arranged at the same interval, signals received from contiguous antenna elements may have a predetermined phase-rotate.

(3) UTDOA (Uplink Time Difference of Arrival)

The UTDOA is a method for determining the position of the UE by estimating an arrival time of the SRS. When the estimated SRS arrival time is calculated, the serving cell is used as the reference cell to estimate the position of the UE through an arrival time difference from another cell (or BS/TP). In order to implement the UTDOA, the E-SMLC may indicate the serving cell of the target UE in order to indicate the SRS transmission to the target UE. Further, the E-SMLC may provide a configuration such as whether the SRS being periodic/aperiodic, a bandwidth and frequency/group sequence hopping, etc.

Hereinafter, synchronization acquisition of the SL UE will be described.

In time division multiple access (TDMA) and frequency division multiples access (FDMA) systems, accurate time and frequency synchronization is required. When the time and frequency synchronization is not accurately achieved, intersymbol interference (ISI) and intercarrier interference (ICI) are caused, and as a result, system performance deteriorates. This is also the same for V2X. In the V2X, for the time/frequency synchronization, an SL synchronization signal (SLSS) may be used in the physical layer and master information block-sidelink-V2X (MIB-SL-V2X) may be used in a radio link control (RLC) layer.

Figure 28:
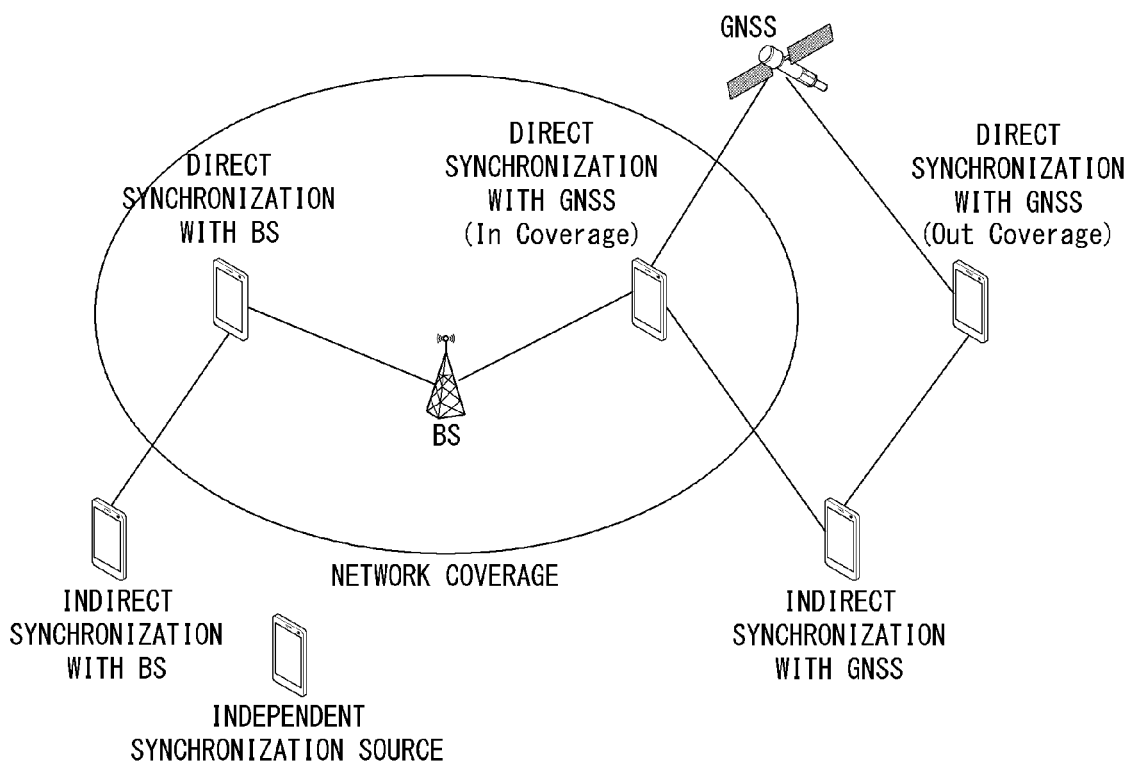
FIG. 28 illustrates a synchronization source or a synchronization reference of V2X according to an embodiment of the present disclosure.

FIG. 28 illustrates a synchronization source or a synchronization reference of V2X according to an embodiment of the present disclosure.

Referring to FIG. 28, in the V2X, the UE may be directly synchronized with global navigation satellite systems (GNSS) or synchronized with the GNSS non-indirectly through the UE directly synchronized with the GNSS (within the network coverage or out of the network coverage). When the GNSS is configured as a synchronization source, the UE may calculate a direct frame number (DFN) and a subframe number by using a coordinated universal time (UTC) and a (pre)configured DFN offset.

Alternatively, the UE may be directly synchronized with the BS or synchronized with another UE which is time/frequency synchronized with the BS. For example, the BS may be eNB or gNB. For example, when the UE is within network coverage, the UE may receive synchronization information provided by the BS and be directly synchronized with the BS. Thereafter, the UE may provide the synchronization information to another contiguous UE. When a BS timing is configured as a synchronization reference, the UE may follow a cell associated with a corresponding frequency (when the UE is within cell coverage in the frequency, a primary cell, or a serving cell (when the UE is outside the cell coverage in the frequency) for synchronization and downlink measurement.

The BS (e.g., serving cell) may provide a synchronization configuration for a carrier used for the V2X or SL communication. In this case, the UE may follow the synchronization configuration received from the BS. If no cell is detected in the carrier used for the V2X or SL communication and the synchronization configuration may not also be received from the serving cell, the UE may follow a pre-configured synchronization configuration.

Alternatively, the UE may be synchronized with another UE which may not acquire the synchronization information directly or indirectly from the BS or GNSS. The synchronization source and a preference may be pre-configured to the UE. The synchronization source and the preference may be pre-configured through a control message provided by the BS.

The SL synchronization source may be associated with the synchronization priority. For example, a relationship between the synchronization source and the synchronization priority may be defined as in Table 14 or Table 15. Table 14 or Table 15 is just one example, and the synchronization source and the synchronization priority may be defined as various forms.

TABLE 14

| Priority level | GNSS-based synchronization | eNB/gNB-based synchronization |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A | All UEs directly synchronized with GNSS |
| P5 | N/A | All UEs indirectly synchronized with GNSS |
| P6 | N/A | All other UEs |

TABLE 15

| Priority level | GNSS-based synchronization | eNB/gNB-based synchronization |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | BS | GNSS |
| P4 | All UEs directly synchronized with BS | All UEs directly synchronized with GNSS |
| P5 | All UEs indirectly synchronized with BS | All UEs indirectly synchronized with GNSS |

TABLE 15-continued

| Priority level | GNSS-based synchronization | eNB/gNB-based synchronization |
|---|---|---|
| P6 | Remaining UE(s) having low priority | Remaining UE(s) having low priority |

In Table 14 or Table 15, P0 may mean a highest priority and P6 may mean a lowest priority. In Table 14 or Table 15, the BS may include at least any one of the gNB or the eNB.

Whether GNSS based synchronization or BS based synchronization is to be used may be (pre)configured. In a single-carrier operation, the UE may derive the transmission timing of the UE from an available synchronization reference having the highest priority.

Hereinafter, the bandwidth part (BWP) an the resource pool will be described.

When bandwidth adaptation (BA) is used, a reception bandwidth and a transmission bandwidth need not be as large as the bandwidth of the cell, and the reception bandwidth and the transmission bandwidth of the UE may be adjusted. For example, the network/BS may announce bandwidth adjustment to the UE. For example, the UE may receive information/configuration for the bandwidth adjustment from the network/BS. In this case, the UE perform the bandwidth adjustment based on the received information/configuration. For example, the bandwidth adjustment may include reduction/enlargement of the bandwidth, a positional change of the bandwidth, or a change of the subcarrier spacing of the bandwidth.

For example, the bandwidth may be reduced during a period in which an activity is small in order to save power. For example, the position of the bandwidth may move in the frequency domain. For example, the position of the bandwidth may move in the frequency domain in order to increase scheduling flexibility. For example, the subcarrier spacing of the bandwidth may be changed. For example, the subcarrier spacing of the bandwidth may be changed in order to permit different services. A subset of a total cell bandwidth of the cell may be referred to as bandwidth part (BWP). The BA may be performed by configuring the BWP to the UE by the BS/network and announcing, to the UE, the BWP which is currently in an active state in the configured BWP.

Figure 29:
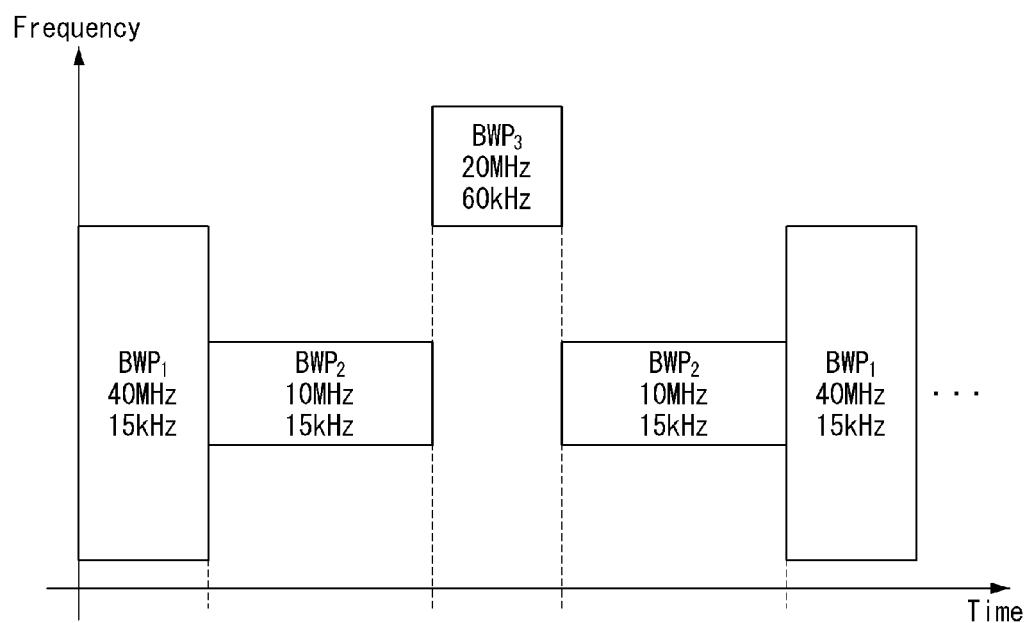
FIG. 29 illustrates a plurality of BWPs according to an embodiment of the present disclosure.

FIG. 29 illustrates a plurality of BWPs according to an embodiment of the present disclosure.

Referring to FIG. 29, BWP1 having a bandwidth of 40 MHz and a subcarrier spacing of 15 kHz, BWP2 having a bandwidth of 10 MHz and subcarrier spacing of 15 kHz, and BWP3 having a bandwidth of 20 MHz and a subcarrier spacing of 60 kHz may be configured.

Figure 30:
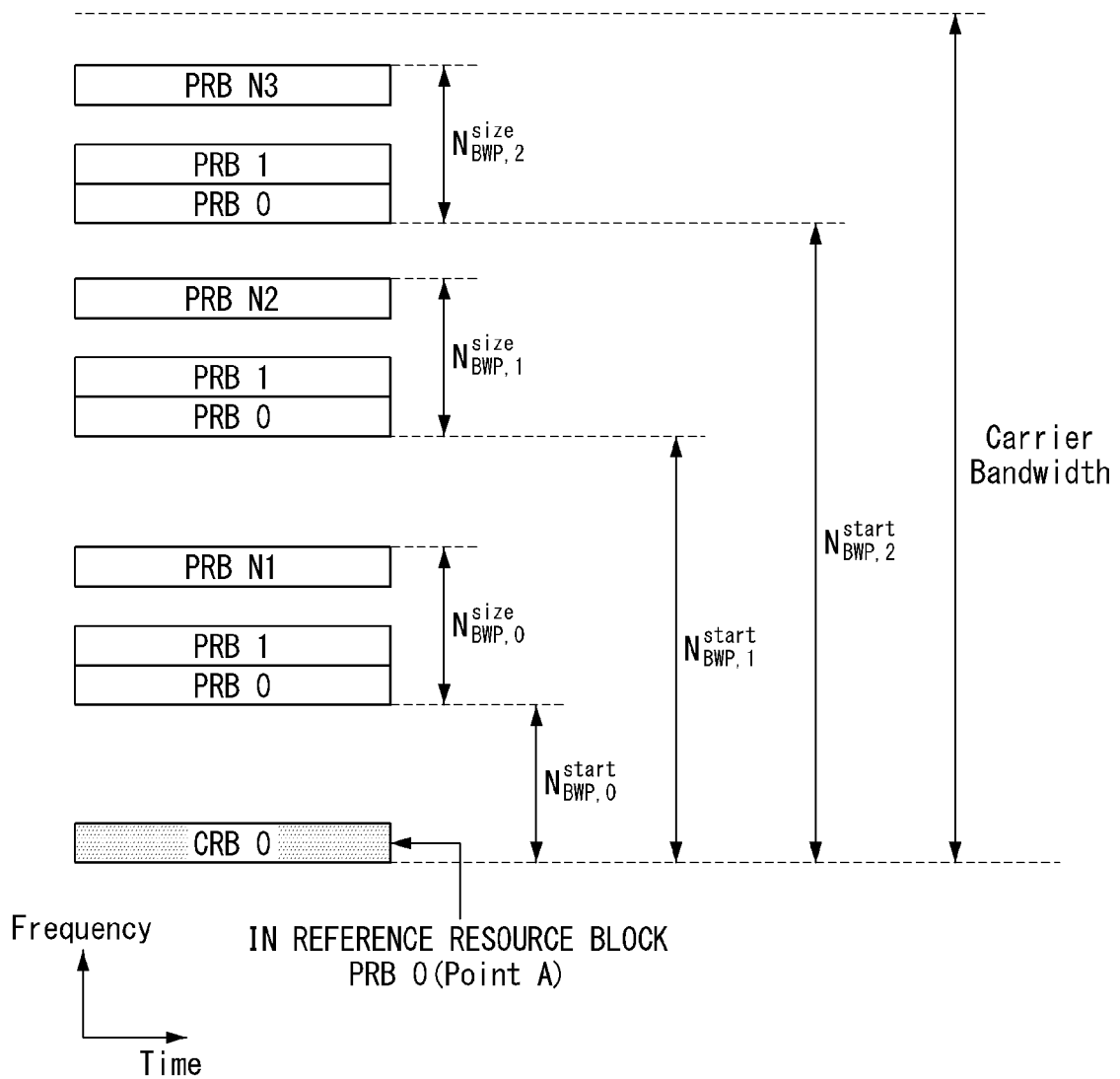
FIG. 30 illustrates a BWP according to an embodiment of the present disclosure.

FIG. 30 illustrates a BWP according to an embodiment of the present disclosure. In the embodiment of FIG. 30, it is assumed that the number of BWPs is three.

Referring to FIG. 30, a common resource block (CRB) may be a carrier resource block in which one end to the other end of a carrier band are numbered. In addition, the PRB may be a resource block which is numbered in each BWP. Point A may indicate a common reference point for a resource block grid.

The BWP may be configured by Point A, an offset (NstartBWP) from Point A, and a bandwidth (NsizeBWP). For example, Point A may be an external reference point of the PRB of the carrier in which subcarrier 0 of all numerologies (e.g., all numerologies supported by the network in the corresponding carrier) is aligned. For example, the offset may be a PRB interval between a lowest subcarrier and Point A in a given numerology. For example, the bandwidth may be the number of PRBs in the given numerology.

The BWP may be defined for the SL. The same SL BWP may be used for transmission and reception. For example, the transmitting UE may transmit the SL channel or the SL signal on a specific BWP and the receiving UE may receive the SL channel or the SL signal on the specific BWP. In a licensed carrier, the SL BWP may be defined separately from a Uu BWP, and the SL BWP may have separate configuration signaling from the Uu BWP. For example, the UE may receive a configuration for the SL BWP from the BS/network. The SL BWP may be (pre)configured for an out-of-coverage NR V2X UE and an RRC_IDLE UE in the carrier. At least one SL BWP may be activated within the carrier for the RRC_CONNECTED mode UE.

The resource pool may be a set of time-frequency resources which may be used for SL transmission and/or SL reception. From the UE's viewpoint, the time domain resource in the resource pool may not be consecutive. A plurality of resource pools may be (pre)configured to the UE within one carrier. From a physical layer's viewpoint, the UE may perform the unicast, groupcast, and broadcast communications by using the configured or pre-configured resource pool.

Hereinafter, power control will be described.

A method in which the UE controls uplink transmission power thereof may include open loop power control (OLPC) and closed loop power control (CLPC). According to the open loop power control, the UE may estimate downlink pathloss from the BS of the cell to which the UE belongs and the UE may perform the power control in a form of compensating the pathloss. For example, according to the open loop power control, when a distance between the UE and the BS increases and the downlink pathloss thus increases, the UE may control uplink power by a scheme of further increasing uplink transmission power. According to the closed loop power control, the UE may receive, from the BS, information (e.g., a control signal) required for adjusting the uplink transmission power, and the UE may control the uplink power based on the information received from the BS. That is, according to the closed loop power control, the UE may control the uplink power according to a direct power control instruction received from the BS.

The open power control may be supported in the SL. Specifically, when the transmitting UE is within the coverage of the BS, the BS may enable the open loop power control for unicast, groupcast, and broadcast transmissions based on the pathloss between the transmitting UE and the serving BS of the transmitting UE. When the transmitting UE receives, from the BS, information/configuration for enabling the open loop power control, the transmitting UE may enable the open loop power control for the unicast, groupcast, or broadcast transmission. This may be to alleviate interference with uplink reception of the BS.

Additionally, at least in the case of the unicast, a configuration may be enabled to use the pathloss between the transmitting UE and the receiving UE. For example, the configuration may be pre-configured for the UE. The receiving UE may report, to the transmitting UE, an SL channel measurement result (e.g., SL RSRP), and the transmitting UE may derive pathloss estimation from the SL channel measurement result reported by the receiving UE. For example, in the SL, when the transmitting UE transmits the reference signal to the receiving UE, the receiving UE may measure a channel between the transmitting UE and the receiving UE based on the reference signal transmitted by the transmitting UE. In addition, the receiving UE may transmit the SL channel measurement result to the transmitting UE. In addition, the transmitting UE may estimate the SL pathloss from the receiving UE based on the SL channel measurement result. In addition, the transmitting UE may perform SL power control by compensating the estimated pathloss, and perform SL transmission for the receiving UE. According to the open loop power control in the SL, for example, when a distance between the transmitting UE and the receiving UE increases and the downlink pathloss thus increases, the UE may control uplink power by a scheme of further increasing uplink transmission power. The power control may be applied when an SL physical channel (e.g., PSCCH, PSSCH, or Physical Sidelink Feedback Channel (PSFCH) and/or an SL signal are/is transmitted.

In order to the open loop power control, at least in the case of the unicast, long-terms measurements (i.e., L3 filtering) may be supported on the SL.

For example, total SL transmission power may be the same in symbols used for transmission of PSCCH and/or PSSCH in the slot. For example, maximum SL transmission power may be configured or pre-configured for the transmitting UE.

For example, in the case of SL open loop power control, the transmitting UE may be configured to use only the downlink pathloss (e.g., pathloss between the transmitting UE and the BS). For example, in the case of SL open loop power control, the transmitting UE may be configured to use only the downlink pathloss (e.g., pathloss between the transmitting UE and the receiving UE). For example, in the case of SL open loop power control, the transmitting UE may be configured to use the downlink pathloss and the SL pathloss.

For example, when the SL open loop power control is configured to use both the downlink pathloss and the SL pathloss, the transmitting UE may determine a minimum value as the transmission power between power acquired based on the downlink pathloss and power acquired based on the SL pathloss. For example, P0 and an alpha value may be separately configured or pre-configured for the downlink pathloss and the SL pathloss. For example, P0 may be a user specific parameter related to SINR which is averagely received. For example, the alpha value may be a weight value for the pathloss.

Hereinafter, sidelink (SL) congestion control will be described.

When the UE autonomously determines the SL transmission resource, the UE also autonomously determines the size of the resource and the frequency used thereby. Of course, due to a constraint from the network, etc., it may be limited that a resource size or a frequency of a predetermined level or more is used. However, when all UEs use relatively many resources in a situation many UEs concentrate on a specific region at a specific time, an overall capability may be significantly deteriorated due to mutual interference.

Accordingly, the UE needs to observe a channel situation. When it is determined that excessively many resources are consumed, the UE preferably takes an operation of a form of reducing autonomous resource use. In the present disclosure, this may be defined as congestion control (CR). For example, the UE may judge whether energy measured in a unit time/frequency resource is at a predetermined level or more, and adjust a quantity of transmission resources and a frequency thereof according to a ratio of a unit time/frequency resource in which the energy of the predetermined level is observed. In the present disclosure, the ratio of the time/frequency resource in which the energy of the predetermined level is observed may be defined a channel busy ratio (CBR). The UE may measure the CBR for the channel/frequency. Additionally, the UE may transmit the measured CBR to the network/BS.

Figure 31:
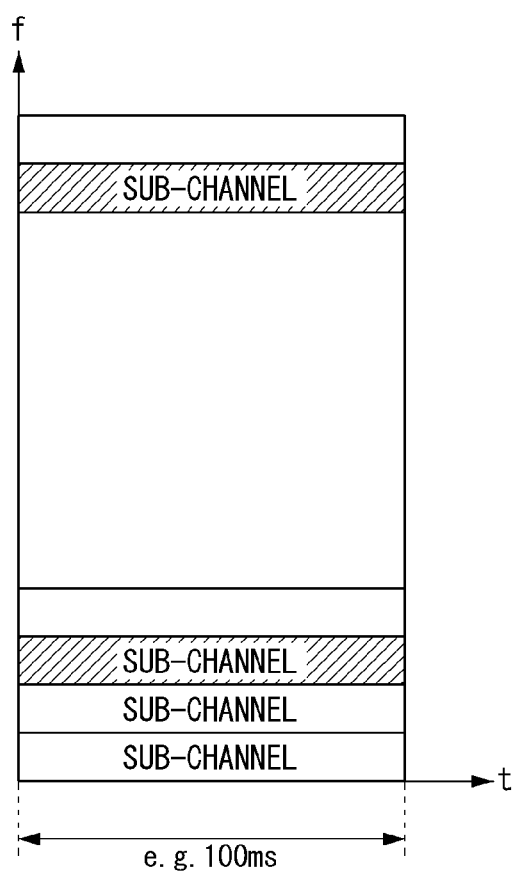
FIG. 31 illustrates a resource unit for CBR measurement according to an embodiment of the present disclosure.

FIG. 31 illustrates a resource unit for CBR measurement according to an embodiment of the present disclosure.

Referring to FIG. 31, the CBR may mean the number of sub-channels in which a measurement result value of the RSSI has a value of a predetermined threshold or more as a result of measuring, by the UE, a received signal strength indicator (RSSI) as a unit of the sub-channel during a specific interval (e.g., 100 ms). Alternatively, the CBR may mean a ratio of a sub-channel having a pre-configured threshold or more among the sub-channels during the specific interval. For example, in the embodiment of FIG. 31, when it is assumed that an oblique sub-channel is the sub-channel having the value of the predetermined threshold or more, the CBR may mean a ratio of the oblique sub-channel during an interval of 100 ms. Additionally, the UE may report the CBR to the BS.

Figure 32:
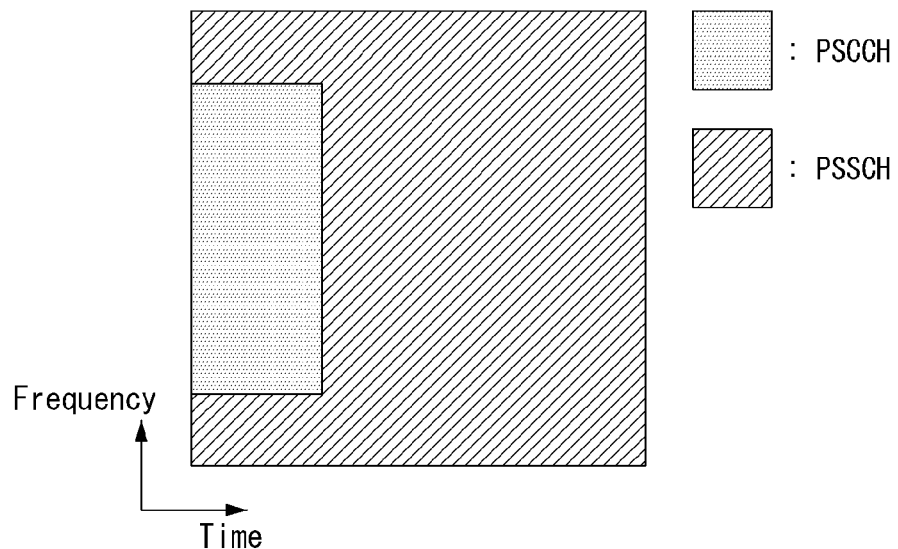
FIG. 32 illustrates a resource unit for CBR measurement according to another embodiment of the present disclosure.

For example, as in the embodiment of FIG. 32, when the PSCCH and the PSSCH are multiplexed, the UE may perform one CBR measurement for one resource pool. Here, if the PSFCH resource is configured or pre-configured, the PSFCH resource may be excluded from the CBR measurement.

Furthermore, congestion control considering a priority of traffic (e.g., packet) may be required. To this end, for example, the UE may measure a channel occupancy ratio (CR). Specifically, the UE may measure the CBR, and the UE may determine a maximum value CRlimitk of channel occupancy ratio k CRk which traffic corresponding to each priority (e.g., k) may occupy according to the CBR. For example, the UE may derive the maximum value CRlimitk of the channel occupancy ratio for the priority of each traffic based on a CBR measurement value and a predetermined table. For example, in the case of traffic having a relatively high priority, the UE may derive a maximum value of a relatively high channel occupancy ratio. Thereafter, the UE restricts a total sum of channel occupancy ratios of traffics in which the traffic priority k of the traffic is lower than i to a predetermined value or less to perform the congestion control. According to such a method, a stronger channel occupancy ratio restriction may be given to traffics having a relatively low priority.

Besides, the UE may perform the SL congestion control by using a method such as magnitude adjustment of transmission power, drop of a packet, determination whether retransmission is performed, transport RB size adjustment (MCS adjustment), etc.

Hereinafter, a physical-layer processing for the SL will be described.

Figure 33:
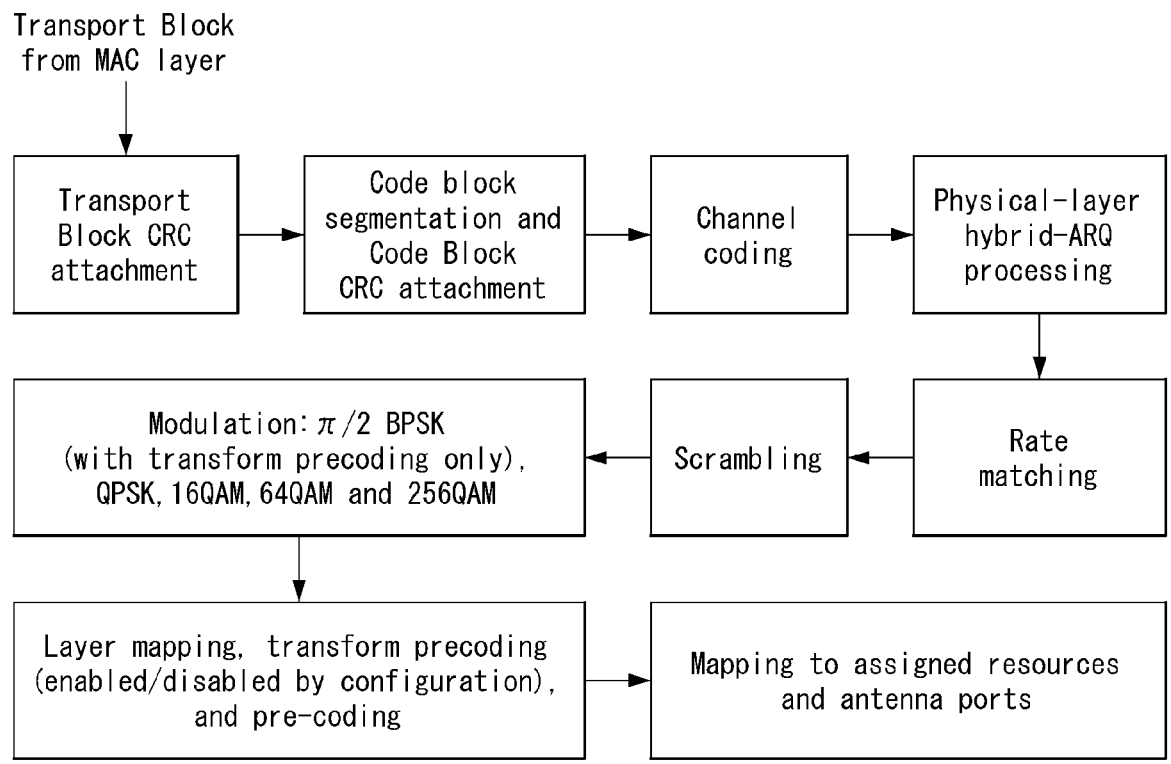
FIG. 33 illustrates a physical layer processing for SL according to an embodiment of the present disclosure.

FIG. 33 illustrates a physical layer processing for SL according to an embodiment of the present disclosure.

The UE may segment a transport block (TB) having a large length into several code blocks (CBs) having a small length. In addition, after the UE performs an encoding process for each of a plurality of code blocks having the small length, the UE may aggregate the plurality of code blocks having the small length into one again. In addition, the UE may transmit the code blocks aggregated into one to another UE.

Specifically, referring to FIG. 33, first, the UE may perform a cyclic redundancy check encoding process for the transport block having the large length. The UE may attach the CRC to the transport block. Thereafter, the UE may segment a transport block having a total length, to which the CRC is attached into a plurality of code blocks having a small length. In addition, the UE may perform the CRC encoding process for each of the plurality of code blocks having the small length again. The UE may attach the CRC to the code block. Accordingly, each code block may include the CRC. In addition, each code block to which the CRC is attached is input into a channel encoder to be subjected to a channel coding process. Thereafter, the UE may perform a rate matching process, bit unit scrambling, modulation, layer mapping, precoding, and antenna mapping, and the UE may transmit the code block to the receiving end.

Additionally, the channel coding scheme described through FIGS. 21 and 22 may be applied to the SL. For example, the uplink/downlink physical channel and signal described through FIGS. 21 and 22 may be substituted with the SL physical channel and signal. For example, channel coding defined for each of the data channel and the control channel in NR Uu may be defined to be similar to the channel coding for the data channel and the control channel on NR SL.

In the present disclosure, a wording "configuration or definition" may be interpreted as being (pre)configured from the BS or the network (through pre-defined signaling (e.g., SIB, MAC signaling, or RRC signaling). For example, "A may be configured" may include "the BS or network (pre) configures/defines or announces A for the UE". Alternatively, the wording "configuration or definition" may be interpreted as being pre-configured or defined by a system. For example, "A may be configured" may include "A is pre-configured/defined by the system"

Terminology Arrangement

Hereinafter, for convenience of description, in the present disclosure, the following abbreviations/acronym may be used.

ACK/NACK—Acknowledgement/No Acknowledgement
AGC—Automatic Gain Control
AS—Access Stratum
CB—Codeblock
CBG/CG—Codeblock Group
CBR—Channel Busy Ratio
CE—Control Element
CFO—Carrier Frequency Offset
CG—Configured Grant
CP—Cyclic Prefix
CRC—Cyclic Redundancy Check
CSI—Channel State Information
CSI-RS—Channel State Information Reference Signal
DCI—Downlink Control Channel
DL—Downlink
DM-RS—Demodulation RS
ECP—Extended CP
FDD—Frequency Division Duplex
HARQ—Hybrid Automatic Repeat Request
L1—Layer 1
L2—Layer 2
LBS—Location Based Service
LCS—Location Service
LSB—Least Significant Bit
MAC—Medium Access Control
MCS—Modulation Coding Scheme
MIB—Master Information Block
MPR—Maximum Power Reduction
MSB—Most Significant Bit
NAS—Non-Access Stratum
NCP—Normal CP
NDI—New Data Indicator
PBCH—Physical Broadcast Channel
PDCCH—Physical Downlink Control Channel
PDCP—Packet Data Convergence Protocol
PDSCH—Physical Downlink Shared Channel
PDU—Protocol Data Unit
PRS—Positioning Reference Signal
PSBCH—Physical Sidelink Broadcast Channel
PSCCH—Physical Sidelink Control Channel
PSFCH—Physical Sidelink Feedback Channel
PSS—Primary Synchronization Signal
PSSCH—Physical Sidelink Shared Channel
PUCCH—Physical Uplink Control Channel
PUSCH—Physical Uplink Shared Channel
QoS—Quality of Service
RB—Resource Block
RLC—Radio Link Control
RLM—Radio Link Monitoring
RLF—Radio Link Failure
RRC—Radio Resource Control
RS—Reference Signal
RSRP—Reference Signal Received Power
RSRQ—Reference Signal Received Quality
RSSI—Received Signal Strength Indicator
RSTD—Reference Signal Time Difference
RSU—Road Side Unit
RTT—Round Trip Time
RV—Redundancy Version
SCI—Sidelink Control Information
SCS—Sub-Carrier Spacing
SDAP—Service Data Adaptation Protocol
SIB—System Information Block
SL—Sidelink
SL OLPC—Open Loop Power Control
SL PL—Sidelink Pathloss
SLSSID—SL Synchronixatino Signal Identification
SNR—Signal-to-Noise Ratio
SPP—Sidelink Positioning Protocol
SPS—Semi-Persistent Scheduling
S-PSS—Sidelink PSS
SRS—Sounding Reference Signal
SSB—Synchronization Signal Block
SSS—Secondary Synchronization Signal
S-SSB—Sidelink SSB
S-SSS—Sidelink SSS
TB—Transport Block
TDD—Time Division Duplex
TDOA—Time Difference of Arrival
TOA—Time of Arrival
UE—User Equipment/End
UL—Uplink
Uu-PSS—Uu link PSS
Uu-SSS—Uu link SSS
XOR—Exclusive OR Hereinafter, in the present disclosure, a transmitting UE (TX UE) may be a UE that transmits data to a (target) receiving UE (RX UE). For example, the TX UE may be a UE that performs PSCCH and/or PSSCH transmission. And/or, the TX UE may be a UE that transmits an SL CSI-RS and/or SL CSI reporting request indicator to the (target) RX UE. And/or, the TX UE may be a UE that transmits a (control) channel (e.g., PSCCH, PSSCH, etc.) and/or a reference signal (e.g., DM-RS, CSI-RS, etc.) on the (control) channel, to be used for an SL RLM and/or SL RLF operation of the (target) RX UE.

Further, in the present disclosure, the receiving UE (RX UE) may be a UE that transmits an SL HARQ feedback to the TX UE according to (i) decoding of data received form the transmitting UE (TX UE) being successful and/or (ii)

detection/decoding of the PSCCH (related to PSSCH scheduling) transmitted by the TX UE being successful. And/or, the RX UE may be a UE that performs SL CSI transmission to the TX UE based on the SL CSI-RS and/or SL CSI reporting request indicator received from the TX UE. And/or, the RX UE may be a UE that transmits, to the TX UE, an SL (L1) RSRP measurement value measured based on a (pre-defined) reference signal and/or SL (L1) RSRP reporting request indicator received from the TX UE. And/or, the RX UE may be a UE that transmits data of the RX UE itself to the TX UE. And/or, the RX UE may be a UE that performs the SL RLM and/or SL RLF operation based on a (pre-configured) (control) channel received from the TX UE and/or the reference signal on the (control) channel.

Meanwhile, in the present disclosure, for example, when the RX UE transmits SL HARQ feedback information for the PSSCH and/or PSCCH received from the TX UE, the following schemes or some of the following schemes may be considered. Here, for example, the following schemes or some of the following schemes may also be limitedly applied only to a case where the RX UE successfully decodes/detects the PSCCH for scheduling the PSSCH.

Option 1) The RX UE may transmit, to the TX UE, NACK information only in a case where decoding/reception of the PSSCH received from the TX UE is unsuccessful.

Option 2) The RX UE may transmit, to the TX UE, the NACK information in a case where decoding/reception of the PSSCH received from the TX UE is successful, and in a case where the RX UE transmits ACK information to the TX UE, and decoding/reception of the PSSCH is unsuccessful.

Meanwhile, in the present disclosure, for example, the TX UE may transmit, to the RX UE, the following information or some of the following information through the SCI. Here, for example, the TX UE may transmit some or all of the following information to the RX UE through the first SCI and/or the second SCI.

PSSCH (and/or PSCCH) related resource allocation information (e.g., a time/frequency resource location/number, resource reservation information (e.g., periodicity))

SL CSI reporting request indicator or SL (L1) RSRP (and/or SL (L1) RSRQ and/or SL (L1) RSSI) reporting request indicator SL CSI transmission indicator (on PSSCH) (or SL (L1) RSRP (and/or SL (L1) RSRQ and/or SL (L1) RSSI) information transmission indicator)

MCS information

TX POWER information

L1 DESTINATION ID information and/or L1 SOURCE ID information

SL HARQ PROCESS ID information

NDI information

RV information (Transmission traffic/packet related) QoS information (e.g., priority information)

SL CSI-RS transmission indicator or (transmitted) SL CSI-RS antenna port number information Positional information of the TX UE or position (or distance area) information of a target RX UE (requesting the SL HARQ feedback)

Reference signal (e.g., DM-RS, etc.) information related to decoding (and/or channel estimation) of data transmitted through the PSSCH For example, the reference signal information may be information related to a pattern of a (time-frequency) mapping resource of the DM-RS, RANK information, antenna port index information, etc.

Meanwhile, in the present disclosure, since the TX UE may transmit, to the RX UE, the SCI, the first SCI, and/or the second SCI through the PSCCH, the PSCCH may be replaced/substituted with (i) SCI and/or (ii) first SCI and/or (iii) second SCI. And/or, the SCI may be replaced/substituted with the PSCCH and/or first SCI and/or second SCI. And/or, since the TX UE may transmit, to the RX UE, the second SCI through the PSSCH, the PSSCH may be replaced/substituted with the second SCI.

Meanwhile, in the present disclosure, for example, when SCI configuration fields are categorized into two groups by considering a (relatively) high SCI payload size, SCI including a first SCI configuration field group may be referred to as first SCI and SCI including a second SCI configuration field group may be referred to as second SCI. Further, for example, the first SCI may be transmitted to the RX UE through the PSCCH. Further, for example, the second SCI may be transmitted to the RX UE through (standalone) PSCCH or piggybacked and transmitted jointly with data through the PSSCH.

Meanwhile, in the present disclosure, for example, "configuration" or "definition" may mean (PRE)CONFIGURATION (to be resource pool specific) (through pre-defined signaling (e.g., SIB, MAC, RRC, etc.) from the BS or the network.

Meanwhile, in the present disclosure, for example, since RLF may be determined based on an OUT-OF-SYNCH (OOS) indicator or an IN-SYNCH (IS) indicator, the RLF may be replaced/substituted with OUT-OF-SYNCH (OOS) or IN-SYNCH (IS).

Meanwhile, in the present disclosure, for example, RB may be replaced/substituted with SUBCARRIER. Further, as one example, in the present disclosure, PACKET or TRAFFIC may be replaced/substituted with TB or MAC PDU according to a transmitted layer.

Meanwhile, in the present disclosure, CBG or CG may be replaced/substituted with TB.

Meanwhile, in the present disclosure, for example, SOURCE ID may be replaced/substituted with DESTINATION ID.

Meanwhile, in the present disclosure, for example, L1 ID may be replaced/substituted with L2 ID. For example, L1 ID may be L1 SOURCE ID or L1 DESTINATION ID. For example, L2 ID may be L2 SOURCE ID or L2 DESTINATION ID.

Meanwhile, in the present disclosure, for example, an operation of reserving/selecting/determining a retransmission resource by the transmitting UE may mean an operation of reserving/selecting/determining a potential retransmission resource for whether is to be determined to be actually used based on the SL HARQ feedback information received from the receiving UE by the transmitting UE.

Meanwhile, in the present disclosure, SL MODE 1 may mean a resource allocation scheme or a communication scheme in which the BS directly schedules a sidelink transmission (SL TX) resource of the UE through pre-defined signaling (e.g., DCI). Further, for example, SL MODE 2 may mean a resource allocation scheme or a communication scheme in which the UE independently selects the SL TX resource within a resource pool configured or pre-configured from the BS or network.

Meanwhile, in the present disclosure, for convenience of description, a (physical) channel which the RX UE uses when transmitting at least one of the following information to the TX UE may be referred to as PSFCH.

SL HARQ Feedback, SL CSI, and SL (L1) RSRP

In the present disclosure, the UE may select the SL resource within the resource pool based on sensing. In the present disclosure, a scheme in which the UE performs SL transmission by directly selecting the SL resource may be referred to as Mode 2 scheme, Mode 2 operation, or Resource allocation mode 2, and may be referred to as various forms in a range interpreted to be the same thereas or similar thereto.

In Resource allocation mode 2, the UE may detect SCI transmitted by another UE, the UE may identify a resource reserved by another UE based on the SCI, and the UE may acquire an RSRP measurement value on the identified resource. And/or, the UE may select a resource to be used for the SL transmission except for a specific resource within a resource selection window based on the sensing result. Here, the resource selection may be performed on a resource pool (pre)configured to the UE. More specifically, the UE may select a specific resource to be used for the SL transmission among (candidate) resources included in the resource pool (pre)configured to the UE.

In the case of such a sensing operation, the UE may refer to resource allocation information received through the first SCI. That is, the UE may detect/receive the first SCI from other UEs through the sensing operation, and acquire information on resources reserved by the other UEs among the resources included in the resource pool (pre)configured to the UE based on the detected/received first SC. In this case, due to overhead of the first SCI, the amount of information which the UE may acquire on the first SCI may be limited. That is, since the amount of information which may be included in the first SCI is limited, the amount which the UE may acquire on the first SCI may be limited.

In addition to a UE (hereinafter, referred to as type D P-UE) that supports both an SL reception operation and an SL reception operation, there may be a UE in which SL reception (reception operation) is limited for a purpose of power saving, and the UE in which the SL reception operation is limited may also select the resource to be used for the SL transmission based on the resource allocation mode 2 scheme. Here, the SL reception operation being limited may mean, for example, a case where a specific UE (hereinafter, referred to as type A PU-UE) is capable of performing only the SL transmission operation and does not support the SL reception operation. As another example, the SL reception operation being limited may mean a case where a specific UE (hereinafter, referred to as type B P-UE) is capable of performing the SL transmission operation and supports only a PSFCH reception and/or S-SSB reception operation.

In the case of the UE in which the SL reception operation is limited, a slot in which the UE performs sensing may be limited. More specifically, the slot in which the UE performs sensing being limited may mean a case where the UE performs SCI detection only for some slots within a sensing window based on a potential available slot.

In the case of the UE in which the SL reception operation is limited, a second sensing window may be configured to the UE for a purpose of using reservation information of another UE by aperiodic traffic for resource selection. The second sensing window may be configured for SC detection. Specifically, the second sensing window may be configured for detecting SCI transmitted from another UE. The second sensing window may be configured before the resource selection window. And/or, the second sensing window may be configured at a previous time point of the resource selection window. And/or, the second sensing window may be configured in each potential available slot. Here, the potential available slot may be a slot which the UE in which the SL reception operation is limited may select for the SL transmission. The potential available slot may include one or more slots. Herein, the number of one or more slots included in the potential available slot may be configured based on implementation of the UE in which the SL reception operation is limited. Here, the potential available slot may be referred to as a terminology such as an available slot, and may be referred to as various forms in a range interpreted to be the same thereas/similar thereto. The second sensing window may be configured separately from the first sensing window, and the first sensing window may be a sensing window configured for a purpose of using reservation information of another UE by periodic traffic for the resource selection by a UE in which the SL reception operation is not limited. In the present disclosure, for convenience of description, the terminology such as the second sensing window is used in order to distinguish a sensing window configured for sensing of the UE in which the SL reception operation is limited from the first sensing window, but the second sensing window may also be referred to as an expression such as the sensing window.

In the present disclosure, the second sensing window configuring method and a second resource selection window configuring method based on the second sensing window, and methods related thereto are proposed.

In the present disclosure, resource selection for the SL transmission of the UE may be triggered in slot n. A processing time required for the UE to summarize and/or prepare a sensing result may be expressed as T_proc,0, and a value which T_proc,0 has may be a slot unit, and may be configured to different values according to the subcarrier spacing. More specifically, the value of T_proc,0 may be 1, 1, 2, and 4 slots according to subcarrier spacings 15 kHz, 30 kHz, 60 kHz, and 120 kHz, respectively.

Further, in the present disclosure, a processing time required for a process of selecting the resource based on the sensing result and/or a process of preparing data to be transmitted by the UE may have a value expressed as T_proc,1 as an upperlimit, and a value which T_proc,1 has may be the slot unit, and may be configured to different values according to the subcarrier spacing. More specifically, the value of T_proc,1 may be 3, 5, 9, and 17 slots according to the subcarrier spacings 15 kHz, 30 kHz, 60 kHz, and 120 kHz, respectively.

In the present disclosure, the second sensing window may be expressed as a form of starting at n+T_A and ending at n+T_B based on slot n in which the UE triggers the resource selection. In this case, the UE may be capable of selecting the resource from n+T'_1.

Meanwhile, when the UE performs the resource selection based on the first sensing window for the periodic traffic, the resource selection window may start at n+T_1 and end at n+T_2. The resource selection window for the resource selection based on the first sensing window may be referred to as a first resource selection window, and may be referred to as various forms in a range interpreted to be the same thereas/similar thereto. The value of the T_1 may be a value equal to or smaller than the value of T_proc,1, and may be a value selected by the UE. The value of the T_2 may be a value equal to or larger than (pre)configured T_2 min and equal to or smaller than remaining PDB, and may be a value selected by the UE.

In the present disclosure, the processing time or a value of an offset determined by a combination of T_proc,0 and/or T_proc,1 and/or T_1 is selected by the UE, and may include a case where an upperlimit thereof is T_proc,0+T_proc,1.

Second Sensing Window Configuring Method

Hereinafter, the second sensing window configuring method will be described.

Second sensing window start position (time point) configuring method

A start position (time point) of the second sensing window may be a position from time point slot n in which the UE triggers the resource selection or a position of an earliest logical slot therefrom. Here, the earliest logical slot may be a slot which belongs to the resource pool (pre)configured to the UE. More specifically, the start position of the second sensing window may be a position from time point slot n in which the UE triggers the resource selection or a position of an earliest positioned logical slot based on a time point thereafter.

And/or, the start position of the second sensing window may be a position of the earliest logical slot after a specific time from time point slot n in which the UE triggers the resource selection. Here, the earliest logical slot may be a slot which belongs to the resource pool (pre)configured to the UE. More specifically, the start position of the second sensing window may be a position of the earliest positioned logical slot based on the time point after the specific time from time point slot n in which the UE triggers the resource selection. A basis for defining the start position of the second sensing window as above may be to ensure a processing time for performing/switching the SL reception operation again after the UE triggers the resource selection. Here, the specific time may be a pre-configured value, and for example, the specific time may be configured to T_proc,0, T_proc,1, or T_1 or a combination thereof. And/or, the specific time may be a value (pre)configured for each resource pool and/or for each range of the T_2 and/or for each remaining PDB range and/or for each congestion control level and/or each service type and/or each QoS.

And/or, the start position of the second sensing window may be a position before slot n+T'_1 which is an initial time point when the resource selection may be performed by using the sensing result within the second sensing window by a specific time. More specifically, a position before on the logical slot from the potential available slot may be the start position of the second sensing window by 32 or 31 slots. Here, the logical slot may be a slot which belongs to the resource pool (pre)configured to the UE. That is, the start position of the second sensing window may be a position corresponding to a position before the potential available slot by 32 or 31 slots as the logical slot unit. In this case, when the start position of the second sensing window is earlier than time point slot n in which the UE triggers the resource selection, the UE may change the start position of the second sensing window to (i) slot n or (ii) the earliest logical slot (may be the slot which belongs to the resource pool) after slot n.

And/or, the start position of the second sensing window may be a start position before a first slot among the potential available slots by a specific time. More specifically, a position before the logical slot (may be the slot which belongs to the resource pool) from the potential available slot may be the start position of the second sensing window by 32 or 31 slots. That is, the start position of the second sensing window may be a position corresponding to a position before a first slot among the slots included in the potential available slot by 32 or 31 slots as the logical slot unit. In this case, when the start position of the second sensing window is earlier than time point slot n in which the UE triggers the resource selection, the UE may change the start position of the second sensing window to (i) slot n or (ii) the earliest logical slot (may be the slot which belongs to the resource pool) after slot n.

A value of T_A related to determination of the start position of the second sensing window may be an index value of a physical slot transformed to an appropriate form according to the above-described embodiments. For example, the value of T_A may also be configured based on (i) an earliest time point or (ii) a latest time point according to the combination of the embodiments. Further, the value of T_A may have the embodiment as a lowerlimit value or an upperlimit value. That is, the value of T_A may be determined by setting the value determined based on the embodiments as the lowerlimit value or the upperlimit value.

Second Sensing Window End Position (Time Point) Configuring Method

The end time point (position) of the second sensing window may be determined based on the number of logical slots (may be the slot which belongs to the resource pool) within the second sensing window. For example, the end time point of the second sensing window may be determined so that the number of logical slots within the second sensing window becomes 32 or 31. As one example, the end time point of the second sensing window may be determined so that the number of logical slots within the second sensing window becomes a value acquired by excluding the processing time from 32 or 31 slots. That is, the end time pint of the second sensing window may be determined so that slots of a number acquired by excluding a slot number corresponding to the processing time from 32 or 31 slots are included within the second sensing window. Here, the processing time may a time corresponding to T_proc,0, T_proc,1, or T_1 or a combination (T_proc,0+T_1 or T_proc,0+T_proc,1) of T_proc,0/T_proc,1/T1.

And/or, the end time point of the second sensing window may be configured so that the number of logical slots within the second sensing window satisfies a value (pre)configured for each resource pool and/or for each T_2 value range and/or for each remaining PDB range or becomes the corresponding value or more. For example, the end time point of the second sensing window may be configured so that the number of physical slots within the second sensing window satisfies a value (pre)configured for each resource pool and/or for each T_2 value range and/or for each remaining PDB range or becomes the corresponding value or more.

And/or, the end time point of the second sensing window may be a time point before a time point slot n+T'_1 when the resource selection may be performed based on the sensing result within the second sensing window by a specific offset. That is, the end time point of the second sensing window may be configured as a time point before the slot n+T'_1 based on the slot n+T'_1 corresponding to (related to) the time point when the resource selection may be performed based on the sensing result within the second sensing window by a specific offset. Here, the specific offset may be determined as a combination of T_proc,0 and/or T_proc,1 and/or T_1. For example, the specific offset may be determined as a sum of T_proc,0 and T_proc,1 or a sum of T_proc,0 and T_1. As a basis therefor, the position of the time point slot n+T'_1 in which the resource selection is possible may be determined according to the processing time T_proc,1 or T_1 for resource selection and transmission data/signal preparation based on the sensing result again at the processing time $T\_proc,0$ for sensing result processing after the UE performs sensing for the second sensing window. That is, a basis for configuring the specific offset as such is that the position of the time point slot $n+T'\_1$ in which the resource selection is possible is determined according to the processing time $T\_proc,1$ or $T\_1$ for resource selection and transmission data/signal preparation based on the sensing result again at the processing time $T\_proc,0$ for sensing result processing after the UE performs sensing for the second sensing window.

And/or, the end time point of the second sensing window may be configured a time point before a first slot among the potential available slots by a specific offset. For example, the specific offset may be determined as a combination of $T\_proc,0$ and/or $T\_proc,1$ and/or $T\_1$. More specifically, the specific offset may be determined as a sum of $T\_proc,0$ and $T\_proc,1$ or a sum of $T\_proc,0$ and $T\_1$. When the specific offset is the sum of $T\_proc,0$ and $T\_proc,1$, the end time point of the second sensing window may be a time point before the first slot of the potential available slot by a slot number corresponding to a sum of (i) a processing time for the UE to acquire the sensing result and (ii) a processing time for the UE to select a resource for the sidelink transmission based on the sensing result. Here, the $T\_1$ value may also be equal to a parameter used for the start position of the first resource selection window determined upon a periodic partial sensing operation of the UE, and separately selected, but an upperlimit thereof may also be $T\_proc,1$. As a basis therefor, the position of the time point slot $n+T'\_1$ in which the resource selection is possible may be determined according to the processing time $T\_proc,1$ or $T\_1$ for resource selection and transmission data/signal preparation based on the sensing result again at the processing time $T\_proc,0$ for sensing result processing after the UE performs sensing for the second sensing window. That is, a basis for configuring the specific offset as such is that the position of the time point slot $n+T'\_1$ in which the resource selection is possible may be determined according to the processing time $T\_proc,1$ or $T\_1$ for resource selection and transmission data/signal preparation based on the sensing result again at the processing time $T\_proc,0$ for sensing result processing after the UE performs sensing for the second sensing window.

A value of $T\_B$ related to determination of the end time point of the second sensing window may be an index value of a physical slot transformed to an appropriate form according to the embodiments. For example, the value of $T\_B$ may also be configured based on an earliest time point or a latest time point according to the combination of the embodiments. Further, the value of $T\_B$ may have the embodiment as a lowerlimit value or an upperlimit value. That is, the value of $T\_B$ may be determined by setting the value determined based on the embodiments as the lowerlimit value or the upperlimit value.

Second Resource Selection Window Configuring Method and Method Related Thereto

Hereinafter, the second resource selection window configuring method based on the sensing result within the second sensing window and the method related thereto will be described.

Start Time Point Configuring Method of Second Resource Selection Window

In respect to the time point slot $n+T'\_1$ in which the resource selection is possible based on the sensing result within the second sensing window, a size of the second resource selection window up to $n+T\_2$ starting from a value of $T'\_1$ or $n+T'\_1$ may be (pre)configured and/or determined according to the $T\_2$ value or the remaining PDB range for the packet corresponding to the resource selection. That is, $n+T'\_1$ which is the start time point of the second resource selection window may be determined based on $T'\_1$ determined based on the remaining PDB range for the packet corresponding to the resource selection of the UE, the end time point of the second resource selection window may be determined based on the $T\_2$ value related to (the end time point of) the first resource selection window, and the size of the second resource selection window up to $n+T\_2$ starting from $n+T'\_1$ may be (pre)configured and/or determined based on the $T'\_1$ value and the $T\_2$ value. Here, the time point slot $n+T'\_1$ in which the resource selection is possible based on the sensing result within the second sensing window may mean the start position (time point) of the second resource selection window.

And/or, the start position (time point) of the second resource selection window may be configured so that the number of logical slots within the second resource selection window (may be the number of slots which belong to the resource pool) becomes a specific threshold or more. For example, the specific threshold may be a (pre)configured value. As another example, the specific threshold may be configured to a minimum value of the potential available slot. As yet another example, the specific threshold may be configured to a multiple of a scaling value pre-defined or (pre)configured of the minimum value of the potential available slot. That is, the specific threshold may be configured to a value acquired by multiplying the minimum value of the potential available slot by the (pre)defined/configured scaling value.

And/or, the time point slot $n+T'\_1$ in which the resource selection is possible based on the sensing result within the second sensing window may be determined as a physical slot after the end time point of the second sensing window by a specific offset or an earliest logical slot (may be the slot which belongs to the resource pool) after the end time point of the second sensing window. That is, the time point slot $n+T'\_1$ in which the resource selection is possible based on the sensing result within the second sensing window may be determined as a physical slot after the end time point of the second sensing window by a specific offset or an earliest logical slot (may be the slot which belongs to the resource pool) after the end time point of the second sensing window. Here, the specific offset may be determined as a combination of $T\_proc,0$ and/or $T\_proc,1$ and/or $T\_1$. For example, the specific offset may be $T\_proc,1$ or $T\_1$. As another example, the specific offset may be determined as a sum of $T\_proc,0$ and $T\_proc,1$ or a sum of $T\_proc,0$ and $T\_1$. It may be appreciated that when the specific offset is determined as $T\_proc,1$, the start time point of the second resource selection window is determined as a time point separated from the slot n related to the time point when the selection of the sidelink transmission resource is triggered by a time offset ($T'\_1$) and the time offset ($T'\_1$) is determined based on the specific offset $T\_proc,1$. Here, the $T\_1$ value may also be equal to a parameter used for the start position of the first resource selection window determined upon a periodic partial sensing operation, and separately selected, but an upperlimit thereof may also be $T\_proc,1$. As another example, in respect to the specific offset, the size of the second selection window up to $n+T\_2$ starting from the $T'\_1$ value or $n+T'\_1$ may be (pre)configured according to the $T\_2$ value or the remaining PDB range for the packet corresponding to the resource selection. That is, the specific offset may be determined/configured for each resource pool and/or based on the remaining PDB range for the packet corresponding to the resource selection, and the second resource selection window may be (pre)configured as a size up to n+T_2 starting from n+T'_1 based on the determined/configured specific offset value. Here, it may be appreciated that the end time point of the second resource selection window is determined as a time point separated from the slot n related to the time point when the selection of the sidelink transmission resource is triggered by a time offset (T_2), and the time offset (T_2) is also determined based on the remaining PDB range.

And/or, the time point slot n+T'_1 in which the resource selection is possible based on the sensing result within the second sensing window may be determined as a physical slot after the start time point of the second sensing window by a specific offset or an earliest logical slot (may be the slot which belongs to the resource pool) after the start time point of the second sensing window. That is, the time point slot n+T'_1 in which the resource selection is possible based on the sensing result within the second sensing window may be determined as a physical slot after the start time point of the second sensing window by a specific offset or an earliest logical slot (may be the slot which belongs to the resource pool) after the start time point of the second sensing window. Here, the specific offset may be 32 or 31 slots in a logical slot domain. This may be a case where a reservation resource is configured at a farthest time point as TRIV in the SCI transmitted at the start time point of the second sensing window. That is, in the case where the reservation resource is configured at the farthest time point as TRIV in the SCI transmitted at the start time point of the second sensing window, the specific offset may be configured to a size as large as 32 or 31 slots. As another example, the specific offset value may be a value (pre)configured for each resource pool and/or for each range of the T_2 and/or for each remaining PDB range and/or for each congestion control level and/or each service type and/or each QoS.

A value of T'_1 related to determination of the time point slot based on the sensing result within the second sensing window may be an index value of a physical slot transformed to an appropriate form according to the embodiment. For example, the value of T'_1 may also be configured based on an earliest time point or a latest time point according to the combination of the embodiments. For example, the value of T'_1 may have the embodiment as a lowerlimit value or an upperlimit value. That is, the value of T'_1 may be determined by setting the value determined based on the embodiments as the lowerlimit value or the upperlimit value.

Candidate Resource Determining Method for Resource Selection Related to SL Transmission With the introduction of the second sensing window, a substantial size of the resource selection window for the UE may be reduced, and the substantial size reduction of the resource selection window may increase a collision frequency between resources selected by different UEs. Further, as a width of the resource selection of the UE is limited due to the substantial size reduction of the resource selection window size, a flexibility of the resource selection may be reduced. Further, when the size of the second sensing window is configured to be smaller than a predetermined level or more, some of the resource reservation information according to the aperiodic traffic is not received, and as a result, a frequency of a case where the resource collision occurs may also be increased because yet another UE uses a resource reserved by another UE when selecting the resource. That is, the size of the second sensing window is configured to be smaller at a predetermined level or more, and as a result, the UE may not sufficiently receive/detect/acquire resource reservation information of other UEs before selecting the resource for performing the SL transmission. Therefore, a resource already reserved by another UE is used when the UE performing the SL transmission selects the resource, and as a result, a resource collision occurrence frequency between the UEs may increase.

In order to solve such a problem, the UE may be excluded from a target of the resource selection up to a time point after a slot n+T_A or the earliest logical slot (may be the slot which belongs to the resource pool) after the time point by 31 logical slots in a logical slot domain. That is, slots which exist between the slot n+T_A or the earliest logical slot (may be the slot which belongs to the resource pool) after the time point and (ii) the time point after the earliest logical slot by 31 logical slots in the logical slot domain may be excluded from the target of the resource selection of the UE. Here, after 32 or 31 logical slots may mean that the number of logical slots up to a specific time point from a next slot of a reference point is 32 or 31. This indicates that the UE the resource reservation may be made in the slot before n+T'_1 by the SCI transmitted before the UE performs the sensing operation in the second sensing window. That is, the slots positioned within the specific time interval are excluded from the target of the resource selection as such because the resource reservation may be made in the slot before n+T'_1 by the SCI transmitted by another UE at the time point before the UE performs the sensing operation in the second sensing window. According to the above description, the UE may not expect reception of SCI for reserving a resource at the time point n+T'_1 or a first potential available slot through the TRIV in the slot before the time point n+T_A. For example, a TRIV or a maximum slot offset value which the UE may support for each resource pool and/or for each QoS parameter and/or for each service type and/or for each congestion control level and/or for each T_2 range and/or for each remaining PDB range may be (pre)configured. The maximum slot offset may also be an offset between resources or when three resources are indicated in the SCI, the maximum slot offset may indicate a distance between a first resource and a last resource in terms of the time.

And/or, when the number of potential selection slots may not be selected to be a configured minimum value or more in remaining windows other than the second sensing window in the resource selection window of the UE, the sensing operation for the second sensing window and resource selection using the same sensing operation may not be performed. That is, when potential selection (available) slots may not be selected to be a minimum value configured to the UE or more in remaining windows other than the second sensing window in the resource selection window of the UE, the UE may not perform the sensing operation for the second sensing window and the resource selection using the same sensing operation. Such an operation may be performed when the entirety/a part of the second sensing window is overlapped with the resource selection window of the UE. In this case, when the UE performs a potential selection (available) slot based resource reservation periodicity based sensing slot configuration and a sensing operation (hereinafter, a periodic partial sensing operation) therefor, the UE may perform the corresponding periodic partial sensing operation and the resource selection therefor, and in other cases, the UE may perform random resource selection. For example, when the number of potential selection (available) slots may not be selected to be a configured minimum value or more in remaining windows other than the second sensing window in the resource selection window of the UE, the (potential selection slot based) partial sensing operation and the resource selection using the same may not be performed.

And/or, when a ratio of the size of the second sensing window or the number of logical slots within the window to the number of logical slots (slot which belongs to the resource pool) is a specific threshold or more in the remaining windows other than the second sensing window in the resource selection window of the UE, the sensing operation for the second sensing window and the resource selection using the same may not be performed. In this case, when the UE performs a potential selection slot based resource reservation periodicity based sensing slot configuration and a sensing operation (hereinafter, a periodic partial sensing operation) therefor, the UE may perform the corresponding periodic partial sensing operation and the resource selection therefor, and in other cases, the UE may perform random resource selection. For example, when a ratio of the size of the second sensing window or the number of logical slots within the window to the number of logical slots (slot which belongs to the resource pool) is a specific threshold or more in the remaining windows other than the second sensing window in the resource selection window of the UE, the (potential selection slot based) partial sensing operation and the resource selection using the same may not be performed. For example, the specific threshold may be a value (pre) configured for each resource pool and/or for each range of the T_2 and/or for each remaining PDB range and/or for each congestion control level and/or each service type and/or each QoS.

The UE may continuously perform RE-EVALUATION and/or PRE-EMPTION check even for the resource reserved for the SL transmission, and in this case, as time elapsed (since T_2 or a remaining packet data budget (PDB) is reduced), the size of the resource selection window may be reduced. For example, the minimum number of potential selection (available) slots may be (pre)configured according to the T_2 value range and/or the remaining PDB value range. For example, when the UE performs the RE-EVALUATION and/or PRE-EMPTION check, the minimum number value of potential selection slots may be updated by a scheme of subtracting the number of potential selection available slots included in a resource selection window at a previous time point, but excluded from the updated resource selection window from the minimum number of potential selection slots.

RE-EVALUATION and/or PRE-EMPTION Method Related to Resource Re-Selection and DRX Operation When the UE performs the RE-EVALUATION and/or PRE-EMPTION check for an already selected resource, there may be a limit in performing resource re-selection for the already selected resource due to the partial sensing operation. More specifically, when the UE reports RE-EVALUATION and/or PRE-EMPTION for the already selected resource, the selected resource is replaced with another resource. Here, the replaced resource may be a resource re-selected based on the RE-EVALUATION and/or PRE-EMPTION. In this case, when the UE does not perform sensing for a slot derived based on a resource reservation periodicity for the replaced resource, the use of the resource may cause a collision with periodic transmission of another UE. For example, when the UE re-selects the resource by the RE-EVALUATION and/or PRE-EMPTION, the target may be limited to a resource of another potential available slot. That is, when the UE re-selects the resource based on the RE-EVALUATION and/or PRE-EMPTION, resources which become the target of the resource re-selection may be limited to resources of yet another potential available slot. The resources which become the target of the resource re-selection being limited to the resources of yet another potential available slot means that the resources which become the target of the resource re-selection may be limited to the remaining potential available slots other than a potential available slot related to the already selected resource among the pre-configured potential available slots. In other words, it may be appreciated that the resource for the resource re-selection based on the RE-EVALUATION and/or PRE-EMPTION is configured based on the remaining slot other than the slot related to the selected resource based on the sensing result of the UE in a pre-configured/determined potential available slot. In other words, this corresponds to a resource for which the UE already performs sensing. That is, the resources which become the target of the resource re-selection are limited to the resource of another potential available slot because other potential available slots may be the resources for which the UE already performs sensing, and as a result, the collision with the SL transmission of another UE on the resource re-selected by the resource re-selection may be avoided.

And/or, when the UE performs the resource re-selection, if there is no another potential available slot or there is no available slot (which may be used for the transmission of the UE) in the slot, the UE may also use the previously selected resource for the transmission as it is or also omit the transmission using the resource or also perform the random resource selection. Further, by another scheme, the UE may perform additional (periodic partial) sensing for a purpose of re-selecting the resource by the RE-EVALUATION and/or PRE-EMPTION. For example, the UE may use a resource other than the potential available slot for the resource re-selection according to a current sensing situation or a sensing situation.

And/or, the UE may perform an SL discontinuous reception (DRX) operation in receiving the PSCCH or SCI, and all or some of slots performing partial sensing corresponding to the potential available slot may also be present outside ACTIVE TIME configured/determined in the SL DRX. That is, some of the slots (sensing windows) performing the partial sensing corresponding to the potential available slot may be overlapped with the ACTIVE TIME and all of the sensing windows may not be overlapped with the ACTIVE TIME. Here, the ACTIVE TIME may mean a time interval in which the DRX operation is activated. In this case, the UE that performs the partial sensing may attempt PSCCH and/or SCI detection in a sensing slot determined/derived in the partial sensing operation even outside the ACTIVE TIME of the SL DRX. As another example, when even the sensing slot determined/derived in the partial sensing operation corresponds to the outside of the ACTIVE TIME of the SL DRX, the UE may omit the PSCCH and/or SCI detection for the corresponding sensing slot. In this case, the UE may exclude the potential available slot corresponding to a sensing slot in which the UE does not perform the PSCCH and/or SCI detection/reception or the resources in the slot from available resource or selection resource candidates. For example, the UE may expect that the SCI for reserving the resource within the potential selection available slot of the UE in the sensing slot in which the UE does not perform the detection/reception. In the embodiment, a combination of each scheme may also be supported, and in each scheme, the UE may perform the detection/reception differently according to a configuration type (e.g., a common SL DRX configuration and a dedicated SL DRX configuration) of the SL DRX.

And/or, the UE may perform the RE-EVALUATION and/or PRE-EMPTION check for a selection resource(s) which is(are) derived as a result of a resource (re)selection process which is previously performed (which may be expressed as a combination of the sub-channel and/or the slot). That is, when the selection resource is overlapped with another reservation resource based on the SCI received by the UE before being used for actual transmission and/or when a PSCCH or PSSCH DMRS based RSRP measurement value corresponding to the SCI is a specific threshold or more and/or according to a reception priority value derived from the SCI and a transmission priority value for a packet to be transmitted by the UE (corresponding to the resource re-selection process) (e.g., when the reception priority value is less than a (pre)configured threshold and the reception priority value is smaller than the transmission priority value), the UE may report the RE-EVALUATION or PRE-EMPTION for the selection resource to the higher layer, and perform resource re-selection therefor. In this case, the UE may perform an RE-EVALUATION and/or PRE-EMPTION check operation at a time point before T_3 from a time position of the first re-selection resource (specific selection resource) based on a specific selection resource which becomes a target of at least RE-EVALUATION and/or PRE-EMPTION by considering a time required for a processing, and performing the RE-EVALUATION and/or PRE-EMPTION check operation before or after the specific time point may vary depending on implementation of the UE. For example, the specific selection resource which becomes the reference may be earliest in terms of the time among the selection resources which become the target of the RE-EVALUATION and/or PRE-EMPTION.

And/or, of a resource selection scheme (hereinafter, referred to as periodic partial sensing based resource selection) using a sensing result of some slots (e.g., derived based on the potential available slot and the resource reservation periodicity) in the first sensing window and/or a resource selection scheme (hereinafter, referred to as aperiodic partial sensing based resource selection) using a sensing result of all or some slots (e.g., derived based on the potential available slot and/or a resource selection triggering time point) within the second sensing window, a scheme which the UE is to use for the resource selection may be (pre) configured to the UE for each resource pool and/or for each congestion control level and/or for each transmission priority value (range) of the UE. For example, in the case of performing the periodic partial sensing based resource selection, the value of T_3 may be T_proc,1. Further, in the case of performing the aperiodic partial sensing based resource selection, the value of T_3 may be T_proc,0+T_proc,1 or T_proc,0+T_1. For example, the T_1 value may also be equal to a parameter used for the start position of the first resource selection window determined upon a periodic partial sensing operation, and separately selected, but an upperlimit thereof may also be T_proc,1. As another example, the value of T_3 may be a third parameter having T_proc,0+ T_proc,1 as the upperlimit (or lowerlimit). For example, the T_3 value may be configured to additionally include 32 logical slots in the value. As yet another example, the T_3 value may be configured to additionally include the size of the second sensing window in the value. That is, the T_3 value may be T_proc,0+T_proc,1+second sensing window size or a parameter value having the corresponding value as the upperlimit (or lowerlimit). A basis for configuring the T_3 value to T_proc,0+T_proc,1+second sensing window size or the parameter value having the corresponding value as the upperlimit (or lowerlimit) is to ensure a time interval for detecting the SCI again upon the RE-EVALUATION and/or PRE-EMPTION check and/or a processing time for processing the same. Further, in the case of performing the aperiodic partial sensing based resource selection, the value of T_3 may also still be kept to be T_proc,1. For example, in the above case, a resource which may be re-selected for the selection resource which becomes the target of the RE-EVALUATION and/or PRE-EMPTION check may be T_proc,0, the second sensing window size, or a target after a sum thereof. For example, the resource which may be re-selected for the selection resource which becomes the target of the RE-EVALUATION and/or PRE-EMPTION check may be the resource corresponding to the potential available slot. In this case, the limitation may be related to the case where the UE performs the periodic partial sensing based resource selection. A basis for limiting the resource which may be re-selected for the selection resource which becomes the target of the RE-EVALUATION and/or PRE-EMPTION check to the resource corresponding to the potential available slot is that when other slots are determined as the re-selection resource, the collision with the reservation resource of another UE may not be avoided due to absence of the sensing result for the other slots. For example, when there is no resource which may be re-selected before a specific time point (e.g., immediately before or at a round-trip time (RTT) for the SL HARQ process operation) based on a next selection resource time point of the selection resource which becomes the target of the re-selection, the UE may abandon or omit the transmission in the selection resource.

Meanwhile, when performing periodic partial sensing, the UE may be (pre)configured with (i) reservation periodicities of all or some resources configured in the resource pool and/or (ii) how many sensing slots are to be configured for each periodicity and/or (iii) what numberth slot is to be configured as the sensing slot for each periodicity, in order to derive a slot which is to perform the periodic partial sensing. As one example, the UE may derive a plurality of slots (related to determination of the slot which is to perform the periodic partial sensing) from each available slot based on a multiple of the specific periodicity for a specific periodicity value. The UE may include a latest slot (by considering the PROCESSING TIME) before the first slot of the available slot of the UE among the plurality of derived slots, and additionally determine a previous slot corresponding to the periodicity as the sensing slot according to a configuration value. That is, among the plurality of derived slots, (i) a slot positioned at a latest time point (by considering the PROCESSING TIME) among the slots positioned before the first slot of the available slot of the UE and (ii) slots corresponding the periodicity among the slots positioned before the slot positioned at the latest time point are included in the slot in which the UE performs the periodic partial sensing. Here, (ii) the slots corresponding the periodicity among the slots positioned before the slot positioned at the latest time point may be included in the slot in which the UE performs the periodic partial sensing according to the configuration value related to the periodicity for the partial sensing. In this case, when a resource reservation periodicity value referenced upon the partial sensing is large, the sensing slot generated by the multiple value of the periodicity may be unnecessarily configured distant from the resource selection window and/or the available slot, which may cause inefficient power consumption of the UE.

For example, when performing the periodic partial sensing, the UE may exclude some sensing slot candidates of which time positions are before a specific time point among the sensing slot candidates generated from a periodicity value for the partial sensing and a multiple value(s) for the periodicity value, from the generated sensing slot candidates. And/or, the UE may disregard the multiple value for the partial sensing for the corresponding periodicity. That is, the UE may disregard the multiple value for the partial sensing for the periodicity related to some sensing slot candidates of which time positions are before the specific time point. For example, the specific time point may be a time point when the UE triggers the resource (re)selection or a time point before 1100 msec from the slot. Here, 1100 msec may be converted into the physical slot or logical slot, and applied. As another example, the specific time point may be a time point when the UE triggers the resource (re) selection or a time point before 100 msec from the slot. Here, 100 msec may be converted into the physical slot or logical slot, and applied. As yet another example, the specific time point may be a time point when the UE triggers the resource (re)selection or a time point before 1000 msec from the slot. Here, 1000 msec may be converted into the physical slot or logical slot, and applied. As still yet another example, the specific time point may be the time point when the UE triggers the resource (re)selection or a time point before a parameter (sl-SensingWindow) for the start of the sensing window configured in the resource pool or a T_0 value derived based on the parameter from the slot. As still yet another example, the specific time point may be a time point before a maximum value of a resource reservation periodicity configured in the resource pool from the first slot of the resource selection window of the UE. As still yet another example, the specific time point may be a time point before a maximum value of a resource reservation periodicity configured in the resource pool from the available slot at an earliest time point of the UE. As still yet another example, the specific time point may be a time point before a maximum value of a resource reservation periodicity configured in the resource pool from the available slot corresponding to the sensing slot candidate of the UE. As still yet another example, the specific time point may be a time point before a maximum value of a resource reservation periodicity which may be configured from the first slot of the resource selection window of the UE. As still yet another example, the specific time point may be a time point before a maximum value of a resource reservation periodicity which may be configured from the available slot at an earliest time point of the UE. As still yet another example, the specific time point may be a time point before a maximum value of a resource reservation periodicity which may be configured from the available slot corresponding to the sensing slot candidate of the UE. As still yet another example, the specific time point may be a time point before 1100 msec from the available slot at an earliest time point of the UE. As still yet another example, the specific time point may be a time point before 1100 msec from the available slot corresponding to the sensing slot candidate of the UE. As still yet another example, the specific time point may be a time point before 100 msec from the available slot at an earliest time point of the UE. As still yet another example, the specific time point may be a time point before 100 msec from the available slot corresponding to the sensing slot candidate of the UE. As still yet another example, the specific time point may be a time point before a parameter (sl-SensingWindow) for the start of the sensing window configured in the resource pool or a T_0 value derived based on the parameter from the available slot at the earliest time point of the UE. As still yet another example, the specific time point may be a time point before a parameter (sl-SensingWindow) for the start of the sensing window configured in the resource pool or a T_0 value derived based on the parameter from the available slot corresponding to the sensing slot candidate.

The sensing operation of the UE may be exceptionally permitted for the sensing slot before the specific time point again according to the priority value and/or according to the congestion control level. Here, the exception may mean a case where the priority value is equal to or less than or less than a (pre)configured threshold. Further, the exception may mean a case where the congestion level is equal to or more than or more than a (pre)configured threshold. Further, the exception may mean a case where the congestion level is equal to or less than or less than the (pre)configured threshold. Further, the exception may mean a case where the UE belongs to the ACTIVE TIME by the SIDELINK DRX operation based on the UE for the sensing slot before the specific time point or a case where the UE is permitted to perform the sensing operation for another reason. In this case, a sensing result in a region where sensing is permitted may be used for resource (re)selection of the UE. In the embodiments of the present disclosure, when how many sensing slots are to be configured for each the resource reservation periodicity or the periodicity value for the partial sensing operation is configured for the UE, a spirit disclosed by the embodiment of the present disclosure may be extended for an operation expected by the UE. That is, in a sensing slot configuration for a specific periodicity, the UE may not expect that the sensing slot derived from the combination is present before a specific time point.

Figure 34:
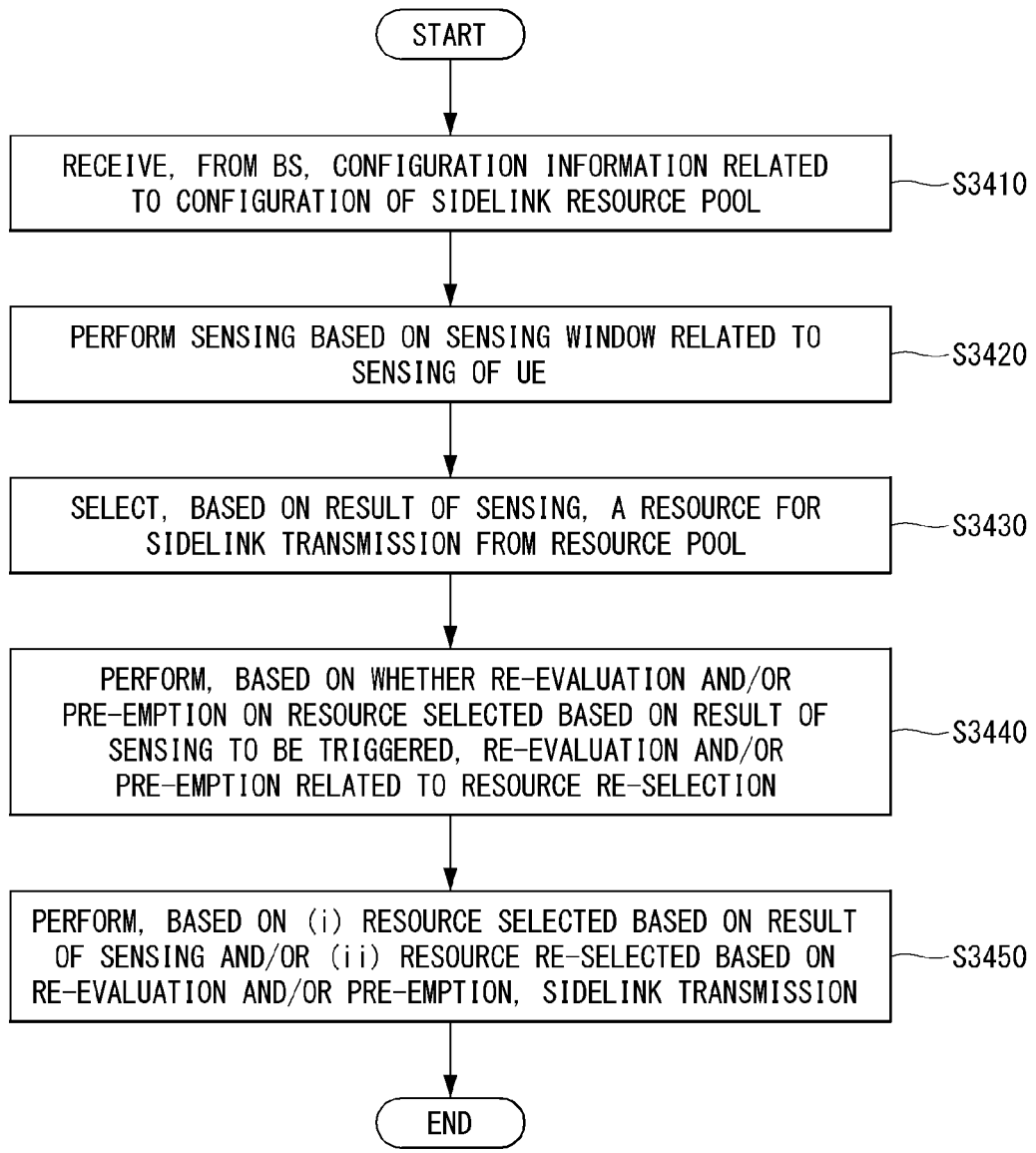
FIG. 34 is a flowchart illustrating one example of performing, by a UE, a sidelink transmission method proposed in the present disclosure.

FIG. 34 is a flowchart illustrating one example of performing, by a UE, a sidelink transmission method proposed in the present disclosure.

First, the UE receives, from the BS, configuration information related to a configuration of a sidelink resource pool (S3410).

Thereafter, the UE performs a sensing based on a sensing window related to the sensing of the UE (S3420).

Next, the UE selects, based on a result of the sensing, a resource for the sidelink transmission from the slidelink resource pool (S3430).

Here, the sensing window is configured based on an available slot including at least one slot.

Thereafter, the UE performs, based on whether a RE-EVALUATION and/or a PRE-EMPTION on the resource selected based on the result of the sensing to be triggered, the RE-EVALUATION and/or the PRE-EMPTION related to resource re-selection (S3430).

In this case, a resource for the resource re-selection based on the RE-EVALUATION and/or the PRE-EMPTION is configured based on a remaining slot in which a slot related to the resource selected based on the result of the sensing is excluded from the available slot.

Last, the UE performs, based on (i) the resource selected based on the result of the sensing and/or (ii) a resource re-selected based on the RE-EVALUATION and/or the PRE-EMPTION, the sidelink transmission (S3440).

Further, the UE includes one or more transceivers; one or more processors; and one or more memories for storing instructions for operations executed by the one or more processors and coupled to the one or more processors, and performs the operations described in FIG. 34 above.

Further, in an apparatus including one or more memories and one or more processors operatively coupled to the one or more memories, the one or more processors control the apparatus to perform the operations described in FIG. 34 above.

Further, in one or more non-transitory computer-readable media storing one or more instructions, the one or more instructions executable by one or more processors control a UE to perform the operations described in FIG. 34 above.

Various embodiments of the present disclosure may be mutually combined.

Hereinafter, an apparatus to which various embodiments of the present disclosure may be applied will be described.

Although not limited thereto, but various descriptions, functions, procedures, proposals, methods, and/or operation flowcharts of the present disclosure, which are disclosed in the present disclosure may be applied to various fields requiring wireless communications/connections (e.g., 5G) between devices.

Hereinafter, the communication system will be described in more detail with reference to drawings. In the following drawings/descriptions, the same reference numerals will refer to the same or corresponding hardware blocks, software blocks, or functional blocks if not differently described.

Example of Communication System to which Present Disclosure is Applied

Although not limited thereto, but various descriptions, functions, procedures, proposals, methods, and/or operation flowcharts of the present disclosure, which are disclosed in this document may be applied to various fields requiring wireless communications/connections (e.g., 5G) between devices.

Hereinafter, the communication system will be described in more detail with reference to drawings. In the following drawings/descriptions, the same reference numerals will refer to the same or corresponding hardware blocks, software blocks, or functional blocks if not differently described.

Figure 35:
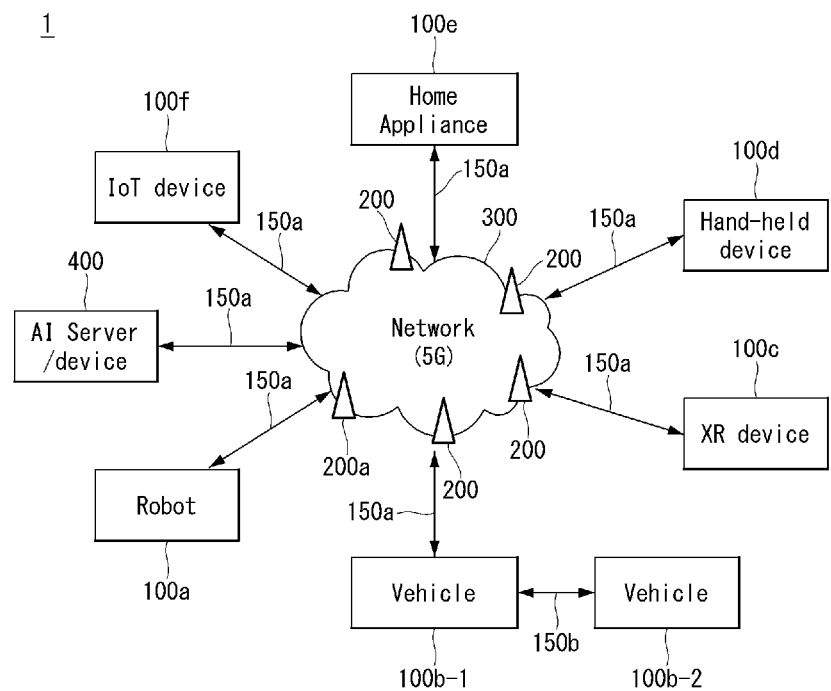
FIG. 35 illustrates a communication system 1 applied to the present disclosure.

FIG. 35 illustrates a communication system applied to the present disclosure.

Referring to FIG. 35, a communication system 1 applied to the present disclosure includes a wireless device, a BS, and a network. Here, the wireless device may mean a device that performs communication by using a wireless access technology (e.g., 5G New RAT (NR) or Long Term Evolution (LTE)) and may be referred to as a communication/wireless/5G device. Although not limited thereto, the wireless device may include a robot 100a. vehicles 100b-1 and 100b-2, an eXtended Reality (XR) device 100c, a hand-held device 100d, a home appliance 100e, an Internet of Thing (IoT) device 100f, and an AI device/server 400. For example, the vehicle may include a vehicle with a wireless communication function, an autonomous driving vehicle, a vehicle capable of performing inter-vehicle communication, and the like. Here, the vehicle may include an Unmanned Aerial Vehicle (UAV) (e.g., drone). The XR device may include an Augmented Reality (AR)/Virtual Reality (VR)/Mixed Reality (MR) device and may be implemented as a form such as a head-mounted device (HMD), a head-up display (HUD) provided in the vehicle, a television, a smart phone, a computer, a wearable device, a home appliance device, digital signage, a vehicle, a robot, etc. The hand-held device may include the smart phone, a smart pad, a wearable device (e.g., a smart watch, a smart glass), a computer (e.g., a notebook, etc.), and the like. The home appliance device may include a TV, a refrigerator, a washing machine, and the like. The IoT device may include a sensor, a smart meter, and the like. For example, the BS and the network may be implemented even the wireless device and a specific wireless device 200a may operate an eNB/network node for another wireless device.

The wireless devices 100a to 100f may be connected to a network 300 through a BS 200. An artificial intelligence (AI) technology may be applied to the wireless devices 100a to 100f and the wireless devices 100a to 100f may be connected to an AI server 400 through the network 300. The network 300 may be configured by using a 3G network, a 4G (e.g., LTE) network, or a 5G (e.g., NR) network. The wireless devices 100a to 100f may communicate with each other through the BS 200/network 300, but may directly communicate with each other without going through the BS/network (sidelink communication). For example, the vehicles 100b-1 and 100b-2 may perform direct communication (e.g., Vehicle to Vehicle (V2V)/Vehicle to everything (V2X) communication). Further, the IoT device (e.g., sensor) may perform direct communication with other IoT devices (e.g., sensor) or other wireless devices 100a to 100f.

Wireless communications/connections 150a, 150b, and 150c may be made between the wireless devices 100a to 100f and the BS 200 and between the BS 200 and the BS 200. Here, the wireless communication/connection may be made through various wireless access technologies (e.g., 5G NR) such as uplink/downlink communication 150a, sidelink communication 150b (or D2D communication), and inter-BS communication 150c (e.g., relay, Integrated Access Backhaul (IAB). The wireless device and the BS/the wireless device and the BS and the BS may transmit/receive radio signals to/from each other through wireless communications/connections 150a, 150b, and 150c. For example, the wireless communications/connections 150a, 150b, and 150c may transmit/receive signals through various physical channels. To this end, based on various proposals of the present disclosure, at least some of various configuration information setting processes, various signal processing processes (e.g., channel encoding/decoding, modulation/demodulation, resource mapping/demapping, etc.), a resource allocation process, and the like for transmission/reception of the radio signal may be performed.

Example of Wireless Device to which Present Disclosure is Applied

FIG. 36 illustrates a wireless device which may be applied to the present disclosure.

Referring to FIG. 36, a first wireless device 100 and a second wireless device 200 may transmit/receive radio signals through various wireless access technologies (e.g., LTE and NR). Here, the first wireless device 100 and the second wireless device 200 may correspond to a wireless device 100x and a BS 200 and/or a wireless device 100x and a wireless device 100x of FIG. 35.

The first wireless device 100 may include one or more processors 102 and one or more memories 104 and additionally further include one or more transceivers 106 and/or one or more antennas 108. The processor 102 may control the memory 104 and/or the transceiver 106 and may be configured to implement descriptions, functions, procedures, proposals, methods, and/or operation flows disclosed in the present disclosure. For example, the processor 102 may process information in the memory 104 and generate a first information/signal and then transmit a radio signal including the first information/signal through the transceiver 106. Further, the processor 102 may receive a radio signal including a second information/signal through the transceiver 106 and then store in the memory 104 information obtained from signal processing of the second information/signal. The memory 104 may connected to the processor 102 and store various information related to an operation of the processor 102. For example, the memory 104 may store a software code including instructions for performing some or all of processes controlled by the processor 102 or performing the descriptions, functions, procedures, proposals, methods, and/or operation flowcharts disclosed in the present disclosure. Here, the processor 102 and the memory 104 may be a part of a communication modem/circuit/chip designated to implement the wireless communication technology (e.g., LTE and NR). The transceiver 106 may be connected to the processor 102 and may transmit and/or receive the radio signals through one or more antennas 108. The transceiver 106 may include a transmitter and/or a receiver. The transceiver 106 may be used mixedly with a radio frequency (RF) unit. In the present disclosure, the wireless device may mean the communication modem/circuit/chip.

The second wireless device 200 may include one or more processors 202 and one or more memories 204 and additionally further include one or more transceivers 206 and/or one or more antennas 208. The processor 202 may control the memory 204 and/or the transceiver 206 and may be configured to implement descriptions, functions, procedures, proposals, methods, and/or operation flows disclosed in the present disclosure. For example, the processor 202 may process information in the memory 204 and generate a third information/signal and then transmit a radio signal including the third information/signal through the transceiver 206. Further, the processor 202 may receive a radio signal including a fourth information/signal through the transceiver 206 and then store in the memory 204 information obtained from signal processing of the fourth information/signal. The memory 204 may connected to the processor 202 and store various information related to an operation of the processor 202. For example, the memory 204 may store a software code including instructions for performing some or all of processes controlled by the processor 202 or performing the descriptions, functions, procedures, proposals, methods, and/or operation flowcharts disclosed in the present disclosure. Here, the processor 202 and the memory 204 may be a part of a communication modem/circuit/chip designated to implement the wireless communication technology (e.g., LTE and NR). The transceiver 206 may be connected to the processor 202 and may transmit and/or receive the radio signals through one or more antennas 208. The transceiver 206 may include a transmitter and/or a receiver and the transceiver 206 may be mixed with the RF unit. In the present disclosure, the wireless device may mean the communication modem/circuit/chip.

Hereinafter, hardware elements of the wireless devices 100 and 200 will be described in more detail. Although not limited thereto, one or more protocol layers may be implemented by one or more processors 102 and 202. For example, one or more processors 102 and 202 may implement one or more layers (e.g., functional layers such as PHY, MAC, RLC, PDCP, RRC, and SDAP). One or more processors 102 and 202 may generate one or more protocol data units (PDUs) and/or one or more service data units (SDUs) according to the descriptions, functions, procedures, proposals, methods, and/or operation flowcharts disclosed in the present disclosure. One or more processors 102 and 202 may generate a message, control information, data, or information according to the descriptions, functions, procedures, proposals, methods, and/or operation flowcharts disclosed in the present disclosure. One or more processors 102 and 202 may generate a signal (e.g., a baseband signal) including the PDU, the SDU, the message, the control information, the data, or the information according to the function, the procedure, the proposal, and/or the method disclosed in the present disclosure and provide the generated signal to one or more transceivers 106 and 206. One or more processors 102 and 202 may receive the signal (e.g., baseband signal) from one or more transceivers 106 and 206 and acquire the PDU, the SDU, the message, the control information, the data, or the information according to the descriptions, functions, procedures, proposals, methods, and/or operation flowcharts disclosed in the present disclosure.

One or more processors 102 and 202 may be referred to as a controller, a microcontroller, a microprocessor, or a microcomputer. One or more processors 102 and 202 may be implemented by hardware, firmware, software, or a combination thereof. As one example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in one or more processors 102 and 202. The descriptions, functions, procedures, proposals, and/or operation flowcharts disclosed in the present disclosure may be implemented by using firmware or software and the firmware or software may be implemented to include modules, procedures, functions, and the like. Firmware or software configured to perform the descriptions, functions, procedures, proposals, and/or operation flowcharts disclosed in the present disclosure may be included in one or more processors 102 and 202 or stored in one or more memories 104 and 204 and driven by one or more processors 102 and 202. The descriptions, functions, procedures, proposals, and/or operation flowcharts disclosed in the present disclosure may be implemented by using firmware or software in the form of a code, the instruction and/or a set form of the instruction.

One or more memories 104 and 204 may be connected to one or more processors 102 and 202 and may store various types of data, signals, messages, information, programs, codes, instructions, and/or commands. One or more memories 104 and 204 may be configured by a ROM, a RAM, an EPROM, a flash memory, a hard drive, a register, a cache memory, a computer reading storage medium, and/or a combination thereof. One or more memories 104 and 204 may be positioned inside and/or outside one or more processors 102 and 202. Further, one or more memories 104 and 204 may be connected to one or more processors 102 and 202 through various technologies such as wired or wireless connection.

One or more transceivers 106 and 206 may transmit to one or more other devices user data, control information, a wireless signal/channel, etc., mentioned in the methods and/or operation flowcharts of the present disclosure. One or more transceivers 106 and 206 may receive from one or more other devices user data, control information, a wireless signal/channel, etc., mentioned in the descriptions, functions, procedures, proposals, methods, and/or operation flowcharts disclosed in the present disclosure. For example, one or more transceivers 106 and 206 may be connected to one or more processors 102 and 202 and transmit and receive the radio signals. For example, one or more processors 102 and 202 may control one or more transceivers 106 and 206 to transmit the user data, the control information, or the radio signal to one or more other devices. Further, one or more processors 102 and 202 may control one or more transceivers 106 and 206 to receive the user data, the control information, or the radio signal from one or more other devices. Further, one or more transceivers 106 and 206 may be connected to one or more antennas 108 and 208 and one or more transceivers 106 and 206 may be configured to transmit and receive the user data, control information, wireless signal/channel, etc., mentioned in the descriptions, functions, procedures, proposals, methods, and/or operation flowcharts disclosed in the present disclosure through one or more antennas 108 and 208. In the present disclosure one or more antennas may be a plurality of physical antennas or a plurality of logical antennas (e.g., antenna ports). One or more transceivers 106 and 206 may convert the received radio signal/channel from an RF band signal to a baseband signal in order to process the received user data, control information, radio signal/channel, etc., by using one or more processors 102 and 202. One or more transceivers 106 and 206 may convert the user data, control information, radio signal/channel, etc., processed by using one or more processors 102 and 202, from the baseband signal into the RF band signal. To this end, one or more transceivers 106 and 206 may include an (analog) oscillator and/or filter.

Example of Signal Processing Circuit to which Present Disclosure is Applied

FIG. 37 illustrates a signal processing circuit for a transmit signal.

Referring to FIG. 37 a signal processing circuit 1000 may include a scrambler 1010, a modulator 1020, a layer mapper 1030, a precoder 1040, a resource mapper 1050, and a signal generator 1060. Although not limited thereto, an operation/function of FIG. 37 may be performed by the processors 102 and 202 and/or the transceivers 106 and 206 of FIG. 36. Hardware elements of FIG. 37 may be implemented in the processors 102 and 202 and/or the transceivers 106 and 206 of FIG. 36. For example, blocks 1010 to 1060 may be implemented in the processors 102 and 202 of FIG. 36. Further, blocks 1010 to 1050 may be implemented in the processors 102 and 202 of FIG. 36 and the block 1060 may be implemented in the transceivers 106 and 206 of FIG. 36.

A codeword may be transformed into a radio signal via the signal processing circuit 1000 of FIG. 37. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 1010. A scramble sequence used for scrambling may be generated based on an initialization value and the initialization value may include ID information of a wireless device. The scrambled bit sequence may be modulated into a modulated symbol sequence by the modulator 1020. A modulation scheme may include pi/2-Binary Phase Shift Keying (pi/2-BPSK), m-Phase Shift Keying (m-PSK), m-Quadrature Amplitude Modulation (m-QAM), etc. A complex modulated symbol sequence may be mapped to one or more transport layers by the layer mapper 1030. Modulated symbols of each transport layer may be mapped to a corresponding antenna port(s) by the precoder 1040 (precoding). Output z of the precoder 1040 may be obtained by multiplying output y of the layer mapper 1030 by precoding matrix W of N*M. Here, N represents the number of antenna ports and M represents the number of transport layers. Here, the precoder 1040 may perform precoding after performing transform precoding (e.g., DFT transform) for complex modulated symbols. Further, the precoder 1040 may perform the precoding without performing the transform precoding.

The resource mapper 1050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 1060 may generate the radio signal from the mapped modulated symbols and the generated radio signal may be transmitted to another device through each antenna. To this end, the signal generator 1060 may include an Inverse Fast Fourier Transform (IFFT) module, a Cyclic Prefix (CP) insertor, a Digital-to-Analog Converter (DAC), a frequency uplink converter, and the like.

A signal processing process for a receive signal in the wireless device may be configured in the reverse of the signal processing process (1010 to 1060) of FIG. 37. For example, the wireless device (e.g., 100 or 200 of FIG. 36) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource de-mapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Utilization Example of Wireless Device to which Present Disclosure is Applied

Figure 38:
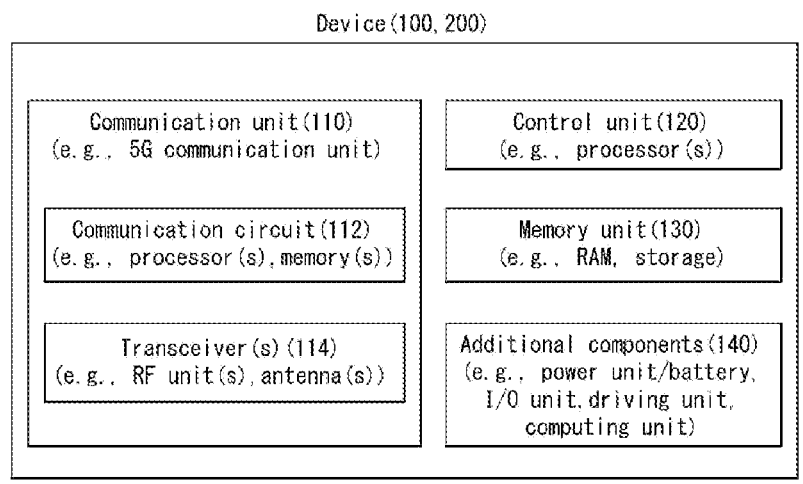
FIG. 38 illustrates another example of a wireless device applied to the present disclosure.

FIG. 38 illustrates another example of a wireless device applied to the present disclosure. The wireless device may be implemented as various types according to a use example/service (see FIG. 35).

Referring to FIG. 38, wireless devices 100 and 200 may correspond to the wireless devices 100 and 200 of FIG. 36 and may be constituted by various elements, components, units, and/or modules. For example, the wireless devices 100 and 200 may include a communication unit 110, a control unit 120, and a memory unit 130, and an additional element 140. The communication unit may include a communication circuit 112 and a transceiver(s) 114. For example, the communication circuit 112 may include one or more processors 102 and 202 and/or one or more memories 104 and 204 of FIG. 36. For example, the transceiver(s) 114 may include one or more transceivers 106 and 206 and/or one or more antennas 108 and 208 of FIG. 36. The control unit 120 is electrically connected to the communication unit 110, the memory unit 130, and the additional element 140 and controls an overall operation of the wireless device. For example, the control unit 120 may an electrical/mechanical operation of the wireless device based on a program/code/instruction/information stored in the memory unit 130. Further, the control unit 120 may transmit the information stored in the memory unit 130 to the outside (e.g., other communication devices) through the communication unit 110 via a wireless/wired interface or store information received from the outside (e.g., other communication devices) through the wireless/wired interface through the communication unit 110.

The additional element 140 may be variously configured according to the type of wireless device. For example, the additional element 140 may include at least one of a power unit/battery, an input/output (I/O) unit, a driving unit, and a computing unit. Although not limited thereto, the wireless device may be implemented as a form such as the robot 100*a* of FIG. 35, the vehicles 100*b*-1 and 100*b*-2 of FIG. 35, the XR device 100*c* of FIG. 35, the portable device 100*d* of FIG. 35, the home appliance 100*e* of FIG. 35, the IoT device 100*f* of FIG. 35, a digital broadcasting terminal, a hologram device, a public safety device, an MTC device, a medical device, a fintech device (or financial device), a security device, a climate/environment device, an AI server/device 400 of FIG. 35, the BS 200 of FIG. 35, a network node, etc. The wireless device may be movable or may be used at a fixed place according to a use example/service.

In FIG. 38, all of various elements, components, units, and/or modules in the wireless devices 100 and 200 may be interconnected through the wired interface or at least may be wirelessly connected through the communication unit 110. For example, the control unit 120 and the communication 110 in the wireless devices 100 and 200 may be wiredly connected and the control unit 120 and the first unit (e.g., 130 or 140) may be wirelessly connected through the communication unit 110. Further, each element, component, unit, and/or module in the wireless devices 100 and 200 may further include one or more elements. For example, the control unit 120 may be constituted by one or more processor sets. For example, the control unit 120 may be configured a set of a communication control processor, an application processor, an electronic control unit (ECU), a graphic processing processor, a memory control processor, etc. As another example, the memory 130 may be configured as a random access memory (RAM), a dynamic RAM (DRAM), a read only memory (ROM), a flash memory, a volatile memory, a non-volatile memory, and/or combinations thereof.

Example of Hand-Held Device to which Present Disclosure is Applied

Figure 39:
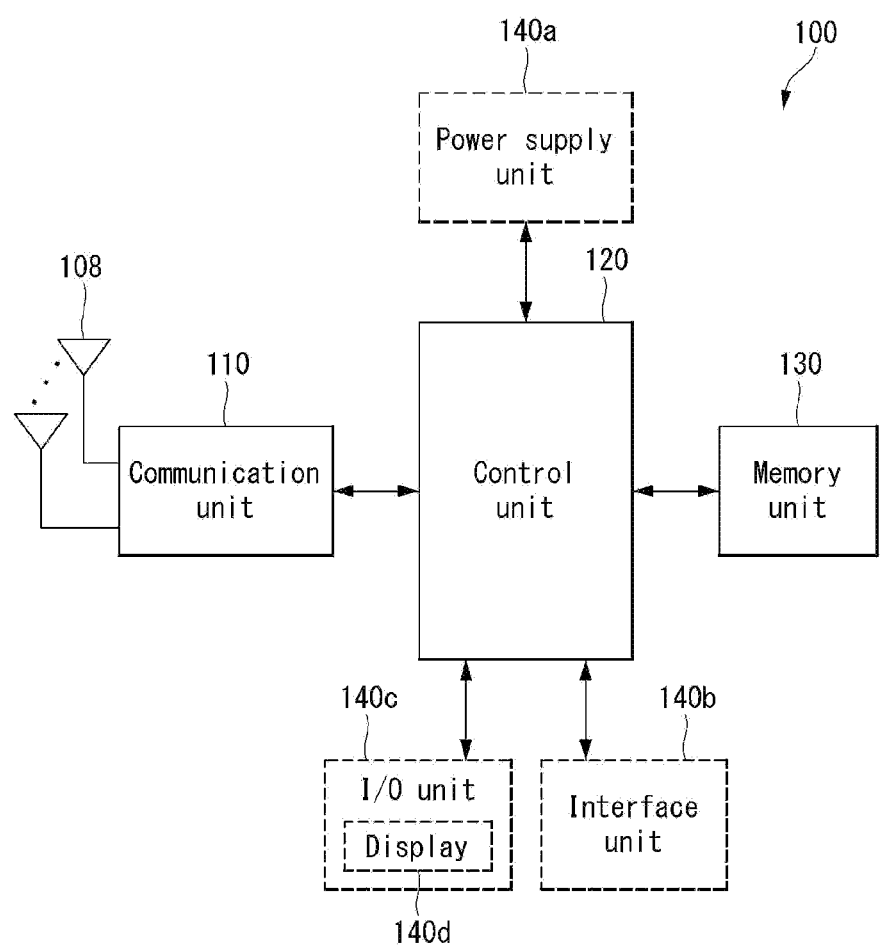
FIG. 39 illustrates a hand-held device applied to the present disclosure.

FIG. 39 illustrates a hand-held device applied to the present disclosure. The hand-held device may include a smart phone, a smart pad, a wearable device (e.g., a smart watch, a smart glass), and a hand-held computer (e.g., a notebook, etc.). The hand-held device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 39, a hand-held device 100 may include an antenna unit 108, a communication unit 110, a control unit 120, a memory unit 130, a power supply unit 140*a*, an interface unit 140*b*, and an input/output unit 140*c*. The antenna unit 108 may be configured as a part of the communication unit 110. The blocks 110 to 130/140*a* to 140*c* correspond to the blocks 110 to 130/140 of FIG. 38, respectively.

The communication unit 110 may transmit/receive a signal (e.g., data, a control signal, etc.) to/from another wireless device and BSs. The control unit 120 may perform various operations by controlling components of the hand-held device 100. The control unit 120 may include an Application Processor (AP). The memory unit 130 may store data/parameters/programs/codes/instructions required for driving the hand-held device 100. Further, the memory unit 130 may store input/output data/information, etc. The power supply unit 140*a* may supply power to the hand-held device 100 and include a wired/wireless charging circuit, a battery, and the like. The interface unit 140*b* may support a connection between the hand-held device 100 and another external device. The interface unit 140*b* may include various ports (e.g., an audio input/output port, a video input/output port) for the connection with the external device. The input/output unit 140*c* may receive or output a video information/signal, an audio information/signal, data, and/or information input from a user. The input/output unit 140*c* may include a camera, a microphone, a user input unit, a display unit 140*d*, a speaker, and/or a haptic module.

As one example, in the case of data communication, the input/output unit 140*c* may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140*c*.

Here, the wireless communication technology implemented in the wireless devices 100 and 200 of the present disclosure may include a narrowband Internet of Things for low-power communication as well as LTE, NR, and 6G. At this time, for example, NB-IoT technology may be an example of LPWAN (Low Power Wide Area Network) technology, and may be implemented in standards such as LTE Cat NB1 and/or LTE Cat NB2, and is not limited to the above-mentioned names. Additionally or alternatively, the wireless communication technology implemented in the wireless devices 100 and 200 of the present disclosure may perform communication based on the LTE-M technology. In this case, as an example, the LTE-M technology may be an example of an LPWAN technology, and may be called by various names such as enhanced machine type communication (eMTC). For example, LTE-M technology is 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) may be implemented in at least one of various standards such as LTE M, and is not limited to the above-described name. Additionally or alternatively, the wireless communication technology implemented in the wireless devices 100 and 200 of the present disclosure is at least one of ZigBee, Bluetooth, and Low Power Wide Area Network (LPWAN) in consideration of low power communication. It may include any one, and is not limited to the above-mentioned names. For example, the ZigBee technology can create PAN (personal area networks) related to small/low-power digital communication based on various standards such as IEEE 802.15.4, and can be called by various names.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

Although a method of transmitting and receiving downlink data in a wireless communication system of the present disclosure has been described with reference to an example applied to a 3GPP LTE/LTE-A system or a 5G system (New RAT system), the scheme may be applied to various wireless communication systems in addition to the 3GPP LTE/LTE-A system or 5G system.

What is claimed is:

1. A method comprising:
receiving, by a user equipment (UE) from a base station, configuration information related to a configuration of a sidelink resource pool;
performing, by the UE, a sensing based on a sensing window related to the sensing of the UE,
wherein the sensing window is configured based on an available slot including at least one slot;
selecting, by the UE based on a result of the sensing, a resource for a sidelink transmission from among candidate sidelink transmission resources identified within a resource selection window from the resource pool,
wherein a start time of the resource selection window is determined as (i) a time point apart by a first time offset based on a processing time for the UE to select the resource for the sidelink transmission (ii) from a slot related to a time point at which the selection of the sidelink transmission resource is triggered, and
wherein an end time of the resource selection window is determined as (i) a time point apart by a second time offset based on remaining Packet Delay Budget (PDB) of data packet related to the sidelink transmission (ii) from the slot related to the time point at which the selection of the sidelink transmission resource is triggered;
performing, by the UE based on whether a RE-EVALUATION and/or a PRE-EMPTION on the resource is selected based on the result of the sensing to be triggered, the RE-EVALUATION and/or the PRE-EMPTION related to resource re-selection,
wherein a resource for the resource re-selection based on the RE-EVALUATION and/or the PRE-EMPTION is configured based on a remaining slot in which a slot related to the resource selected based on the result of the sensing is excluded from the available slot; and
performing, by the UE based on (i) the resource selected based on the result of the sensing and/or (ii) a resource re-selected based on the RE-EVALUATION and/or the PRE-EMPTION, the sidelink transmission.

2. The method of claim 1,
wherein (i) a start time of the sensing window and (ii) an end time of the sensing window are determined based on a slot-based time interval from a first (1st) slot included in the available slot.

3. The method of claim 2,
wherein the start time of the sensing window is a time point that is 31 slots earlier than the first (1st) slot included in the available slot.

4. The method of claim 3,
wherein the end time of the sensing window is a time point that is a number of slots equal to a sum of (i) a processing time for the user equipment to obtain the result of the sensing and (ii) a processing time for the user equipment to select the resource for the sidelink transmission based on the result of the sensing earlier than the first (1st) slot included in the available slot.

5. The method of claim 1,
wherein (i) the sensing window and (ii) the resource selection window are related to aperiodic sidelink transmission of the user equipment.

6. The method of claim 1, further comprising:
receiving, from another user equipment, Sidelink Control Information (SCI).

7. The method of claim 6,
wherein the identifying the candidate sidelink transmission resource is performed based on the SCI which the user equipment receives from the another user equipment,
wherein the SCI includes information for the sensing, and
wherein the SCI is detected on the sensing window.

8. The method of claim 6,
wherein the performing the RE-EVALUATION and/or the PRE-EMPTION is performed before the sidelink transmission on the selected resource is performed based on the SCI,
wherein the SCI is received in a slot other than a slot included in the sensing window, and
wherein the SCI includes information on a priority of sidelink transmission which the another user equipment performs.

9. The method of claim 1,
wherein based on (i) the RE-EVALUATION and/or the PRE-EMPTION being performed and (ii) there being available resource for the sidelink transmission in the configured resource for the resource re-selection, the sidelink transmission is performed on the resource re-selected based on the RE-EVALUATION and/or the PRE-EMPTION.

10. The method of claim 9,
wherein based on (i) the RE-EVALUATION and/or the PRE-EMPTION being performed and (ii) there being no available resource for the sidelink transmission in the configured resource for the resource re-selection, further comprises:
performing random resource selection.

11. The method of claim 9,
wherein based on (i) the RE-EVALUATION and/or the PRE-EMPTION being performed and (ii) there being no available resource for the sidelink transmission in the configured resource for the resource re-selection, further comprises:
dropping the sidelink transmission.

12. The method of claim 9,
wherein based on (i) the RE-EVALUATION and/or the PRE-EMPTION being not performed, the sidelink transmission is performed on the resource selected based on the result of the sensing.

13. The method of claim 7, further comprising:
performing DRX (Discontinuous Reception) operation; and
based on (i) a part of the sensing window overlapping with a time interval during which the DRX operation is activated or (ii) all of the sensing window not overlapping with the time interval during which the DRX operation is activated, detecting the SCI on the sensing window.

14. The method of claim 7, further comprising:
performing DRX (Discontinuous Reception) operation; and
based on (i) a part of the sensing window overlapping with a time interval during which the DRX operation is activated or (ii) all of the sensing window not overlapping with the time interval during which the DRX operation is activated, omitting detection of the SCI on the sensing window.

15. A user equipment (UE) comprising:
one or more transceivers;
one or more processors; and
one or more memories for storing instructions for operations executed by the one or more processors and coupled to the one or more processors;
wherein the operations comprising:
receiving, by the UE from a base station, configuration information related to a configuration of a sidelink resource pool;
performing, by the UE, a sensing based on a sensing window related to the sensing of the user equipment,
wherein the sensing window is configured based on an available slot including at least one slot;
selecting, by the UE based on a result of the sensing, a resource for a sidelink transmission from among candidate sidelink transmission resources identified within a resource selection window from the resource pool,
wherein a start time of the resource selection window is determined as (i) a time point apart by a first time offset based on a processing time for the UE to select the resource for the sidelink transmission (ii) from a slot related to a time point at which the selection of the sidelink transmission resource is triggered, and
wherein an end time of the resource selection window is determined as (i) a time point apart by a second time offset based on remaining Packet Delay Budget (PDB) of data packet related to the sidelink transmission (ii) from the slot related to the time point at which the selection of the sidelink transmission resource is triggered;
performing, by the UE based on whether a RE-EVALUATION and/or a PRE-EMPTION on the resource is selected based on the result of the sensing to be triggered, the RE-EVALUATION and/or the PRE-EMPTION related to resource re-selection,
wherein a resource for the resource re-selection based on the RE-EVALUATION and/or the PRE-EMPTION is configured based on a remaining slot in which a slot related to the resource selected based on the result of the sensing is excluded from the available slot; and
performing, by the UE based on (i) the resource selected based on the result of the sensing and/or (ii) a resource re-selected based on the RE-EVALUATION and/or the PRE-EMPTION, the sidelink transmission.

16. An apparatus comprising:
one or more memories; and
one or more processors operatively coupled to the one or more memories,
wherein the one or more processors control the apparatus to:
receive, from a base station, configuration information related to a configuration of a sidelink resource pool;
perform a sensing based on a sensing window related to the sensing of the apparatus,
wherein the sensing window is configured based on an available slot including at least one slot;
select, based on a result of the sensing, a resource for a sidelink transmission from among candidate sidelink transmission resources identified within a resource selection window from the resource pool,
wherein a start time of the resource selection window is determined as (i) a time point apart by a first time offset based on a processing time for the apparatus to select the resource for the sidelink transmission (ii) from a slot related to a time point at which the selection of the sidelink transmission resource is triggered, and
wherein an end time of the resource selection window is determined as (i) a time point apart by a second time offset based on remaining Packet Delay Budget (PDB) of data packet related to the sidelink transmission (ii) from the slot related to the time point at which the selection of the sidelink transmission resource is triggered;
perform, based on whether a RE-EVALUATION and/or a PRE-EMPTION on the resource is selected based on the result of the sensing to be triggered, the RE-EVALUATION and/or the PRE-EMPTION related to resource re-selection,
wherein a resource for the resource re-selection based on the RE-EVALUATION and/or the PRE-EMPTION is configured based on a remaining slot in which a slot related to the resource selected based on the result of the sensing is excluded from the available slot; and
perform, based on (i) the resource selected based on the result of the sensing and/or (ii) a resource re-selected based on the RE-EVALUATION and/or the PRE-EMPTION, the sidelink transmission.

* * * * *